(12) United States Patent
Ono

(10) Patent No.: US 7,501,811 B2
(45) Date of Patent: Mar. 10, 2009

(54) DISPLACEMENT MEASURING APPARATUS AND LOAD MEASURING APPARATUS OF ROTATING MEMBER

(75) Inventor: Koichiro Ono, Fujisawa (JP)

(73) Assignee: NSK Ltd., Tokyo (JP)

( * ) Notice: Subject to any disclaimer, the term of this patent is extended or adjusted under 35 U.S.C. 154(b) by 161 days.

(21) Appl. No.: 11/727,266

(22) Filed: Mar. 26, 2007

(65) Prior Publication Data

US 2008/0243427 A1 Oct. 2, 2008

(51) Int. Cl.
*G01B 7/30* (2006.01)
*F16C 19/00* (2006.01)

(52) U.S. Cl. .............................. 324/207.25; 73/514.39; 384/448

(58) Field of Classification Search ......... 324/173–174, 324/207.25; 73/514.31, 514.39; 384/448; 702/145, 148–149, 151
See application file for complete search history.

(56) References Cited

U.S. PATENT DOCUMENTS 5,967,669 A * 10/1999 Ouchi ........................ 384/448
6,956,367 B2 * 10/2005 Fujikawa et al. ....... 324/207.22

FOREIGN PATENT DOCUMENTS

| JP | 62-3365 B | 1/1987 |
|----|-----------|--------|
| JP | 3-209016 A | 9/1991 |
| JP | 2001-21577 A | 1/2004 |
| JP | 2004-3918 A | 1/2004 |
| JP | 2004-77159 A | 3/2004 |

\* cited by examiner

*Primary Examiner*—Bot LeDynh
(74) *Attorney, Agent, or Firm*—Sughrue Mion, PLLC

(57) ABSTRACT

An encoder 12 changing a characteristic thereof alternately and at equal intervals with respect to circumferential direction is supported by and fixed to the hub 4 concentrically. A detecting portion of a sensor 13 supported by the outer ring 3 is closely opposed to a detected face of the encoder 12. Width dimensions of first, second detecting portions provided at the detected face are changed continuously with respect to direction of operating a load to be detected. In accordance with a change of the load, a pattern of changing an output signal of the sensor 13 is changed. Thus, the load is calculated by observing the pattern. By performing filtering process on a signal expressing the change in the pattern, a variation based on the mounting error or the like is removed.

24 Claims, 36 Drawing Sheets

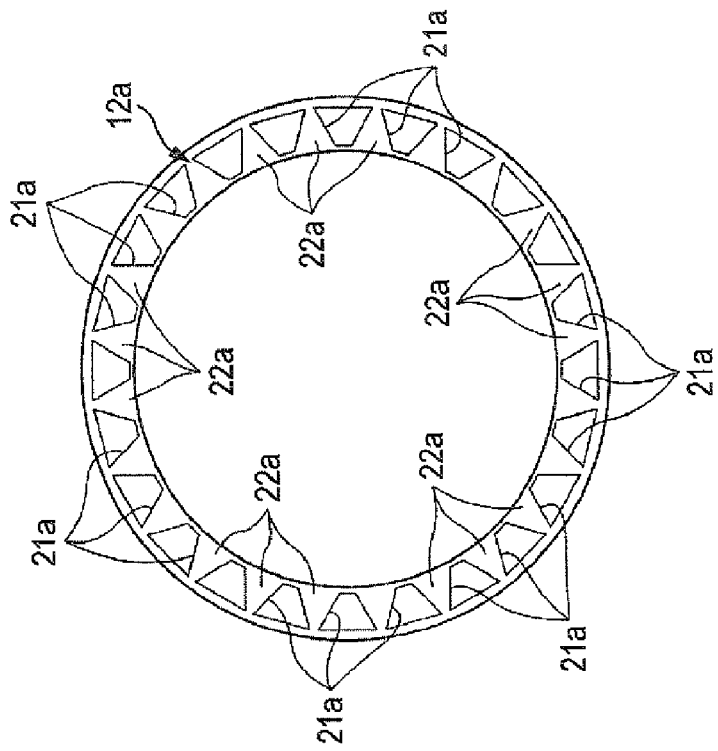
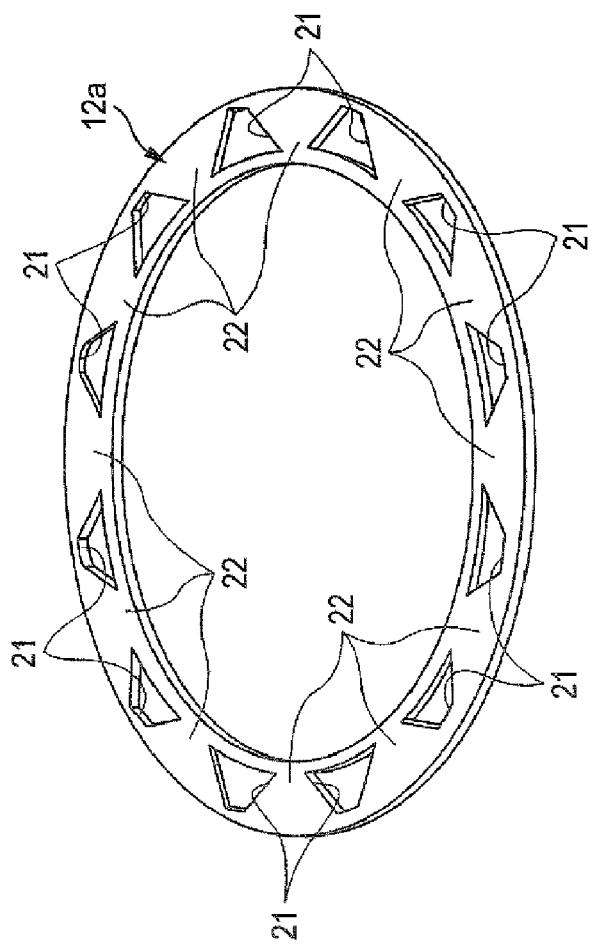

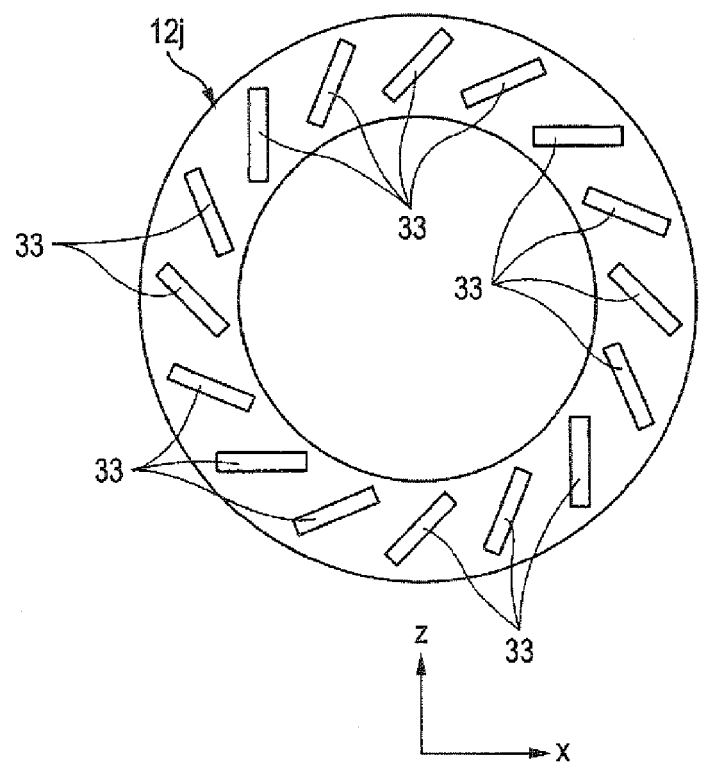 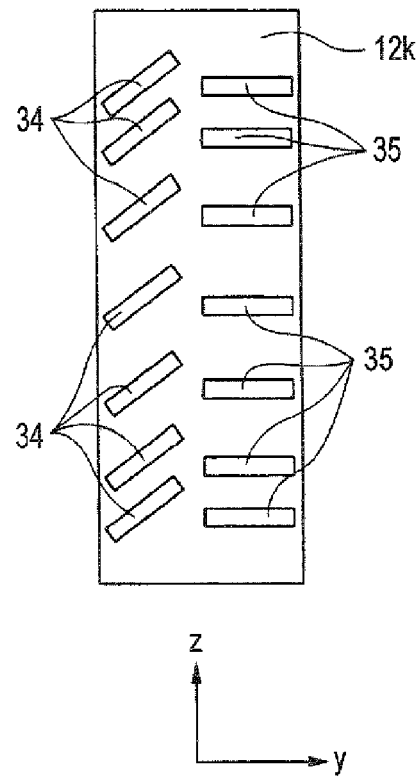

DISPLACEMENT MEASURING APPARATUS AND LOAD MEASURING APPARATUS OF ROTATING MEMBER

BACKGROUND OF THE INVENTION

1. Field of the Invention

This invention relates to a displacement and a load measuring apparatus of a rotating member. The displacement and a load measuring apparatus of a rotating member is utilized for ensuring a stable operation of a vehicle by rotatably supporting, for example, a wheel of a vehicle (automobile) with respect to a suspension and measuring a magnitude of a load applied to the wheel. Further, the displacement measuring apparatus and the load measuring apparatus of the rotating member are utilized for pertinently adjusting a speed of feeding a tool or the like by being integrated to a rolling bearing unit for supporting main spindles of various machine tools and measuring a load applied to the main spindle, or a displacement by thermal expansion or the like.

2. Description of the Related Art

For example, a rolling bearing unit is used for rotatably supporting a wheel of a vehicle with respect to a suspension. Further, in order to ensure a running stability of a vehicle, a running state stabilizing apparatus of a vehicle such as an antilock braking system (ABS) and a traction control system (TCS) is widely used. According to the running state stabilizing apparatus of ABS, TCS or the like, although a running state of a vehicle in braking or acceleration can be stabilized, in order to ensure the stability even under a severer condition, it is necessary to control a brake or an engine by inputting a number of information influencing on the running stability of the vehicle.

That is, in a case of the running state stabilizing apparatus of the background art of ABS, TCS or the like, there is carried out a so-called feedback control of controlling a brake or an engine by detecting a slip between a tire and a road surface, and therefore, the control of the brake or the engine is delayed even the delay is momentary. In other words, the slip between the tire and the road surface, or so-called pulling to one side of the brake, in which forces of braking left and right wheels differ from each other extremely, cannot be prevented by a so-called feed forward control in order to promote a function under a severe condition. Further, in a truck or the like, it cannot also be prevented that a running stability is failed based on a failure in a loading state.

In order to deal with such a problem, for carrying out the feedforward control or the like, it is conceivable to integrate a load measuring apparatus for measuring either or both of a radial load and an axial load applied to a wheel into a rolling bearing unit for supporting the wheel with respect to a suspension. There are known rolling bearing units for supporting a wheel attached with a load measuring apparatus which can be used in such a case, in a background art as described in Patent Documents 1 through 4.

In Patent Document 1, there is described a rolling bearing unit attached with a load measuring apparatus capable of measuring a radial load. In a case of a first example of the background art structure, by measuring a displacement with regard to a diameter direction between an outer ring which is not rotated and a hub which is rotated on an inner diameter of the outer ring by a noncontact type displacement sensor, a radial load applied between the outer ring and the hub is calculated. The calculated radial load is utilized for properly controlling ABS as well as informing a failure in a loading state to a driver.

Further, Patent Document 2 describes a structure of measuring an axial load applied to a rolling bearing unit. In a case of a second example of a background art structure described in Patent Document 2, at a plurality of portions of an inner side face of a fixed side flange provided at an outer peripheral surface of an outer ring, load sensors are attached respectively to portions surrounding screw holes for screwing bolts for coupling the fixed side flange to a knuckle. The respective load sensors are squeezed between an outer side face of the knuckle and the inner side face of the fixed side flange. In a case of a load measuring apparatus of a rolling bearing unit of the second example of the background art, an axial load applied between the wheel and the knuckle is measured by the respective load sensors.

Further, Patent Document 3 describes a structure in which by displacement sensor units supported at positions of 4 portions in a circumferential direction of an outer ring and a detected ring having a section in an L-like shape outwardly fitted to fix to a hub, displacements in a radial direction and a thrust direction of the hub relative to the outer ring at the positions of 4 portions are detected, and based on detected values of respective portions, a direction of a load applied to the hub and a magnitude thereof are calculated.

Further, Patent Document 4 describes a method of providing a strain gage for detecting a dynamic strain at an outer ring corresponding member a rigidity of which is partially reduced, calculating a revolving speed of a rolling element from a frequency of passing the rolling element detected by the strain gage, and measuring an axial load applied to the rolling bearing from the revolving speed.

In a case of the first example of the background art structure described in Patent Document 1, the load applied to the rolling bearing unit is measured by measuring the displacement with regard to the diameter direction of the outer ring and the hub by the displacement sensor. However, an amount of the displacement with regard to the diameter direction is small, and therefore, in order to accurately calculate the load, as the displacement sensor, a highly accurate one needs to be used. The highly accurate noncontact type sensor is expensive, and therefore, it is unavoidable to increase cost of a total of the rolling bearing unit attached with the load measuring apparatus.

Further, in a case of the second example of the background art structure described in Patent Document 2, it is necessary to provide the load sensors by a number the same as that of the bolts for supporting to fix the outer ring by the knuckle. Therefore, not only the load sensor itself is expensive, but also it is unavoidable to considerably increase cost of a total of the load measuring apparatus of the rolling bearing unit. Further, according to the structure described in Patent Document 3, the sensor are installed at positions of 4 portions in a peripheral direction of the outer ring, and therefore, cost is increased more than that of the structure described in Patent Document 1. Further, according to the method described in Patent Document 4, it is necessary to partially reduce the rigidity of the outer ring corresponding member, and there is a possibility of making a durability of the outer ring corresponding member difficult to ensure.

Further, in the structure and the method described in any one of Patent Documents 1 through 4, an exclusive mechanism is provided for measuring the load applied to the rolling bearing unit. Therefore, it is unavoidable to increase the cost as well as a weight thereof.

Further, as a technology related to the invention, Patent Document 5 describes a structure in which by using an encoder alternately arranged with N poles and S poles at a detected face, a swing of the center of an inner ring supporting the encoder is detected. However, in Patent Document 5, there is not described a technology calculating a load applied to a rolling bearing unit by utilizing the encoder even when a description suggesting such a technology is included.

In contrast thereto, the inventors have invented a structure in which based on a pattern of a change in an output signal of a sensor which is changed in accordance with rotation of an encoder mounted to a hub constituting a rolling bearing unit, a direction and a magnitude of a load applied to the rolling bearing unit are calculated (Japanese Patent Application No. 2005-147642). In a case of the rolling bearing unit attached with a load measuring apparatus according to the previous invention, the encoder is concentrically supported by and fixed to a portion of a rotary bearing ring such as the hub, and a detecting portion of the sensor supported by a portion which is not rotated is made to be opposed to a detected face of the encoder. Further, a width direction of the detected face is made to coincide with a direction of operating a load to be calculated. Further, a property of the detected face is alternately changed in a circumferential direction, and a pitch or a phase of the property changed in the circumferential direction is continuously changed in the width direction of the detected face. When the load is applied to the rotatory bearing ring, a position in the width direction of the detected face of the encoder opposed to the detecting portion of the sensor is changed and the pattern of varying the output signal of the sensor is changed. There is a correlative relationship between a degree of changing the pattern and the magnitude of the load, and therefore, by observing the pattern, the magnitude of the load can be calculated.

However, for example, in a case of a rolling bearing unit for supporting a wheel, in order to ensure a running stability of an automobile, a rigidity thereof is considerably high. Therefore, an amount of a relative displacement between a stationary bearing ring and a rotatory bearing ring generated based on a load is small even when the load is a radial load or an axial load. For example, when the rolling bearing unit for supporting the wheel is operated with an axial load of about 10 kN, an amount (length) of relatively displacing the stationary bearing ring and the rotatory bearing ring in an axial direction is only about several tens µm through several hundreds µm. Further, when a radial load of about 10 kN is applied, an amount of relatively displacing the stationary bearing ring and the rotatory bearing ring in a diameter direction is only about several tens µm.

As is apparent from the above-described explanation, in order to calculate the axial load by an accuracy which can be reduced to practice in order to ensure a running stability of the automobile, the displacement in the axial direction of about several µm through several tens µm needs to be calculated based on a detecting signal of the sensor (in accordance with a rigidity or the like of the rolling bearing unit for supporting the wheel). Further, with regard to the radial load, the displacement in the diameter direction of about several µm or smaller needs to calculate based on the detecting signal of the sensor (in accordance with the rigidity or the like of the rolling bearing unit for supporting the wheel). In order to calculate the displacement having the small amount, a boundary (a boundary between a concave portion and a convex portion formed at the detected face, or a boundary between an N pole and an S pole magnetized on the detected face) at which the property of the detected face of the encoder is changed needs to be fabricated accurately (a position or an angle of inclination at the boundary line needs to be fabricated in accordance with a design value). In contrast thereto, there is a limit in a working accuracy or a magnetizing accuracy, it is necessary to take into consideration to some degree that the pattern of varying the detected signal of the sensor is changed based on a dimensional error of the boundary line.

Further, even if the accuracy of the boundary line by which the property of the detected face of the encoder is changed can be satisfied, by an integration error in integrating the encoder to the rotatory bearing ring, in accordance with rotation of the rotatory bearing ring, the detected face is apparently displaced (vibrated in accordance with rotation) regardless of the load. When the load operated between the stationary bearing ring and the rotatory bearing ring constituting the rolling bearing unit is calculated by the structure of the previous invention, so far as the output signal of the sensor is not corrected, it is important that a geometrical center axis and a rotation axis center of the detected face of the encoder coincide with each other. When two center axes do not coincide with each other, that is, the two center axes are shifted from each other in the diameter direction, or inclined to each other, regardless of the load, the position in the width direction of the detected face to which the detected portion of the sensor is opposed is shifted.

For example, in a case in which the load to be detected is the radial load, the detected face of the encoder becomes a side face in the axial direction, when positions in the diameter direction of a center axis of the side face in the axial direction and the rotation center axis of the rotatory bearing ring are shifted from each other, the detected face carries out a whirling movement of a first order of rotation in accordance with rotation of the rotatory bearing ring. Further, when the load to be detected is the axial load, there is frequently a case in which the detected face of the encoder is constituted by a peripheral surface thereof, when a center axis of the peripheral surface and the rotation center axis of the rotatory bearing ring are inclined to each other, the detected face carries out a movement of displacing in the axial direction of a first order of rotation in accordance with rotation of the rotatory bearing ring. In either case, a portion of the detected face opposed to detected portion of the sensor is shifted in the width direction of the detected face. As a result, even when the load is not varied, a pattern of varying the output signal of the sensor is changed, and a measurement accuracy of the load is deteriorated.

Patent Document 1: JP-A-2001-21577
Patent Document 2: JP-A-3-209016
Patent Document 3: JP-A-2004-3918
Patent Document 4: JP-B-62-3365
Patent Document 5: JP-A-2004-77159

SUMMARY OF THE INVENTION

In view of the above-described situation, the invention realizes a displacement measuring apparatus and a load measuring apparatus of a rotating member in which even when a detected face of the encoder is deflected in a width direction thereof in accordance with rotation of the rotating member such as the rotatory bearing ring by a failure in integrating an encoder into a rotating member such as a rotatory bearing ring, an amount of displacing the rotating member or a load applied to the rotating member can be accurately calculated as a relative displacement amount between the rotatory bearing ring and a stationary bearing ring, or a load or the like applied between the two bearing rings.

In order to achieve the object, according to a first aspect of the present invention, a displacement measuring apparatus of a rotating member comprises:

an encoder supported by a portion of a rotating member concentrically, said encoder changing a characteristic of a detected face thereof alternately with respect to circumferential direction;

a sensor supported by a portion which is not rotated in a state where a detecting portion thereof is opposed to the detected face, said sensor changing an output signal thereof with respect to the characteristic of the detected face;

a filter circuit performing a filtering process on the output signal of the sensor or a processing signal obtained based on the output signal, said filter circuit erasing an error component based on an error with regard to the change in the characteristic of the detected face over a circumferential direction in a variation of the output signal or the processing signal; and a computing unit calculating a displacement amount of the rotating member based on the output signal or the processing signal on which the filtering process is performed by the filter circuit, said computing unit being provided with a function of calculating the relative displacement amount based on a pattern of changing the output signal or the processing signal passing through the filter circuit.

According to a second aspect of the present invention as set forth in the first aspect of the present invention, it may be adapted that the rotating member is a rotatory bearing ring of a rolling bearing unit or a member coupled and fixed to the rotatory bearing ring and rotated along with the rotatory bearing ring, wherein the rolling bearing unit comprises: the rotatory bearing ring rotated in a state of use; a stationary bearing ring which is not rotated even in the state of use; and a plurality of rolling elements provided between the stationary raceway and the rotatory raceway, said stationary raceway and said rotatory raceway residing on peripheral surfaces of the rotatory bearing ring and the stationary bearing ring opposed to each other, and wherein the computing unit calculates the relative displacement amount between the rotatory bearing ring and the stationary bearing ring.

According to a third aspect of the present invention as set forth in the second aspect of the present invention, it may be adapted that the relative displacement amount between the stationary bearing ring and the rotatory bearing ring is used for calculating a load operated between the stationary bearing ring and the rotatory bearing ring.

According to the invention, the displacement measuring apparatus and the load measuring apparatus of the rotating member calculate the displacement of the rotating member or the load applied to the rotating member as, for example, the displacement between the stationary bearing ring and the rotatory bearing ring, or the load applied between the two bearing rings similar to the above-described case of the previous invention. That is, when the load is operated between the two bearing rings, the two bearing rings are displaced relative to each other in accordance with the two stationary raceways and the rotatory raceways and the respective rolling elements. As a result, a positional relationship of the detected face of the encoder supported by the rotatory bearing ring and the stationary bearing ring or the detecting portion of the sensor supported by a portion of a suspension is changed.

According to a fourth aspect of the present invention as set forth in the second aspect of the present invention, it may be adapted that a pitch or a phase of the characteristic of the detected face of the encoder changed with respect to the circumferential direction is changed continuously with respect to a width direction of the detected face in response to a direction of a displacement to be detected.

According to the invention, when the pitch or the phase of the characteristic of the detected face of the encoder changed in the circumferential direction is continuously changed in response to a direction of operating the load to be detected, in a case in which the two bearing rings are displaced relative to each other based on the load, the pattern of changing the output signal of the sensor in accordance with rotation of the rotatory bearing ring (a period or a magnitude or the phase of the change) is changed. There is a correlative relationship between a degree of the change of the pattern and the magnitude of the load, and therefore, based on the pattern, the magnitude of the load, or the relative displacement amount of the two bearing rings can be calculated.

A combination of the encoder and the sensor is needed also for detecting a rotational speed of the rotatory bearing ring in order to carry out ABS or TCS (when embodied with regard to a rolling bearing unit for supporting a wheel). Further, even when embodied with regard to a machine tool, the combination is necessary for detecting a rotational speed of a spindle shaft. The displacement measuring apparatus and the load measuring apparatus of the rotating member of the invention can be constituted to calculate the load or the displacement by devising a structure necessary for detecting the rotation speed in this way and it is not necessary to integrate a new part to a portion of the rolling bearing unit. Therefore, the structure for calculating the load applied to the rolling bearing unit or displacement can be constituted to be small-sized and light-weighted.

Further, in the case of the invention, even when by a failure in integrating the encoder to the rotating member constituting the rotatory bearing ring or the member coupled to be fixed to the rotatory bearing ring and rotated along with the rotatory bearing ring, the detected face of the encoder is deflected in the width direction in accordance with rotation of the rotating member of the rotatory bearing ring or the like, or a pitch error is present with regard to the change in the characteristic of the detected face or the like, the displacement amount of the rotating member of the relative displacement amount of the rotatory bearing ring and the stationary bearing ring or the like, or the load applied to the rotating member can accurately be calculated. That is, in the case of the invention, the output signal of the sensor or the processing signal provided based on the output signal is subjected to the filtering process by the filter circuit, and the error component based on the error with regard to the change in the characteristic over the circumferential direction of the detected face of the encoder is erased. Therefore, regardless of whirling of the detected face based on the integration failure, or the pitch error of the change in the characteristic of the detected face, the displacement amount of the rotating member represented as the relative displacement amount of the two bearing rings or the like, and therefore, the load applied to the rotating member of the load applied between the two bearing rings can accurately be calculated.

According to a fifth aspect of the present invention as set forth in the fourth aspect of the present invention, it may be adapted that the detected face of the encoder is arranged with a first detected portion and a second detected portion having characteristics different from each other alternately and at equal intervals with respect to circumferential direction, in widths of the detected portions with respect to circumferential direction, the more on one side in the width direction of the detected face, the wider the width of the first detected portion, the more on other side in the width direction of the detected face, the wider the width of the second detected portion, the output signal of the sensor is a signal in a shape of a pulse or a signal in a shape of a sine wave changing a value with regard to a period or an amplitude in response to a difference of the widths between the first detected portion and the second detected portion with respect to the circumferential direction, the filter circuit performs the filtering process in response to a ratio with regard to the period or the amplitude to the filtering process, and the computing unit calculates the relative displacement amount based on a signal expressing the ratio with regard to the period or the amplitude passing the filter circuit.

According to the invention, when such a constitution is adopted, in accordance with the relative displacement of the two bearing rings based on the load applied between the rotary bearing ring and the stationary bearing ring, positions in the width direction of portions of the detected face to which the detected portion of the sensor is opposed are changed. Further, when in accordance with a variation in the load, the positions in the width direction of the portions of the detected face opposed to the detecting portion of the sensor are changed, a length in the circumferential direction of one detected portion in the two first and second detected portions to which the detecting portion is opposed is prolonged, and a length in the circumferential direction of other detected portion is shortened. Further, the period of changing the output signal of the sensor or the magnitude of changing the output signal of the sensor is changed in accordance with the lengths in the circumferential direction of the two first and second detected portions to which the detecting portion is opposed. Hence, when in the change of the output signal of the sensor, a ratio of a period or a magnitude of the change in response to the first detected portion to a period or a magnitude of the change in response to the second detected portion is calculated, a magnitude of a degree by which the center axes of the two bearing rings are eccentric in the diameter direction (or the displacement amount in the axial direction), and therefore, a magnitude of a radial load (or axial load) operated between the two bearing rings can be calculated.

According to a sixth aspect of the present invention as set forth in the fourth aspect of the present invention, it may be adapted that the detected face of the encoder is arranged with a plurality of combined portions for being detected at equal intervals over the circumferential direction, each of said combined portions for being detected including a pair of individualized portions having characteristics different from characteristics of other portions, intervals of the pairs of the individualized portions constituting the respective combined portions for being detected with respect to circumferential direction are continuously changed in the same direction with respect to the width direction of the detected face at all of the combined portions for being detected, a phase-change of the output signal of the sensor is changed in response to a position in the width direction of the detected face of the encoder, to which the detecting portions of the sensor is opposed, the filter circuit performs the filtering processing on the phase-change, and the computing unit calculates the relative displacement amount based on a signal expressing the phase of the change passing the filter circuit.

According to a seventh aspect of the present invention as set forth in the fourth aspect of the present invention, it may be adapted that a pair of the sensors installed in a state of disposing the respective detecting portions are provided at positions different from each other with respect to width direction of the detected face of the encoder, a boundary of changing the characteristic with respect to the circumferential direction is inclined with respect to the width direction at a portion of the detected face opposed to the detecting portion of at least one of the sensors, a phase-change of the output signal of at least one of the sensors is changed in response to a position in the width direction of the detected face of the encoder opposed to the detecting portion of the sensor, the filter circuit performs the filtering process on the phase-change, and the computing unit calculates the relative displacement amount based on a signal expressing the phase of the change passing the filter circuit.

According to a eighth aspect of the present invention as set forth in the fourth aspect of the present invention, it may be adapted that a plurality of the encoders and a plurality of the sensors opposing the respective detecting portions to the detected faces of the respective encoders are provided, characteristics of the detected faces of the respective encoders are changed alternately with respect to the circumferential direction and by the same pitch among the respective encoders, the pitch or the phase of the characteristic of the detected face of at least one piece of the encoder changed with respect to the circumferential direction is changed continuously with respect to a width direction of the detected face in response to a direction of a displacement to be detected, the filter circuit performs the filtering process on signals expressing phase differences among the output signals of the plurality of sensors, and the computing unit calculates the relative displacement amount based on the signals expressing the phase differences among the output signals of the respective sensors passing the filter circuit.

According to a ninth aspect of the present invention as set forth in the eighth aspect of the present invention, it may be adapted that the plurality of encoders having the detected faces are integrated respectively.

According to a tenth aspect of the present invention as set forth in the first aspect of the present invention, it may be adapted that the filter circuit is an adaptive filter.

According to the invention, when the adaptive filter is used as the filter circuit, a delay in a signal processing in accordance with resolving an error in measuring the displacement based on a deflection in the width direction of the detected face of the encoder is eliminated and various controls utilizing the displacement can swiftly be carried out.

That is, a variation displacement produced in accordance with an mounting error of the encoder relative to the rotatory bearing ring of an inclination or an eccentricity or the like becomes the error of the first order component of rotation. For example, a rotational speed of a rotation wheel of the rolling bearing unit for supporting a wheel of an automobile running at a vehicle speed of 40 km/h is about $300^{min-1}$ (5 Hz) and a frequency of the error of the rotation first order component becomes a frequency as low as about 5 Hz. Although an error component at such a low frequency can be removed by a high pass filter, in that case, a response delay is increased, and a control based on the calculated displacement (load) cannot swiftly be carried out. Therefore, although a problem is hardly posed when, for example, a control of a machine tool is carried out, in a case of carrying out a control for ensuring a running stability of an automobile, the response delay is not preferable. In contrast thereto, when the error component of the low frequency is removed by the adaptive filter, the response delay is eliminated, and the control based on the calculated displacement (load) can swiftly be carried out.

According to a eleventh aspect of the present invention as set forth in the tenth aspect of the present invention, it may be adapted that the adaptive filter is an adaptive filter using an LMS algorithm According to the invention, there is used a digital filter or an analog filter operated by an LMS (leas means square) algorithm (operation rule of minimizing a square mean error by a steepest descent method).

According to a twelfth aspect of the present invention as set forth in the tenth aspect of the present invention, it may be adapted that the adaptive filter is an adaptive filter using a synchronization type LMS algorithm.

According to the invention, an adaptive filter using a synchronization type LMS algorithm is used. When constituted in this way, a number of times of operation processings necessary for the detecting signal of the sensor at respective times (respective pulses) of changing the characteristic of the encoder is considerably reduced, and a processing by a low cost computing unit (CPU) a calculation speed of which is not particularly fast can sufficiently be carried out.

Further, also the error component caused by a fabrication error of the encoder can also be removed by the adaptive filter. That is, there is a periodicity also in the variation of the detecting signal of the sensor based on the fabrication error similar to the variation based on the integration error of the encoder. Further, an error in accordance with shifting a position in the circumferential direction of a boundary line at which the characteristic of the detected face is changed from a design value becomes an error of rotation n order component repeated at each time of on rotation of the rotary bearing ring. When the synchronization type LMS adaptive filter is used in this case, such an error component can effectively be removed. That is, according to the adaptive filter using the synchronization type LMS algorithm, all of errors of rotation n order components including the rotation 1 order component can be removed and also a calculation amount can be restrained to be small.

Further, when a step size parameter $\mu$ of the LMS adaptive filter is changed and the step size parameter $\mu$ is constituted by a small value after an elapse of a constant period of time, also the phase delay can be restrained to be extremely small. Further, even when a variation of the displacement (load) to be detected is transiently produced by a frequency the same as the rotation n order component of the error, so far as the step size parameter $\mu$ is reduced, the variation of the displacement (load) can be calculated. The reason is that the adaptive filter is installed in parallel with a main signal path for transmitting the output signal of the sensor to the computing unit, the processing for removing the error is carried out by subtraction, and therefore, as a result, the error component and the component to be detected can be processed even when the components are constituted by the frequency.

According to a thirteenth aspect of the present invention as set forth in the eleventh aspect of the present invention, it may be adapted that in starting the filtering process by the adaptive filter, a data expressed by the output signal or the processing signal inputted first to the adaptive filter is defined as an initial value of a filter coefficient of the adaptive filter.

According to the invention, in starting a correction operation for removing the rotation n order variation component by the adaptive filter, the data represented by the output signal or the processing signal first inputted to the adaptive filter can be assumed to be substantially equivalent to the data (average CD level) when an influence (noise) of the variation component is removed. Naturally, the data per se inputted first includes the noise, and therefore, the data is not strictly equal to the average DC level, however, when it is taken into consideration to use the data with an object of improving a convergence of the adaptive filter, the above-described assumption does not particularly pose a problem. That is, when the first inputted data is inputted as an initial value of all of filter coefficients, the initial value becomes a value near to a finally converged filter coefficient (a difference thereof from the finally converged filter coefficient becomes only the variation component).

As described above, by adopting a value proximate to an inherent (pertinent) filter coefficient as a first inputted filter coefficient (initial value of filter coefficient), the filter coefficient of the adaptive filter is converted to a proper value in a short period of time after starting the adaptive filter (starting filtering). Further, after converging the filter coefficient to the proper value, there is provided an accurate data with regard to the relative displacement of the rotatory bearing ring and the stationary bearing ring in which the error component included in the output signal of the sensor is removed (error is corrected). Therefore, when the load applied between the two bearing rings is calculated based on the relative displacement amount, by pertinently carrying out a control immediately after starting, the running stability of the automobile can be promoted.

Further, although the first inputted filter coefficient can be set by a first sampled single data, an average value of a plurality (1-th through k-th) data sampled immediately after starting can also be inputted to the adaptive filter as the initial value of the filter coefficient. However, when a number of pieces of data to be averaged (value of k) is excessively increased, a time period for calculating the initial value of the filter coefficient is required, a response delay is produced, the inherent object cannot be achieved, and therefore, the constitution is not preferable.

According to a fourteenth aspect of the present invention as set forth in the first aspect of the present invention, it may be adapted that the filter circuit includes at least one of a low pass filter and a notch filter.

According to the invention, for example, an error component by a disturbance other than an error caused by a portion of the rolling bearing unit of a shape error, a dimension error, an integration error or the like of a constituent member of the rolling bearing unit naturally constitutes an error component asynchronous with rotation of the rotatory bearing ring. For example, electric noise or magnetic flux noise, sensor vibration by road surface vibration or the like corresponds thereto. In a normal case, the error component asynchronous with the rotation becomes a comparatively high frequency, and therefore, by a low pass filter, the response delay can be restrained to a nonproblematic degree to remove. The lowpass filter used in this case may be a filter of a rotation order number following type or may be a filter of a frequency fixed type.

In contrast thereto, when the frequency of the error component is constant, the error component can be removed by the notch filter. For example, a resonance frequency of a portion present on a road surface side of a spring integrated to a suspension or an automobile (so-to-speak under spring) becomes a degree of 15 through 25 Hz. When the sensor is vibrated by the resonance under spring and an error component is mixed to the detecting signal of the sensor, the notch frequency of the filter is previously matched to the resonance frequency. In this case, as the notch filter, the frequency fixed type is used.

On the other hand, there is also a possibility of mixing an error component in the detecting signal of the sensor based on a vibration having a constant rotation order number as in a vibration caused by a shape error of a rolling element constituting a rolling bearing unit. When a number of respective rolling elements constituting the rolling bearing unit is designated by notation Z, a contact angle is designated by notation $\alpha$, a diameter of the same is designated by notation D, a pitch circle diameter of the same is designated by notation d, a revolving speed of the same is designated by $\omega_c$, a rotational speed of an inner ring constituting a rotatory bearing ring is designated by $\omega_r$, $\omega_c = (1 - d \cdot \cos \alpha/D) \cdot (\omega_r/2)$, a vibration by a rolling element becomes a revolving order number component of $nZ\omega_c$, $0.5\, nZ\omega_c$, $n\omega_c$, $0.5\, n\omega_c$ or the like. A relationship between the rotational speed $\omega_r$ of the inner ring constituting the rotatory bearing ring and the revolving speed $\omega_c$ of each rolling element becomes as shown by the above equation, and therefore, after converting a vibration frequency of each rolling order number into a rotation order number of the rotatory bearing ring, a frequency of an error component to be removed by the notch filter is set. In this case, the notch filter of the rotation order number following type is used.

According to a fifteenth aspect of the present invention as set forth in the tenth aspect of the present invention, it may be adapted that the adaptive filter and at least one of the low pass filter and the notch filter are provided in series with each other and the adaptive filter is provided in front of at least one of the low pass filter and the notch filter.

According to the invention, the adaptive filter is arranged at a prestage of at least either one filter of the low pass filter and the notch filter.

By arranging the adaptive filter, and at least either one of the low pass filter and the notch filter in series with each other in this way, the error component mixed to the detecting signal of the sensor can excellently be removed over a wide range. Further, the adaptive filter is arranged on a side of a prestage of the other filter, and therefore, a time period required for converging the filter coefficient of the adaptive filter is not prolonged by using the other filter.

Further, a filtering processing by the above-described respective filters may be carried out for a data with regard to a duty ratio of the output signal of the sensor, or a data with regard to the phase difference, or a series of filtering processings may be carried out for a data with regard to a period or a frequency (speed) of the output signal and the duty ratio, or the phase difference may be outputted from a filtered result. In any of the cases, regardless of the whirling of the detected face of the encoder based on the integration error or the like, vibration of the sensor or the like, the relative displacement amount of the two stationary side and the rotatory bearing rings, and therefore, the load applied between the two bearing rings can accurately be calculated.

According to a sixteenth aspect of the present invention as set forth in the fourteen aspect of the present invention, it may be adapted that a cutoff frequency of at least one of the low pass filter and the notch filter is changed in accordance with a rotating speed of the rotating member.

According to the invention, regardless of a change in the rotational speed of the rotating member, regardless of whirling of the detected face based on an integration failure of an encoder, a pitch error of the change in the characteristic of the detected face or the like, the displacement amount of the rotating member, and therefore, a load applied to the rotating member can accurately be calculated.

According to a seventeenth aspect of the present invention as set forth in the second aspect of the present invention, it may be adapted that the rolling bearing unit is a double row rolling bearing unit providing respective double rows of the stationary raceway surfaces and the rotatory raceway surfaces at pairs of peripheral surfaces of the rotatory bearing ring and the stationary bearing ring opposed to each other According to the invention, by providing the rolling elements arranged in double rows with contact angles in directions reverse to each other (back face integration type or front face integration type), the double row rolling bearing unit obtains a sufficient rigidity, further, the stationary bearing ring and the rotatory bearing ring are displaced by an amount in accordance with the magnitude of the load in the direction of the load operated between the two bearing rings. Therefore, when the invention described in Claim 2 is embodied with regard to the double row rolling bearing unit, the direction and the magnitude of the load can pertinently be measured.

According to a eighteenth aspect of the present invention as set forth in the seventeenth aspect of the present invention, it may be adapted that the rolling bearing unit is a rolling bearing unit for supporting a wheel, an outer ring constituting the stationary bearing ring is supported by and fixed to a suspension and a hub constituting the rotatory bearing ring supports and fixes the wheel and is rotated along with the wheel in a state of use, a plurality of the rolling elements are provided for respective rows between outer ring raceways of double rows respectively constituting the stationary raceways residing at an inner peripheral surface of the outer ring and inner tracks of double rows respectively constituting rotatory raceways residing at an outer peripheral surface of the hub, and a flange supporting and fixing the wheel is provided at an outer edge portion in an axial direction of the hub.

According to the invention, load applied to the wheel can be calculated and can be utilized for a control for ensuring the running stability.

According to a nineteenth aspect of the present invention as set forth in the seventeenth aspect of the present invention, it may be adapted that the encoder is supported by and fixed to a portion of the rotatory bearing ring and an interval portion of the rotatory raceway surfaces of double rows concentrically with the rotatory bearing ring.

According to a twentieth aspect of the present invention as set forth in the seventeenth aspect of the present invention, it may be adapted that the encoder is supported by and fixed to an edge portion of the rotatory bearing ring concentrically with the rotatory bearing ring.

According to a twenty-first aspect of the present invention as set forth in the eighteenth aspect of the present invention, it may be adapted that a member rotated along with the rotatory bearing ring is a disk rotor constituting a disk brake in a state of being coupled and fixed to the hub, and an outer peripheral surface of the disk rotor is used as the detected face.

According to a twenty-second aspect of the present invention as set forth in the eighteenth aspect of the present invention, it may be adapted that a member rotated along with the rotatory bearing ring is a constant-velocity joint coupled and fixed to the hub, and an outer peripheral surface of a portion of the constant-velocity joint is used as the detected face.

According to the invention, the detected face and the sensor opposed to the detected face can be installed at a wide space portion outside of the double row rolling bearing unit. Therefore, even when the double row rolling bearing unit is small-sized and a space capable of installing the detected face and the sensor is not present at inside thereof, the load applied to the double row rolling bearing unit can be measured.

According to a twenty-third aspect of the present invention as set forth in the second aspect of the present invention, it may be adapted that the rolling bearing unit is used so as to rotatably support a main spindle of a machine tool with respect to a housing, in a state of use, an outer ring constituting the stationary bearing ring is inwardly fitted and fixed to the housing or a portion fixed to the housing, and an inner ring constituting the rotatory bearing ring is outwardly fitted and fixed to the main spindle or a portion rotated along with the main spindle.

According to the invention, by measuring the load applied to the main spindle, the speed of feeding the tool supported by the main spindle can properly be controlled.

According to a twenty-fourth aspect of the present invention, it may be adapted that A load measuring apparatus of a rotating member comprises:

an encoder supported by a portion of a rotating member concentrically, said encoder changing a characteristic of a detected face thereof alternately with respect to circumferential direction;

a sensor supported by a portion which is not rotated in a state where a detecting portion thereof is opposed to the detected face, said sensor changing an output signal thereof with respect to the characteristic of the detected face;

a filter circuit performing a filtering process on the output signal of the sensor or a processing signal obtained based on the output signal, said filter circuit erasing an error component based on an error with regard to the change in the characteristic of the detected face over a circumferential direction in a variation of the output signal or the processing signal; and a computing unit calculating a displacement amount of the rotating member based on the output signal or the processing signal on which the filtering process is performed by the filter circuit, said computing unit being provided with a function of calculating the relative displacement amount based on a pattern of changing the output signal or the processing signal passing through the filter circuit.

BRIEF DESCRIPTION OF THE DRAWINGS

FIG. 7A to 7B illustrate a perspective view and a front view showing a second example of an encoder integrated to Embodiment 2 of the invention;

FIG. 29A to 29B illustrate a side view and a plane view of an encoder showing Embodiment 11 of the invention;

DETAILED DESCRIPTION OF EXEMPLARY EMBODIMENTS

Exemplary embodiments of the present invention will hereinafter be described in detail by reference to the accompanying drawings.

Embodiment 1

FIGS. 1 through 7 show Embodiment 1 of the invention in response to Claims 1 through 5, 10, 12, 17, 18, 20, 24. A rolling bearing unit attached with a displacement measuring apparatus (or attached with a load measuring apparatus) of the embodiment includes a rolling bearing unit 1 for supporting a wheel and a displacement measuring apparatus 2 (or a load measuring apparatus) having a function also as a rotational speed detecting apparatus.

Figure 1:
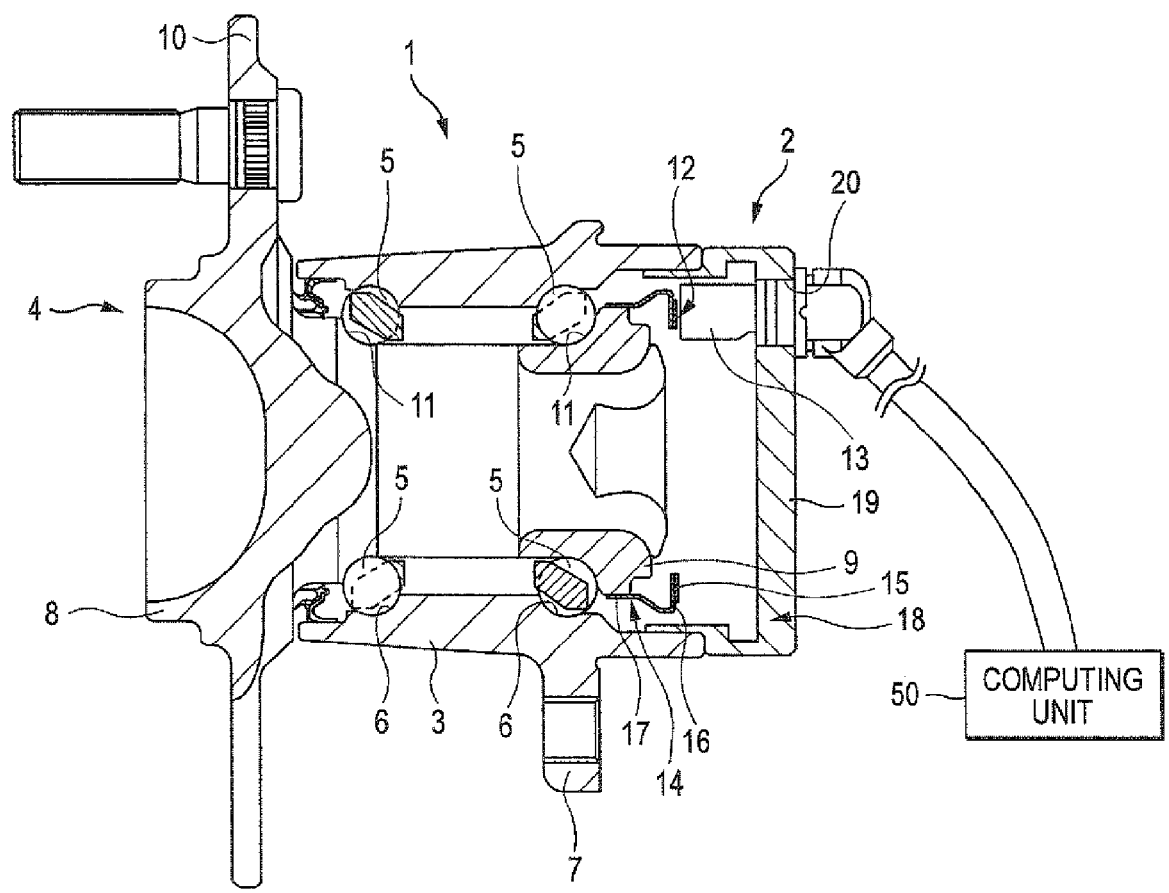
FIG. 1 is a sectional view showing Embodiment 1 of the invention.

As shown by FIG. 1, the rolling bearing unit for supporting the wheel 1 includes an outer ring 3, a hub, a plurality of rolling elements 5, 5. The outer ring 3 is a stationary bearing ring supported to be fixed by a suspension in a state of use, and an inner peripheral surface thereof is provided with double rows of outer ring raceways 6, 6 and an outer peripheral surface thereof is provided with an mounting portion 7 in a shape of an outward directed flange for coupling to the suspension, respectively. Further, the hub 4 is a rotatory bearing ring rotated along with a wheel by supporting to fix the wheel in the state of use and is constituted by combining to fix a hub main body 8 and an inner wheel 9. The hub 4 is provided with a flange 10 for supporting to fix the wheel at an outer edge portion (an end portion constituting an outer side in a width direction of a vehicle body in a state of being integrated to the suspension) in an axial direction of the outer peripheral surface, and provided with double rows of inner ring raceways 11, 11 at a middle portion in the axial direction and an outer peripheral surface of the inner ring 9, respectively. Respective pluralities of pieces of the rolling elements 5, 5 are provided between the respective inner ring raceways 11, 11 and the respective outer ring raceways 6, 6 rollably in a state of being applied with a prepressure to rotatably support the hub 4 on an inner diameter side of the outer ring 3 concentrically with the outer ring 3. Further, although in the illustrated example, balls are used as the rolling elements, in a case of a rolling bearing unit for supporting a wheel of a vehicle having a heavy weight, there is also a case of using conical rollers as the respective rolling elements. Although in a structure of using the balls as the rolling elements, in comparison with a structure of using the conical rollers similarly, an amount of displacing the outer wheel and the hub can be increased, even in the case of a structure of using the conical rollers as the rolling elements, although the displacement amount is small, the outer ring and the hub are displaced, and therefore, the structure can constitute an object of the invention.

On the other hand, as shown by FIG. 1, the displacement measuring apparatus 2 includes an encoder 12, a sensor 13, and a computing unit 50.

The encoder 12 is constituted by a support plate 14 and an encoder main body 15. According to the support plate 14, by bending to form a magnetic metal plate of a mild steel plate or the like, a circular ring portion 16 and a cylinder portion 17 are made to be continuous by an inclined portion, a sectional shape thereof is substantially constituted by a J-like shape, and a total thereof is constituted by a circular ring shape. Further, the encoder main body 15 is made by a permanent magnet of a rubber magnet, a plastic magnet or the like, constituted by a circular ring shape in a total thereof, and is attached to be fixed to an inner side face in the axial direction of the circular ring portion 16 concentrically with the cylinder portion 17.

Figure 2:
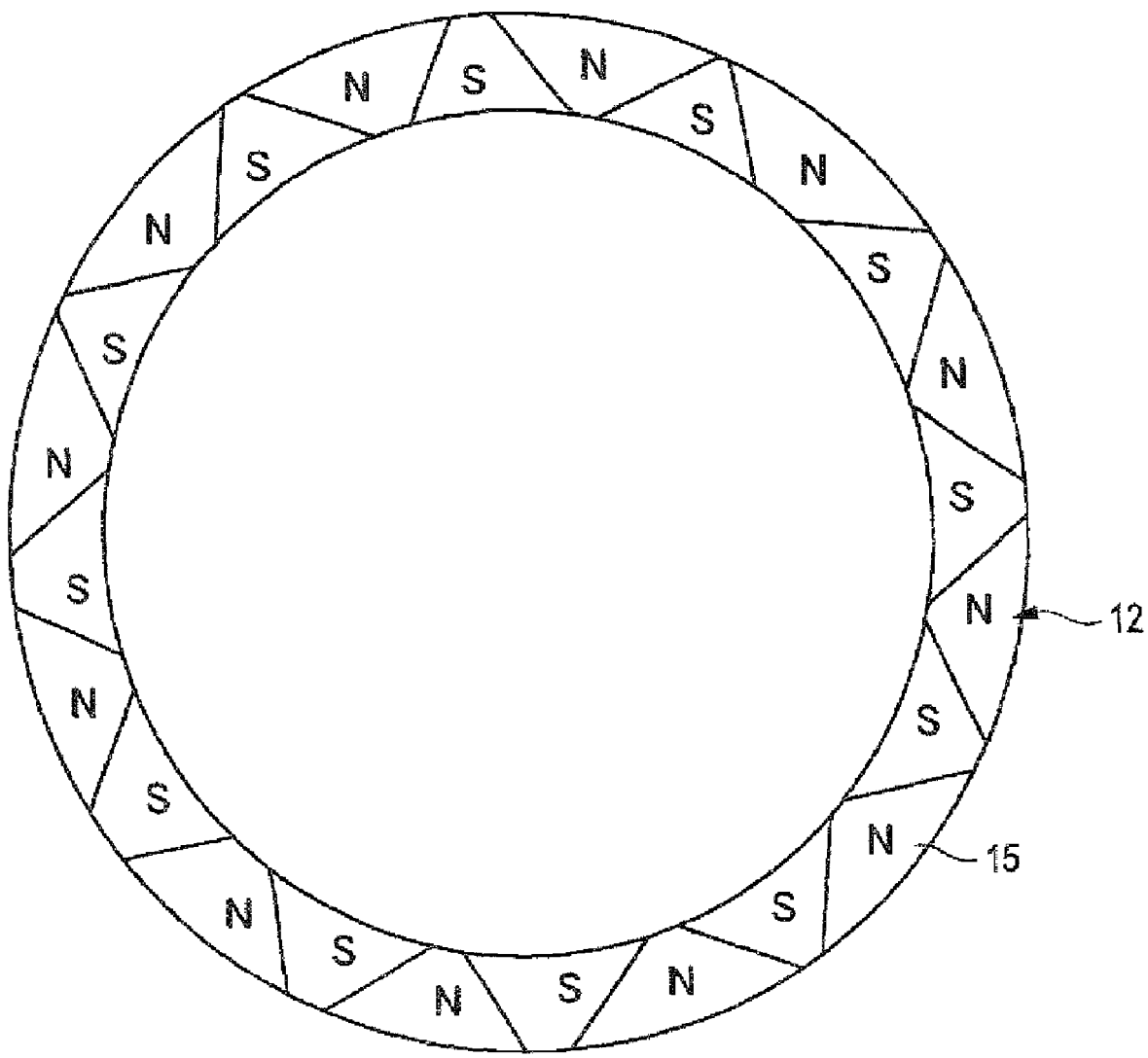
FIG. 2 is a view taking out an encoder main body to be viewed from a right side of FIG. 1.

The permanent magnet constituting the encoder main body 15 is magnetized in the axial direction, and a magnetizing direction thereof is made to be changed alternately and at equal intervals over a circumferential direction. Therefore, the inner side face in the axial direction of the encoder main body 15 constituting the detected face is arranged with N poles and S poles alternately and at equal intervals. In the case of the embodiment, portions magnetized in N poles and portions magnetized in S poles correspond to a first detected portion and a second detected portion present at the detected face of the encoder 12 and having properties different from each other. Further, as shown by FIG. 2, in widths in a circumferential direction of the portion magnetized in the N pole and the portion magnetized in the S pole, the more outer side in a diameter direction the wider the width of the portion magnetized in the N pole, and the more inner side in the diameter direction, the wider the width of the portion magnetized in the S pole.

According to the encoder 12 constituted as described above, by outwardly fitting the cylinder portion 17 of the support plate 14 to an inner end portion in the axial direction of the inner ring 9 by tight fitting, the cylinder portion 17 is coupled to be fixed to the inner end portion in the axial direction of the hub 4 concentrically with the hub 4. In the state, an inner side face in the axial direction of the encoder main body 15 is disposed on an imaginary plane orthogonal to a center axis of the hub 4.

On the other hand, the sensor 13 is supported by and fixed to an inner end portion in the axial direction of the outer ring 3 by way of a cover 18. The cover 18 is formed in a shape of a bottomed cylinder by subjecting a synthetic resin to injection molding, or drawing to form a metal plate, and fitted to be fixed to the inner end portion of the outer ring 3 in a state of closing an inner end opening portion of the outer ring 3. A bottom plate portion 19 constituting the cover 18 is formed with an mounting hole 20 at a portion of a portion of the bottom plate portion 19 proximate to an outer diameter thereof and a portion opposed to the detected face of the encoder 12 in a state of penetrating the bottom plate portion 19 in the axial direction.

The sensor 13 is supported by and fixed to the bottom plate portion 19 in a state of inserting the mounting hole 20 from an inner side to an outer side in the axial direction. Further, a detecting portion provided at a front end face (left end face of FIG. 1) of the sensor 13 is closely opposed to the detected face of the encoder 12 by way of a measurement clearance of about 0.5 through 2 mm. Further, the detecting portion of the sensor 13 constituting an active type magnetic sensor is provided with a magnetism detecting element of a Hole element, a magnetoresistive element or the like. A property of the magnetism detecting element is changed by a state of being opposed to the N pole and a state of being opposed to the S pole. Therefore, when the encoder 12 is rotated along with the hub 4, the property of the magnetism detecting element is changed, and an output signal of the sensor 13 is changed.

In this way, a period (frequency) of changing the output signal of the sensor 13 is changed in accordance with the rotational speed of the hub 4. Specifically, the faster the rotational speed, the shorter the period of changing the output signal, and the higher the frequency is changed. Therefore, when the output signal is transmitted to a controller, not illustrated, provided on the vehicle body side or the like, a control of ABS or TCS can be carried out by calculating the rotational speed of the wheel rotated along with the encoder 12. The point is similar to similar to that of a technology known in the background art.

Particularly, in the case of the embodiment, by a relative displacement in a diameter direction of the hub 4 and the outer ring 3 based on a radial load operated between the hub 4 and the outer ring 3, a pattern of changing the output signal is changed, and therefore, by observing the pattern, a relative displacement amount in the diameter direction between the hub 4 and the outer ring 3, further, the radial load can be calculated. An explanation will be given of the point in reference to FIGS. 3 through 5.

First, an explanation will be given of a premise by which the radial load is calculated. As described in Patent Reference 1 mentioned above, the relative position in the diameter direction between the outer ring 3 and the hub 4 is changed in accordance with a magnitude of the radial load applied between the outer ring 3 and the hub 4. The reason is that based on the radial load, plastic deformation amounts of the respective rolling elements 5, 5 as well as the respective outer ring raceways 6, 6 and the respective inner ring raceways 11, 11 with which rolling faces of the respective rolling elements 5, 5 are brought into rolling contact are changed. In the case of the background art described in Patent Reference 1 mentioned above, the displacement amount in the diameter direction between the outer ring and the hub is directly measured by the displacement sensor, and based on the displacement amount, the radial load applied between the outer ring and the hub is calculated. In contrast thereto, in the case of the embodiment, based on the relative displacement of the encoder 12 and the sensor 13, the relative displacement amount between the outer ring 3 and the hub 4, and the magnitude of the radial applied between the outer ring 3 and the hub 4 are calculated. The point will be explained as follows.

Assume that when a standard radial load (standard value) is applied between the outer ring 3 and the hub 4, the detecting portion of the sensor 13 is opposed to a center portion in the diameter direction of the detected face of the encoder 12. In this case, the detecting portion of the sensor 13 scans the sensor portion in the diameter direction of the detected face designated by a chain line α in FIG. 3. At the center portion in the diameter direction, a width in a peripheral direction of the portion magnetized in the N pole and a width in the peripheral direction of the portion magnetized in the S pole are equal to each other, and therefore, as shown by FIG. 4A, the output signal of the sensor 13 is deviated to both sides by the same amount centering on a reference voltage (for example, 0 V). That is, a period $T_H$ by which the voltage of the output signal becomes higher than the reference voltage and a period $T_L$ by which the voltage of the output signal becomes lower than the reference voltage are equal to each other ($T_H=T_L$). Further, also a difference $\Delta V_H$ between a maximum value of the voltage of the output signal and the reference voltage and a difference $\Delta V_L$ between a minimum value thereof and the reference voltage are equal to each other ($\Delta V_H=\Delta V_L$).

In contrast thereto, when the radial load applied between the outer ring 3 and the hub 4 becomes larger than the standard value, a position of the outer ring 3 relative to the hub 4 is shifted to a lower side, and the detecting portion of the sensor 13 is opposed to a portion proximate to an inner side in the diameter direction of the detected face of the encoder 12. In this case, the detecting portion of the sensor 13 scans the portion proximate to an inner side in the diameter direction of the detected face designated by a chain line β in FIG. 3. At the portion proximate to the inner side in the diameter direction, a width in a peripheral direction of the portion magnetized in the N pole becomes narrower than a width in the peripheral direction of the portion magnetized in the S pole, and therefore, as shown by FIG. 4B, the detecting portion of the sensor 13 is considerably deviated to a lower side centering on the reference voltage (for example, 0 V). That is, the period $T_L$ by which the voltage of the output signal becomes lower than the reference voltage becomes larger than the period $T_H$ by which the voltage of the output signal becomes higher than the reference voltage ($T_H<T_L$). Further, the difference $\Delta V_L$ between the minimum value of the voltage of the output signal and the reference voltage becomes larger than the difference $\Delta V_H$ between the maximum value and the reference voltage ($\Delta V_L>\Delta V_H$).

Further, when the radial load applied between the outer ring 3 and the hub 4 becomes smaller than the standard value conversely to the above-described case, the position of the outer ring 3 relative to the hub 4 is shifted to an upper side, and the detecting portion of the sensor 13 is opposed to a portion proximate to an outer side in the diameter direction of the detected face of the encoder 12. In this case, the detecting portion of the sensor 13 scans the portion proximate to the outer side in the diameter direction of the detected face. At the portion proximate to the outer side in the diameter direction, the width in the peripheral direction of the portion magnetized in the N pole is wider than the width in the peripheral direction of the portion magnetized in the S pole, and therefore, as shown by FIG. 4C, the output signal of the sensor 13 is considerably deviated to the higher side centering on the reference voltage (for example, 0 V). That is, the period $T_H$ by which the voltage of the output signal becomes higher than the reference voltage becomes larger than the period $T_L$ by which the voltage of the output signal becomes higher than the reference voltage ($T_H>T_L$). Further, the difference $\Delta V_H$ between the maximum value of the voltage of the output signal and the reference voltage becomes larger than the difference $\Delta V_L$ between the minimum value and the reference value ($\Delta V_H>\Delta V_L$).

Therefore, when the pattern of the output signal of the sensor 13 is viewed, a degree of shifting a center axis of the outer ring 3 and a center axis of the hub 4 (diameter direction displacement amount) can be calculated. Specifically, when a ratio of the period $T_H$ during which a potential of the output signal becomes higher than the reference voltage to the period $T_L$ during which the potential of the output signal becomes lower than the reference voltage "$T_H/T_L$" is observed, the degree of shifting the center axis of the outer ring 3 and the center axis of the hub 4 (diameter direction displacement amount) can be calculated. Or, a diameter direction displacement amount can be calculated also by observing a ratio "$\Delta V_H/\Delta V_L$" of the difference $\Delta V_H$ between the maximum value of the voltage of the output signal and the reference voltage to the difference $\Delta V_L$ between the minimum value and the reference value. Relationships between the respective ratios "$T_H/T_L$", "$\Delta V_H/\Delta V_L$" and the diameter direction displacement amount are easily calculated since the relationships are substantially linear for either of the ratios. Further, the calculated relationships are integrated into a software installed to a computing unit 50 (microcomputer) for calculating the radial load. Further, there is a case in which the sensor 13 is integrated with a waveform forming circuit, and the output signal of the sensor 13 is made to constitute a rectangular wave changed in pulses. In this case, although the diameter direction displacing amount cannot be calculated based on the ratio of the voltages "$\Delta V_H/\Delta V_L$", the diameter direction displacement amount can be calculated by the ratio of the periods "$T_H/T_L$" similar to a case that the output signal is a sine wave.

Figure 5:
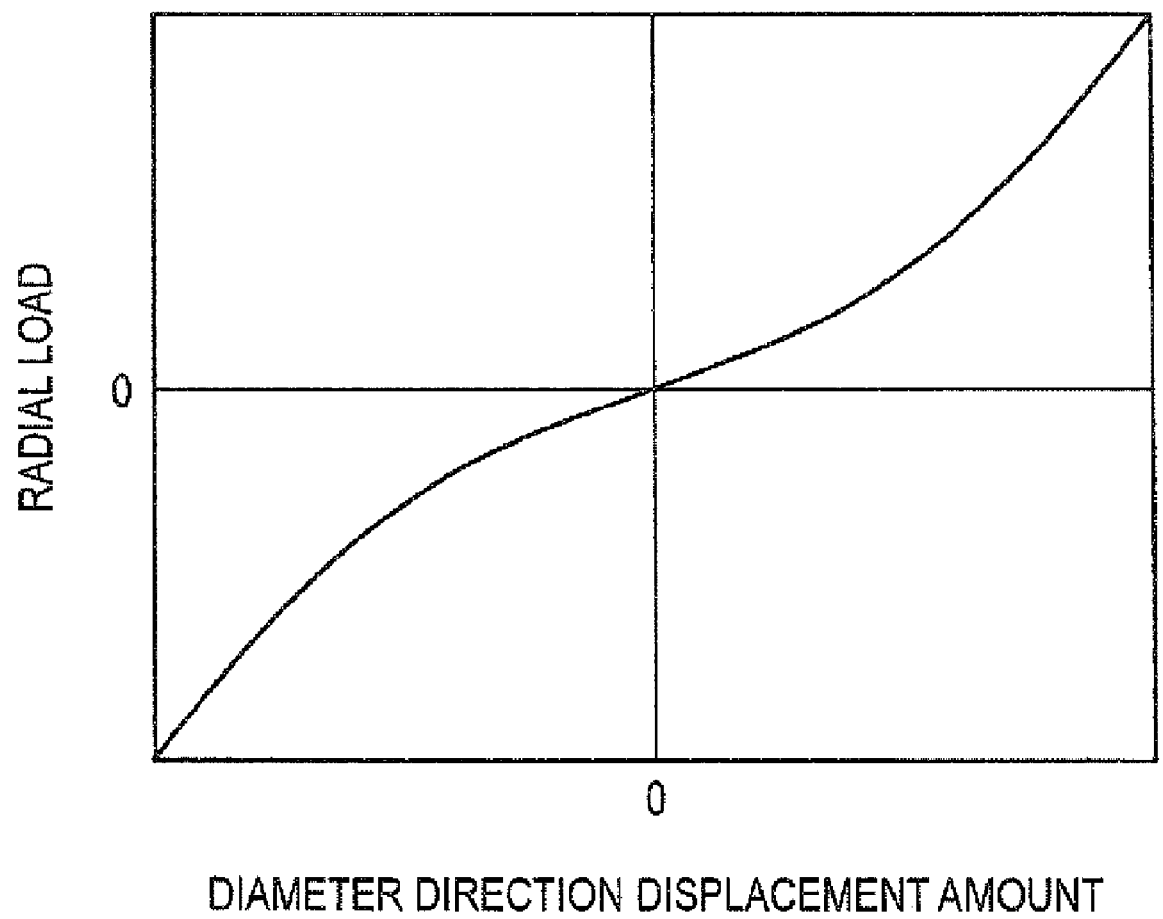
FIG. 5 is a diagram showing a first example of relationship between a displacement in a diameter direction of an outer ring and a hub and a radial load.

Further, a relationship between the diameter direction displacement amount and the radial load can be calculated by a calculation or an experiment. When calculated by a calculation, the relationship is calculated based on a theory widely known in a technical field of the rolling bearing unit based on various elements of the rolling bearing unit, that is, materials of the outer ring 3 and the hub 4 in addition to radii of curvature of sections of the respective outer ring raceways 6, 6 and the respective inner ring raceways 11, 11, numbers and diameters of the respective rolling elements 5, 5. Further, when calculated by an experiment, a relative displacement amount in the diameter direction of the outer ring 4 and the hub 4 is measured while applying radial loads having different magnitudes respectives of which are already known. In either of the cases, with regard to the diameter direction displacement amount and the magnitude of the radial load, a relationship as shown by FIG. 5 is calculated and is integrated to the software. Further, it is also possible to directly calculate the relationship between the radial load and either of the ratios and integrate the relationship in the software.

Figure 6:
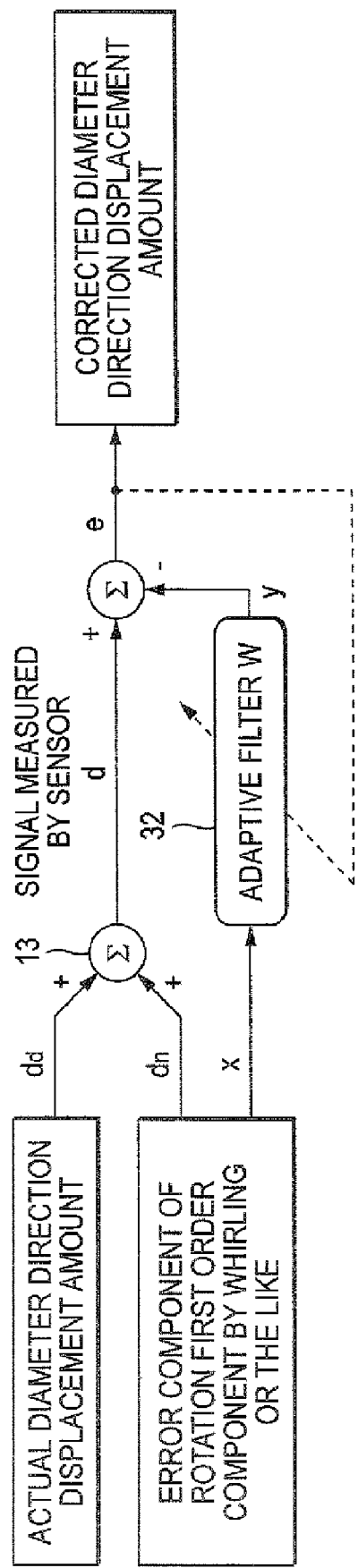
FIG. 6 is a block diagram of an adaptive filter for subjecting a data based on an output signal of a sensor to a filtering process.

As described above, in the case of the embodiment, based on either of the ratios "$T_H/T_L$", "$\Delta V_H/\Delta V_L$", the displacement amount in the diameter direction of the center axis of the outer ring 3 and the center axis of the hub 4 (or the radial load) is calculated, however, in order to accurately calculate the displacement amount, as described above, it is necessary that an accuracy of the detected face of the encoder 12 is excellent. In contrast thereto, as described above, there is a case in which the accuracy with regard to a position of a boundary portion at which a property of the detected face is changed is not necessarily sufficient by the error of integrating the encoder 12 to the hub 4 or the like. Hence, the error with regard to the position of the boundary portion is removed by processing data with regard to either of the ratios "$T_H/T_L$", "$\Delta V_H/\Delta V_L$" by an adaptive filter 32 as shown by FIG. 6. The adaptive filter 32 uses an LMS algorithm. An explanation will be given as follows of operation of the adaptive filter 32 centering on a case of removing an error of a first component of rotation by whirling or the like by the error of integrating the encoder 12 to the hub 4.

The width of the boundary of the S pole and the N pole present at the detected face of the encoder 12 at a portion thereof to which the detecting portion of the sensor 13 is opposed becomes ($d_d+d_n$) constituted by superposing an amount $d_d$ changed in accordance with actually displacing the encoder 12 relative to the sensor 13 in the diameter direction, and the error component $d_n$ of the first component of rotation by the whirling or the like. That is, a signal d based on the output signal of the sensor 13 becomes the signal d ($=d_d+d_n$) constituted by adding together the signal $d_d$ expressing an amount of actually displacing in the diameter direction and the error component $d_n$. Therefore, the actual displacement amount $d_d$ is calculated when the variation amount $d_n$ is subtracted (reduced) from the output signal d by the adaptive filter 32.

On the other hand, in order to operate the adaptive filter 32, there is needed a reference signal x having a correlation with the variation amount $d_n$ based on the whirling. When the reference signal x can be obtained, the adaptive filter 32 forms an finite impulse response (FIR) filter (a filter having a limited impulse response time=a filter nullifying an impulse response in a limited time period) having a characteristic the same as a transfer characteristic of an actual signal flow "$d_n \rightarrow d$" by self learning. Further, when a cancel signal {=y(k) mentioned later} provided as a result of a calculation by the adaptive filter 32 is subtracted from the output signal d of the sensor 13, the operation becomes equivalent to that the variation amount $d_n$ by the whirling is removed from the output signal d of the sensor 13 ($d-d_n$). When the variation amount $d_n$ is removed in this way, the adaptive filter 32 does not filter the output signal d transmitted on a main route of the signal (upper half portion of FIG. 6) but calculates a cancel signal y for removing the variation amount $d_n$ based on a reference signal x transmitted on a sub route (lower half portion of FIG. 6). Further, only the cancel signal y is subtracted from the output signal d constituting the main route, and therefore, a response delay of the output signal d is not brought about.

In the case of the embodiment, the reference signal x is self-generated by a processing circuit of the output signal of the sensor 13 opposed to the encoder, or a processing circuit for calculating the displacement amount in the diameter direction of the center axis of the outer ring 3 and the center axis of the hub 4 (further, the radial load from the displacement amount) based on a number of times of changes in the characteristic of the encoder 12 in one rotation. Therefore, cost required for generating the reference signal x can be reduced. That is, when a structure of an active noise control which is generally known as a use of the adaptive filter in the background art is applied to a structure for accurately calculating the displacement amount as it is, the whirling of the encoder 12 is detected by a separately provided sensor of a displacement sensor, a rotational speed sensor or the like, and a detecting signal of the sensor is used as the reference signal x of the adaptive filter 32. Naturally, although the invention can be embodied also in such a structure, by an amount of providing the sensor separately, cost and an installing space are needed.

In contrast thereto, in the case of the embodiment, the reference signal x is obtained without using the detecting signal of such a separately provided sensor, and by the adaptive filter 32, the variation amount $d_n$ of the output signal d of the sensor 13 based on whirling of the encoder 12 is reduced. That is, a number of times of changes in the characteristic in one rotation of the encoder 12 (numbers of S poles and N poles) is previously known. Therefore, by observing a pulse number of one rotation of the encoder 12, without particularly providing separately the sensor of the displacement sensor, the rotational speed sensor or the like, the reference signal x correlated to the variation amount $d_n$ can be generated. Specifically, an influence of whirling of the encoder 12 is constituted by a waveform having a main component of a first order of rotation, for example, when the encoder 12 is of 60 pulses per rotation, the waveform can be self-generated as a sine wave, a triangular wave, a sawtooth wave, a rectangular wave, a pulse wave or the like constituting one period by 60 data.

The waveform of the reference signal x can be generated by a processing circuit (CPU) for calculating the displacement amount in the diameter direction of the center axis of the outer ring 3 and the center axis of the hub 4 (further, the radial load), or can be calculated by an electronic circuit portion (IC) belonging to the sensor 13. In either of the cases, the cancel signal y calculated based on the obtained reference signal x is subtracted from the output signal d of the sensor 13 to calculate a modified signal e {=e(k) mentioned later} expressing the actual displacement amount $d_d$. The modified signal e calculated in this way is transmitted to the processing circuit for calculating the displacement amount (radial load) to calculate the displacement amount (radial load) and utilized also as information for self learning by the adaptive filter 32.

Further, the processing of the portion of the adaptive filter 32 for calculating the cancel signal and providing the modified signal e by subtracting the cancel signal y from the output signal d of the sensor 13 is carried out based on Equations (1) through (3) as follows.

[Equation 1]

$$y(k) = \sum_{i=0}^{N-1} w_k(i) \cdot x(k-i) \quad (1)$$

[Equation 2]

$$e(k)=d(k)-y(k) \quad (2)$$

[Equation 3]

$$w_{k+1}(i)=w_k(i)+2\mu \cdot e(k) \cdot x(k-i) \quad (3)$$

In Equations (1) (2) (3) described above, notation k designates a data number in a time sequence, notation n designates a tap number of the FIR filter used as the adaptive filter 32. Further, notation w designates a filter coefficient of the FIR filter, notation Wk designates a filter coefficient used in a case of processing k-th data, notation $W_{k+1}$ designates a filter coefficient used in a case of processing a successive data sequence ((k+1)-th), respectively. That is, the FIR filter becomes the adaptive filter the filter coefficient of which is properly updated successively by Equation (3)

Further, the reference signal x inputted to the adaptive filter 32 may be a signal correlated to rotation n-order (n is a positive integer) component represented by the whirling or the like of the encoder 12, and therefore, the reference signal x may be constituted by a signal of 1 pulse per rotation. Hence, assume a case in which the reference signal x is a 1 impulse signal, at the same time, the tap number N of the adaptive filter 32 is equal to a number of pulses per rotation of the encoder 12. In this case, the reference signal x used in a calculation at an instance of the time sequence k is represented by Equation (4) as follows.

[Equation 4]

$$[x(k), x(k-1), x(k-2), \ldots, x(k-j), \ldots,$$
$$x(k-N+1)] = [\overset{0}{0}, \overset{1}{0}, \overset{2}{0}, \ldots, \overset{j}{1}, \ldots, \overset{N-1}{0}] \quad (4)$$

In Equation (4), a position j at which the reference signal x becomes an impulse of a value 1 is shifted piece by piece to a right side in accordance with advancing the time sequence k, and when shifted to "N−1"-th of the rightist side, at a successive time sequence, a new impulse value is expressed at 0-th of the leftist side. That is, the reference signal x becomes a data row for only circulating the position of the impulse of the value 1 from 0-th to (N−1)-th. When Equation (4) is applied to Equations (1) (3) mentioned above, Equations (5) (6) are provided as follows.

[Equation 5]

$$y(k) = \sum_{i=0}^{N-1} w_k(i) \cdot x(k-i) = w_k(j) \cdot x(k-j) = w_k(j) \quad (5)$$

[Equation 6]

$$w_{k+1}(j) = w_k(j) + 2\mu \cdot e(k) \cdot x(k-j) = w_k(j) + 2\mu \cdot e(k) \quad (6)$$

Whereas when the adaptive filter is operated by the normal LMS algorithm which is not a synchronization equation, as described above, it is necessary to repeat equations shown in respective Equations (1) (2) (3), when the adaptive filter is operated by the synchronization type LMS algorithm, only calculations shown in Equations (5) (6) and Equation (2) may be carried out. For example, in a case of constituting the tap number N of the adaptive filter 32 by 60, when the adaptive filter 32 is operated by the normal LMS algorithm, a total of a number of times of operations per pitch of the encoder 12 is constituted by a total of 241 times of 120 times of multiplication in Equation (1), one time of subtraction by Equation (2), 180 times of 120 times of multiplication and 60 times of addition by Equation (3). In contrast thereto, when the adaptive filter 32 is operated by the synchronization type LMS algorithm, Equation (5) is operated only by switching data, one time of subtraction by Equation (2) without operation, 2 times of one time of multiplication and one time of addition by Equation (6), and a total of 3 times of four operations may be carried out for each pulse of the encoder 12. That is, by adopting a synchronization type as the LMS algorithm, in comparison with a case of not adopting the synchronization equation, a number of times of operations can be reduced to about ⅟₈₀.

However, when the synchronization type LMP algorithm is adopted for operating the adaptive filter 32, in order to prevent even a DC component constituting a signal expressing the actual displacement amount from being canceled, it is necessary to a correct a zero point of the adaptive filter 32. That is, when the synchronization type is adopted as the LMS algorithm operating the adaptive filter 32 and a counter measure thereagainst is not carried out, not only the variation component based on whirling of the encoder 12 but also the DC component expressing the displacement amount of the encoder 12 are canceled, and the output value becomes null. This is a phenomenon brought about because by the adaptive operation, the filter coefficient W of the adaptive filter 32 is provided with a DC level, as a result, the output signal y of the adaptive filter 32 is provided with a DC level. In order to resolve the problem, the DC level is calculated from an average value of the filter coefficient W expressed by Equation (6), and a DC signal constituted by multiplying the DC level by the impulse value of the reference signal x is calculated (a multiplication is not needed when the impulse value is 1). Further, by adding the DC signal calculated as described above to the signal d constituted by canceling error by the adaptive filter 32, the DC level expressing the accurate displacement amount is provided.

Further, although even when null is substituted for the filter coefficient $w_k$ which is used first in starting the operation, when the operation is started, the operation is self-adapted, and therefore, the null may be substituted therefor, a preferable filter characteristic may previously be calculated and the value may be substituted therefor. Or, a filter coefficient used finally in a process at a preceding time may be stored to storing means of EEPROM or the like and may be used in restarting. Further, as in the invention described in Claim 13, a data expressed by a signal which is inputted first can also be made to constitute an initial value of the filter coefficient.

Further, notation μ in Equation (3) is a value referred to as step size parameter for determining an update amount when the filter coefficient is made to be proper by itself, and becomes a value normally about 0.01 through 0.001, however, actually, the value can be set by investigating a reasonableness of the adapting operation beforehand, or can successively updated by using Equation (7) as follows.

[Equation 7]

$$\mu = \frac{a}{\sum_{i=0}^{N-1} x^2(k-i)} \quad (7)$$

Further, also α in Equation (7) constitutes a parameter for determining an updating amount for making the filter coefficient proper by itself, α may fall in a range of 0<α1, α can be set more easily than μ mentioned above. Further, in the case of the embodiment, the reference signal x is formed by itself, and therefore, a value of a denominator in Equation (7) is already known, and an optimum value of μ can be calculated beforehand. From a viewpoint of reducing a calculation amount, it is preferable to previously calculate μ in Equation (7) and make the filter coefficient proper by itself by Equation (3) mentioned above by constituting μ by a constant.

As described above, the modified signal e expressing the actual displacement amount $d_d$ is calculated by subtracting the cancel signal y calculated by the adaptive filter 32 from the output signal d of the sensor 13. Further, based on the modified signal e calculated in this way, the displacement amount in the diameter direction of the center axis of the outer ring 3 and the center of the hub 4, further, the radial load operated between the outer ring 3 and the hub 4 can accurately be calculated. Further, in an actual case, in the output signal d of the sensor 13, there is present a second variation based on the pitch error having a period shorter than the variation based on the whirling of the sensor 13. Hence, by providing a low pass filter of an averaging filter or the like for averaging the second variation before or after the adaptive filter 32 (preferably, after as in the invention described in Claim 15), regardless of the second variation, the displacement amount, further, the radial load are made to be able to be calculated accurately. A structure and operation of the low pass filter of the averaging filter or the like for restraining a high frequency variation is well known in the background art, and therefore, a detailed explanation thereof will be omitted.

The embodiment is constituted as described above, and therefore, the radial load can be calculated without a necessity of integrating a new part of the displacement sensor or the like at a portion of the rolling bearing unit. That is, a combination of the encoder 12 and the sensor 13 is needed also for detecting the rotational speed of the hub 4 in order to carry out a control of ABS or TCS. The rolling bearing unit attached with the displacement measuring apparatus of the embodiment is constituted by the structure of calculating the radial load by devising the structure necessary for detecting the rotational speed in this way, and therefore, the structure for calculating the radial load applied to the rolling bearing unit can be constituted to be small-sized and light-weighted.

Figure 3:
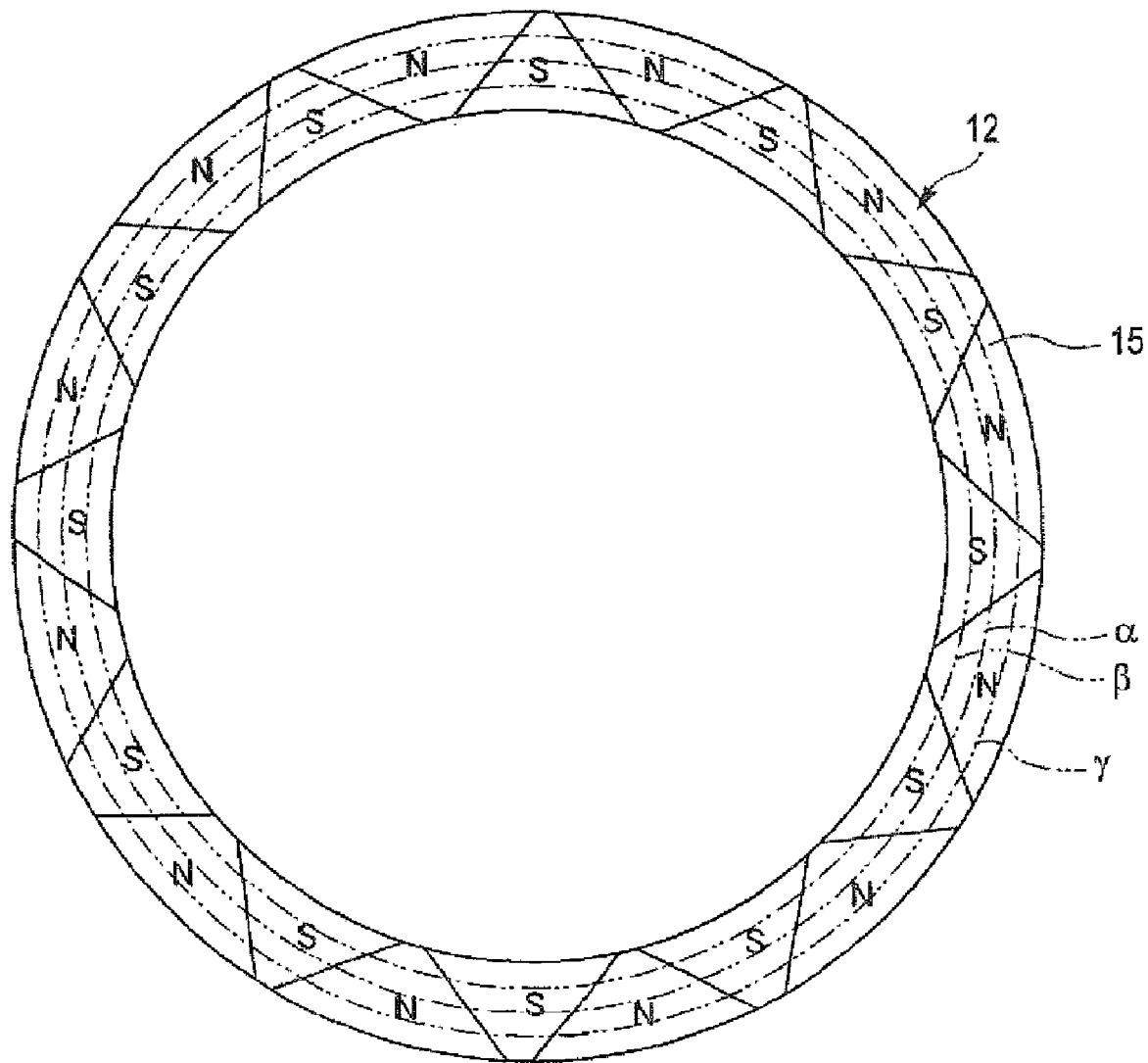
FIG. 3 is a view similar to FIG. 2 showing a portion of scanning a detected face of an encoder by a detecting portion of a sensor.
Figure 4:
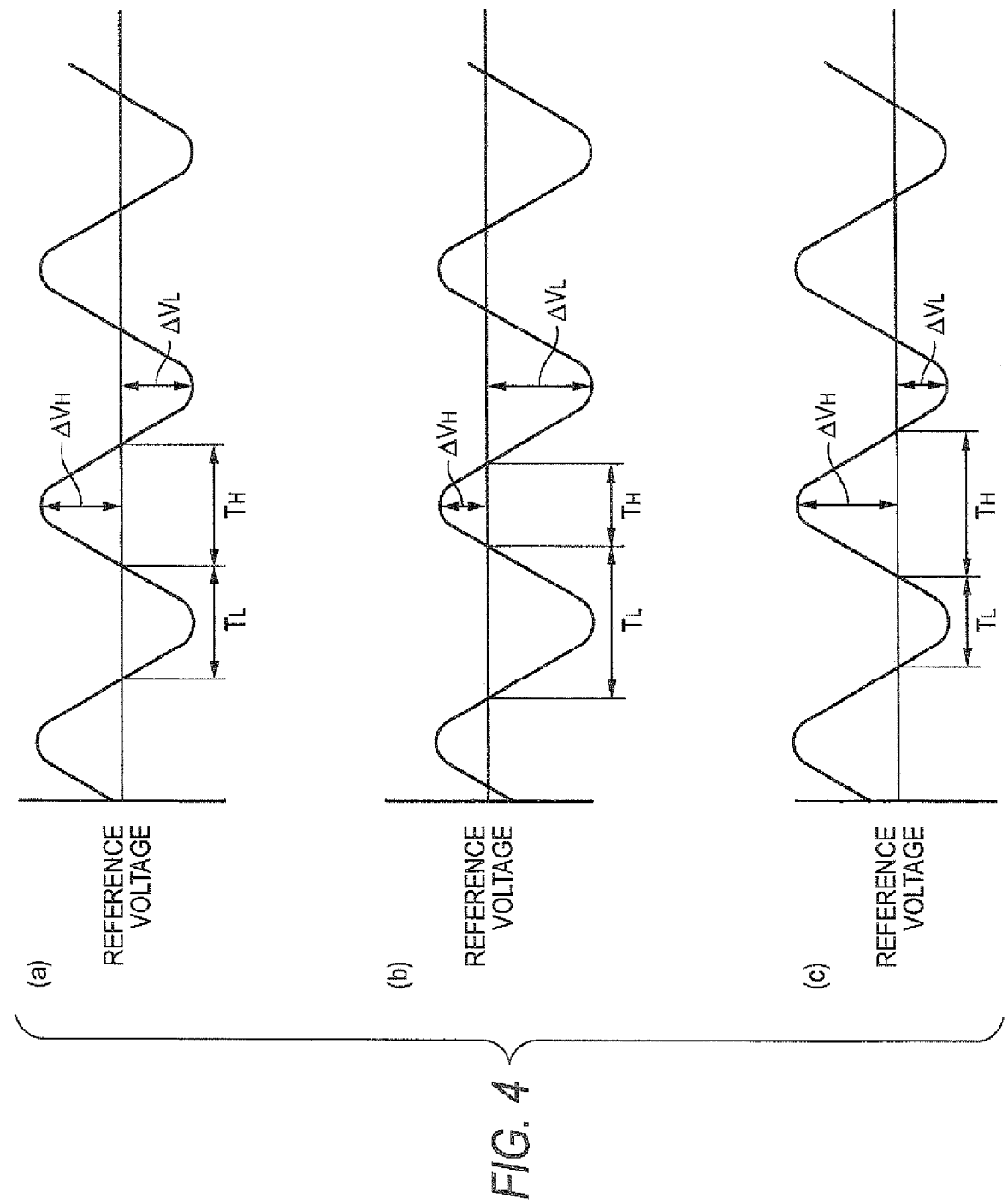
FIG. 4A to 4C illustrate diagrams showing an output signal of a sensor changed in accordance with a variation in a radial load.

Further, as is apparent from FIG. 4A through 4C, in the case of the embodiment, by the magnitude of the radial load, the period $T_H$ by which the voltage of the output signal of the sensor 13 is higher than the reference voltage and the period $T_L$ by which the voltage becomes lower than the reference voltage are changed. Therefore, in order to accurately calculate the rotational speed of the hub 4 regardless of the variation in the radial load, based on a sum of the two periods "$T_H+T_L$", the rotational speed is calculated. The sum "$T_H+T_L$" is substantially constant regardless of the displacement in the diameter direction even in a case in which the portion magnetized in the N pole and the portion magnetized in the S pole are constituted by a fan shape or an inverse fan shape as shown by FIGS. 2, 3, and therefore, the rotational speed can accurately be calculated.

Embodiment 2

FIG. 7A shows Embodiment 2 of the invention in response to Claims 1 through 5, 24. In the case of the embodiment, through holes 21, 21 are formed at a middle portion in a diameter direction of an encoder 12a in a circular ring shape at equal intervals in a circumferential direction. In the case of the embodiment, the respective through holes 21, 21 are constituted by an inverse fan shape (or an inverted trapezoidal shape) in which the more outer side in the diameter direction of the encoder 12a, the narrower the width in the circumferential direction. Further, interval portions 22, 22 between the through holes 21, 21 contiguous to each other in the circumferential direction are constituted by a fan shape (or trapezoidal shape) in which the more on the outer side in the diameter direction, the wider the width in the circumferential direction. Therefore, in the case of the embodiment, the interval portions 22, 22 constitute first detected portions described in Claim 5 and portions of the respective through holes 21, 21 constitute second detected portions described in Claim 5. Contrary to the above-described case, as shown by FIG. 7B, the more on the outer side in the diameter direction, the larger the widths of the through holes 21a, 21a can be constituted, and the more on the outer side in the diameter direction, the smaller the widths of the interval portions 22a, 22a can be constituted.

In either of the cases, by combining with the pertinent sensor, similar to the case of Embodiment 1 mentioned above, displacement amounts in the diameter direction of the center axis of the stationary bearing ring of the outer wheel or the like supporting the sensor and the center axis of the rotatory bearing ring of the hub or the like supporting to fix the encoder 12a can be calculated. Further, the radial load operated between the stationary bearing ring and the rotatory bearing ring can be calculated. The radial load can directly be calculated by omitting a procedure of calculating the displacement amount similar to the case of Embodiment 1. Further, a material constituting the encoder 12a can be selected by a kind of the sensor.

For example, when the sensor is an active type magnetic sensor including a permanent magnet and a magnetism detecting element of a Hole element or a magnetoresistive element or the like, the encoder 12a is made of a magnetic metal of a steel plate or the like. The same goes with a case of a passive type magnetic sensor comprising a permanent magnet, a Hole piece, a coil. Also in such a structure, similar to the case of Embodiment 1, an output signal of the sensor is changed in accordance with a change in a position in a diameter direction of a portion to which a detecting portion of the sensor is opposed in a detected face of the encoder 12a. When the magnetic sensor is used, the detected face of the encoder can also be formed with a concave portion or a convex portion in a fan shape or an inverse fan shape in place of the through hole. Although in a case of an encoder made by a permanent magnet arranged with N poles and S poles at a detected face, there is a possibility of deteriorating an accuracy of detecting a load in accordance with the fact that a magnetic flux intensity becomes nonuniform, when an encoder formed with a through hole, or a concave portion or a convex portion at a magnetic metal plate is used, such a problem is not posed, and therefore, an accuracy of detecting the load is easy to be ensured.

In contrast thereto, when the sensor is of an optical type, a structure of one of the first detecting portion or the second detecting portion formed at the detected face of the encoder 12a is limited to the through hole. In this case, a material of constituting the encoder 12a may be a material of blocking light. When the optical type sensor is used, a period of changing an output signal of the sensor is changed in accordance with a change in a position in a diameter direction of the portion to which a detecting portion of the sensor is opposed in the detected face of the encoder 12a (a magnitude of a change remains unchanged).

Structure and operation of a portion other than the encoder 12a are similar to those of Embodiment 1 mentioned above, and therefore, illustration and explanation with regard to an equivalent portion will be omitted.

Embodiment 3

Figure 8:
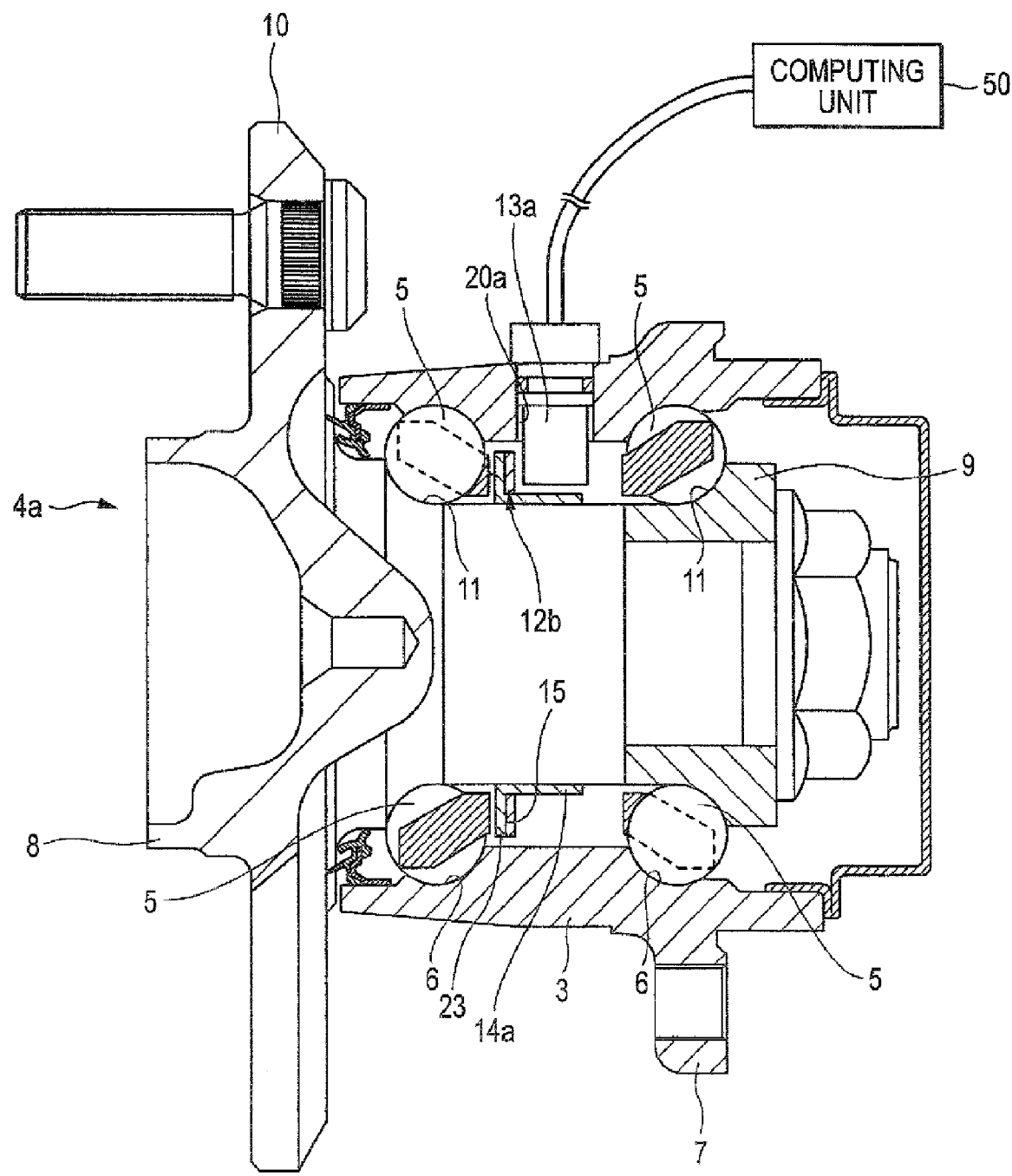
FIG. 8 is a sectional view showing Embodiment 3 of the same.

FIG. 8 shows Embodiment 3 of the invention in response to Claims 1 through 5, 17 through 19, 24. In the case of the embodiment, an encoder 12b is outwardly fitted to be fixed between the rolling elements 5, 5 arranged in double rows at a middle portion in an axial direction of a hub 4a. Further, by attaching the encoder main body 15 made by a permanent magnet as shown by FIGS. 2, 3 to one side face in an axial direction of a circular ring portion 23, or forming the through holes 21, 21a or the recesses holes as shown by FIG. 7A to 7B at the circular ring portion 23, the circular ring portion 23 per se is provided with the function as the encoder.

A sensor 13a combined with the encoder 12b is inserted to the mounting hole 20a formed at a middle portion in an axial direction of the outer ring 3 at a portion between the outer ring raceways 6, 6 of double rows from an outer side to an inner side in a diameter direction of the outer ring 3. Further, a detecting portion provided at a front end portion and a side face in the axial direction of the sensor 13*a* is made to be proximate and opposed to a detected face of the encoder main body 15 attached to the side face in the axial direction of the circular ring portion 23 or the side face of the circular ring portion 23 per se.

Based on a pattern of an output signal of the sensor 13*a*, a shift between a center axis of the hub 4*a* and the center axis of the outer ring 3 (diameter direction displacement amount) is calculated, and a radial load operated between the hub 4*a* and the outer ring 3 from the shift (or, directly from the pattern of the output signal) and a variation in the output signal of the sensor 13*a* in accordance with the mounting error or the like is removed similar to Embodiment 1 or Embodiment 2 mentioned above, and therefore, duplicated explanation thereof will be omitted.

Embodiment 4

Figure 9A:
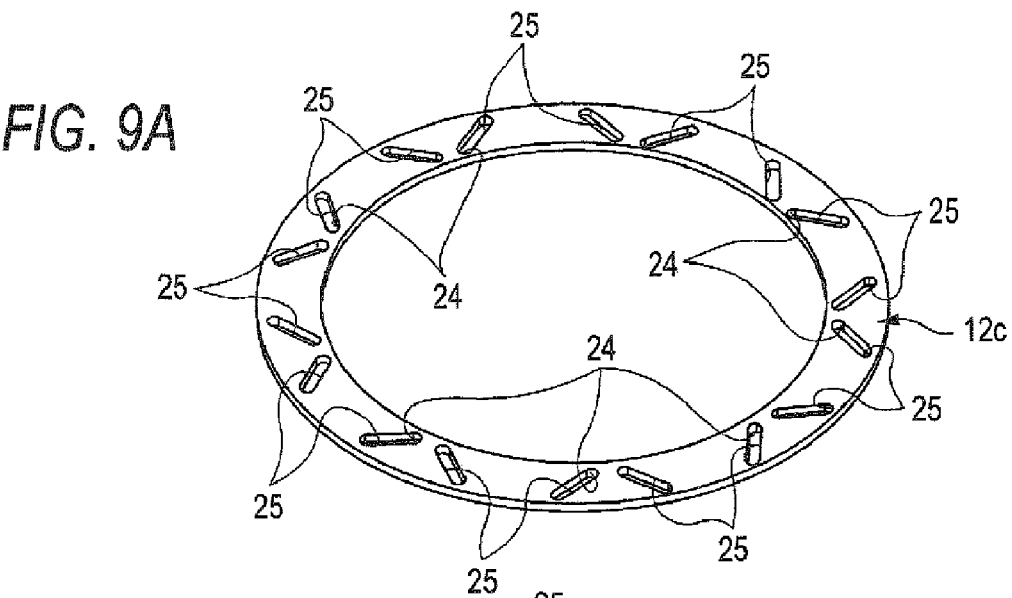
FIG. 9A to 9C illustrate perspective views of an essential portion showing a third example of an encoder integrated to Embodiment 4 of the same.
Figure 9B:
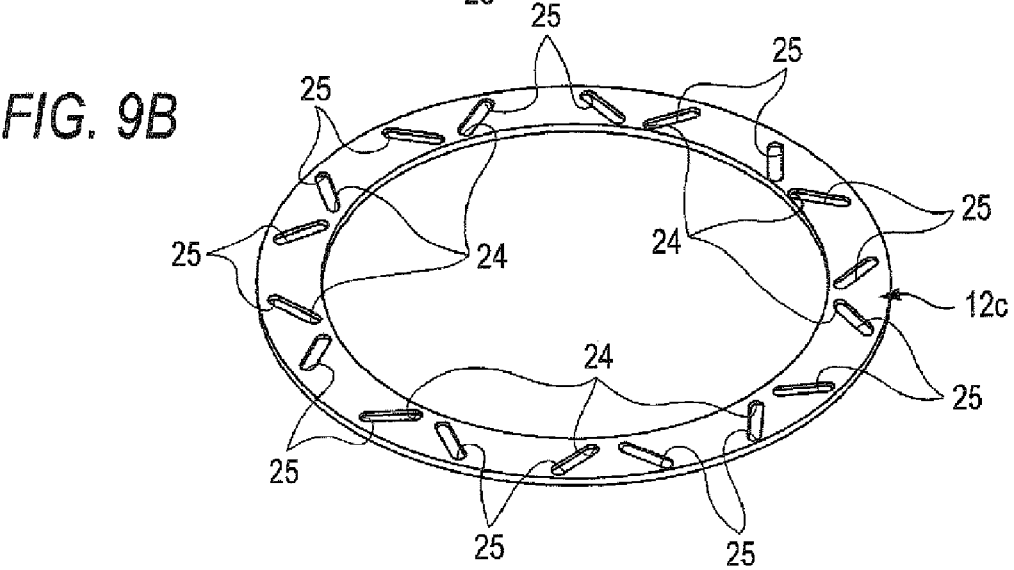
Figure 9C:
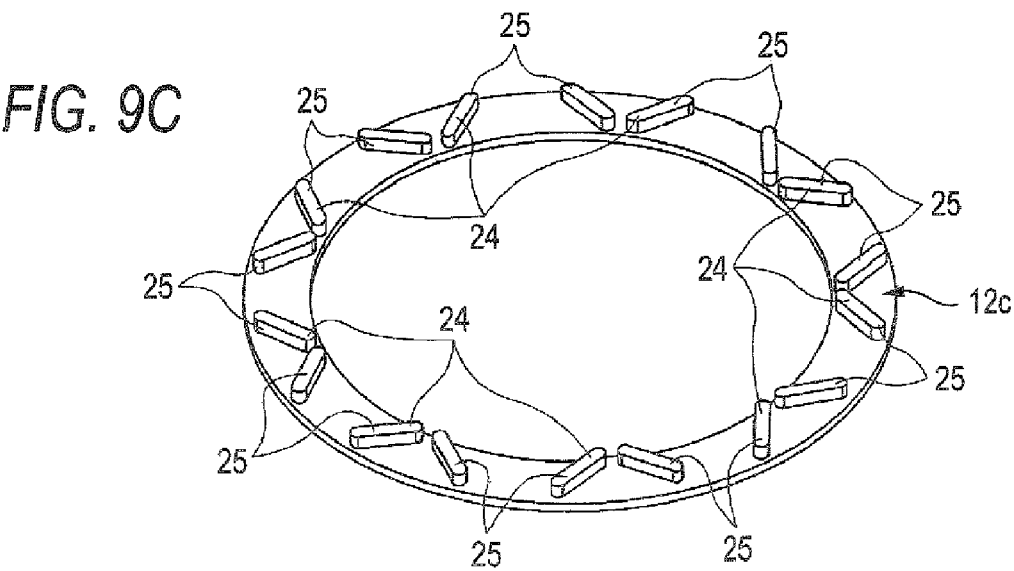
Figure 10:
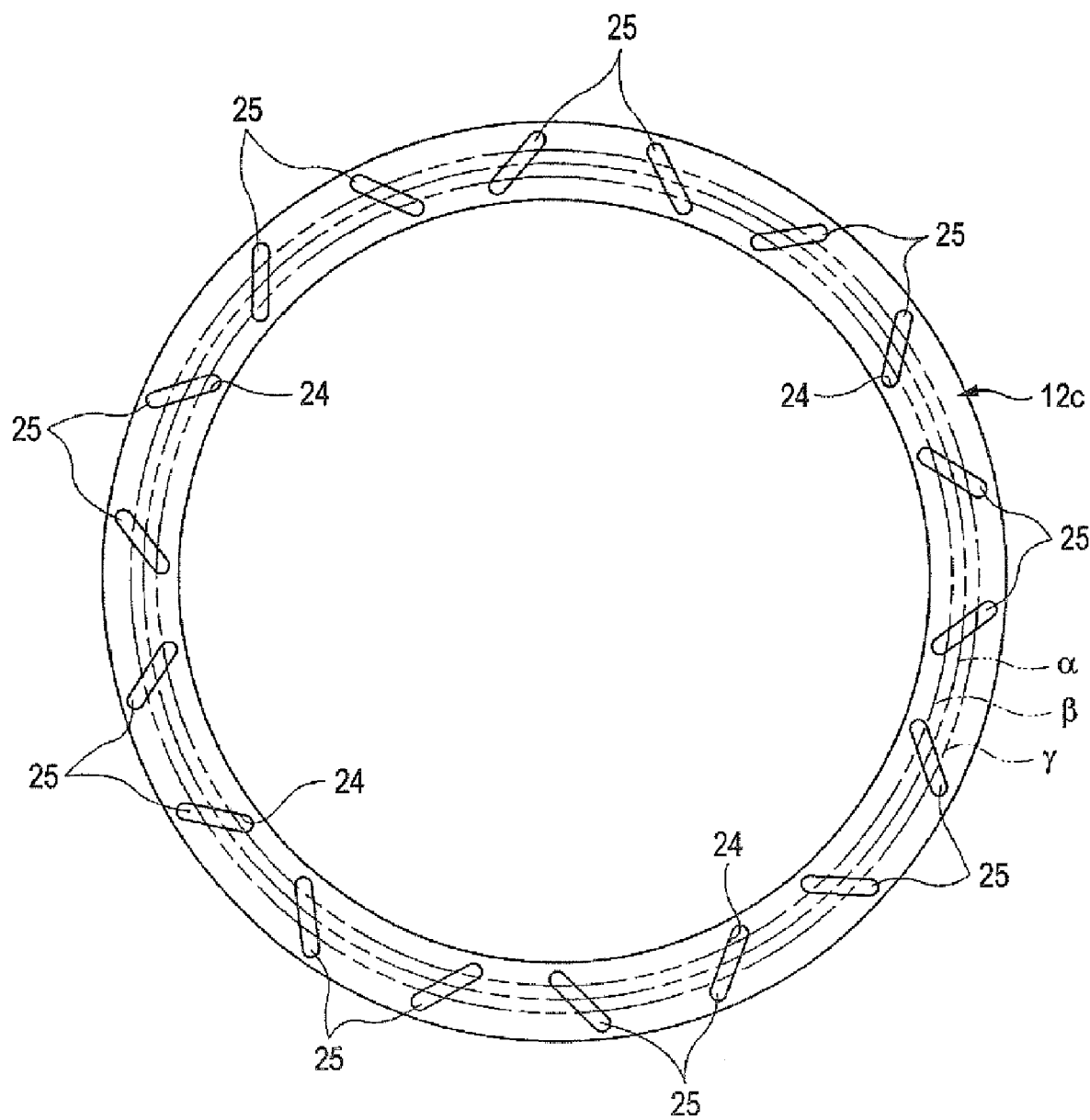
FIG. 10 is a view showing a portion of scanning a detected face of an encoder by a detecting portion of the sensor viewing the detected face of the encoder from an axial direction.
Figure 11:
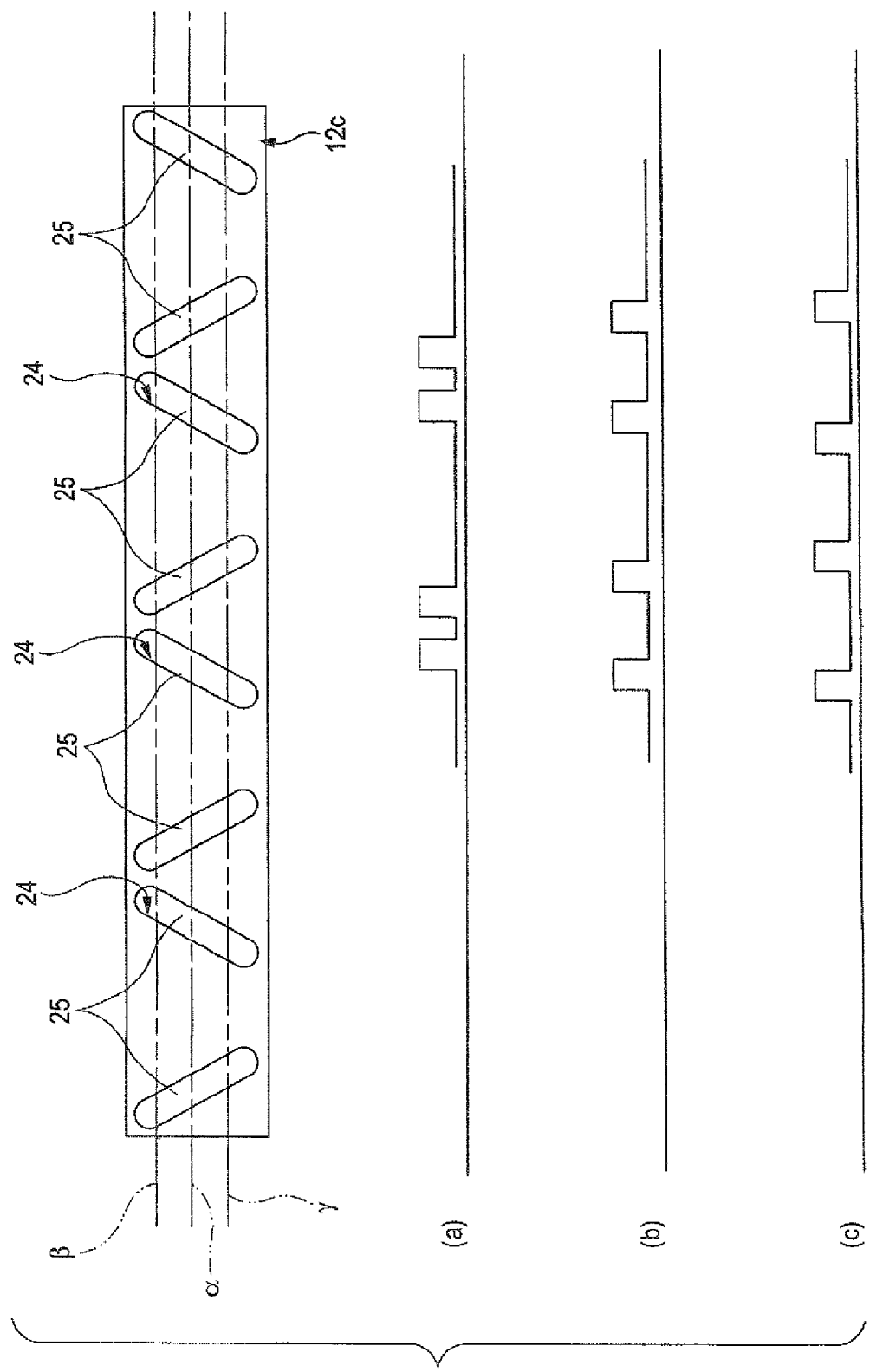
FIG. 11(a) to 11(c) illustrate diagrams showing an output signal of a sensor changed in accordance with a variation in a radial load.

FIGS. 9 through 11 show Embodiment 4 of the invention in response to Claims 1 through 4, 6, 24. In the case of the embodiment, a side face in an axial direction of an encoder 12*c* constituting a detected face is arranged with a plurality of combined portions 24, 24 for being detected over a circumferential direction at equal intervals. The respective combined portions 24, 24 for being detected are constituted by pairs of individualized portions 25, 25 respectives of characteristics of which differ from those of other portions. As such respective individual portions 25, 25, there can be adopted a long hole in a slit-like shape as shown by FIG. 9A, a recessed hole as shown by FIG. 9B, a convex portion in a bank shape as shown by FIG. 9C. In any of the respective individualized portions 25, 25, intervals in a circumferential direction of the pairs of individualized portions 25, 25 constituting the respective combined portions 24, 24 for being detected are continuously changed in the same direction with regard to a diameter direction at all of the combined portions 24, 24 for being detected. In an illustrated example, the more on the outer side in the diameter direction of the encoder 12*c*, the larger the intervals in the circumferential direction of the pairs of individualized portions 25, 25 constituting the respective combined portion 24, 24 for being detected, and the more on the outer side in the diameter direction of the encoder 12*c*, the more inclined the intervals in the circumferential direction of the individualized portions 25, 25 constituting the combined portions 24, 24 for being detected contiguous in the circumferential direction in the direction of being reduced.

As shown by FIG. 11(*a*) to 11(*c*), an output signal of a sensor a detecting portion of which is made to be opposed to the detected face of the above-described encoder 12*c* is changed at instances of being opposed to the respective individualized portions 25, 25. Further, the interval (period) of change is changed in accordance with a change in a position in the diameter direction of a portion opposed to the detecting portion of the sensor.

For example, when a standard radial load (standard value) is applied between a stationary bearing ring of an outer wheel or the like and a rotatory bearing ring of a hub or the like, the detecting portion of the sensor scans a center portion in the diameter direction of the detected face indicated by a chain line α of FIGS. 10, 11. In this case, the output signal of the sensor is changed as shown by FIG. 11(*b*).

In contrast thereto, when the radial load applied between the stationary bearing ring and the rotatory bearing ring becomes larger than the standard value, the detecting portion of the sensor scans a portion of the detected face proximate to the inner side in the diameter direction indicated by a chain line β in, for example, FIGS. 10, 11. In this case, the output signal of the sensor is changed as shown by FIG. 11(*a*).

Further, when the radial load applied between the stationary bearing ring and the rotatory bearing ring becomes smaller than the standard value, the detecting portion of the sensor scans a portion of the detected face proximate to the outer side in the diameter direction indicated by a chain line γ in, for example, FIGS. 10, 11. In this case, the output signal of the sensor is changed as shown by FIG. 11(*c*).

Therefore, also in the case of the embodiment, when a pattern of the output signal of the sensor (interval of change) is viewed, a degree of shifting a center of the stationary bearing ring and a center axis of the rotatory bearing ring (diameter direction displacement amount) can be calculated, and the radial load applied between the two bearing rings can be calculated from the degree of shift (or directly from a pattern of the output signal).

Embodiment 5

Figure 12:
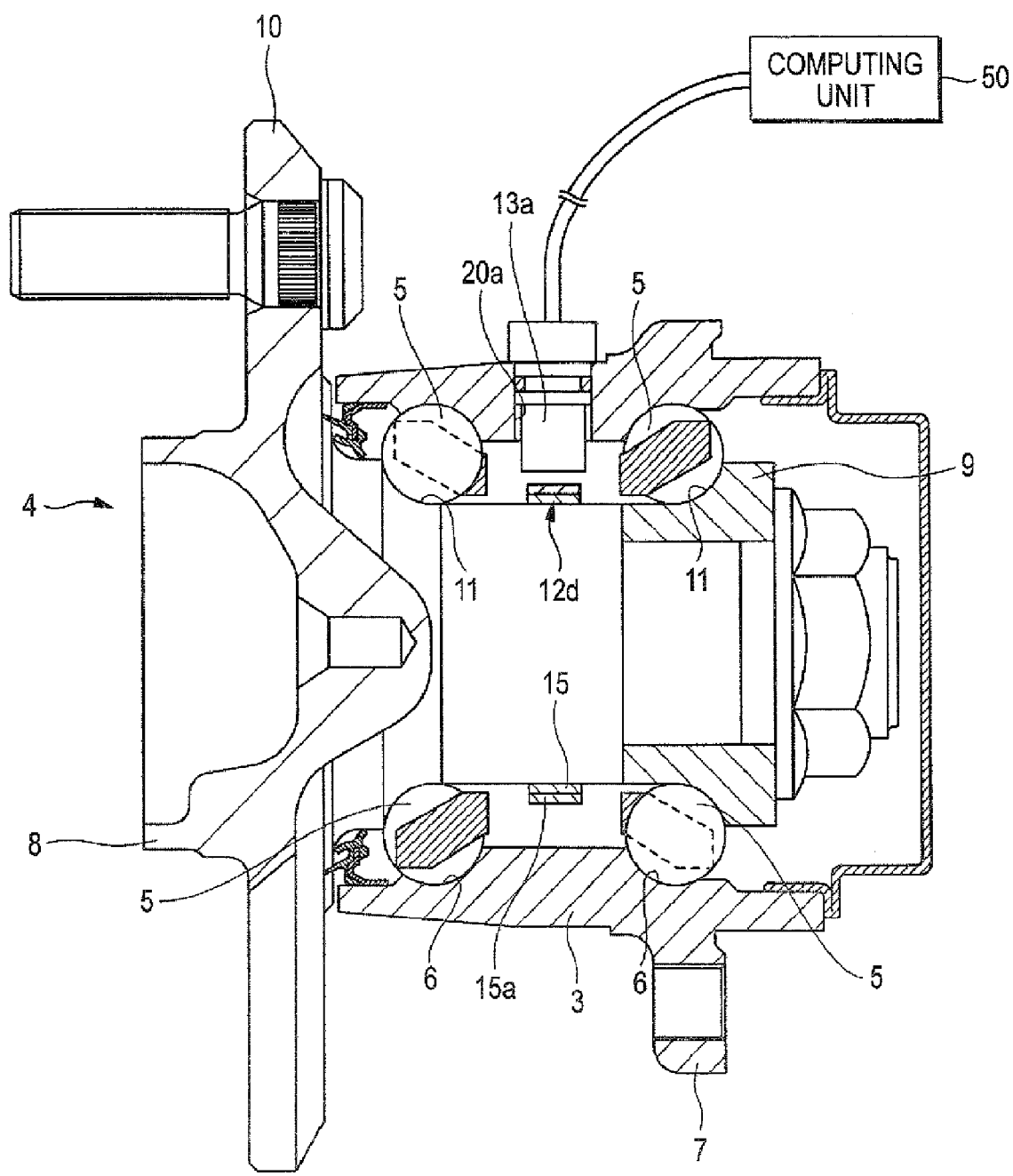
FIG. 12 is a sectional view showing Embodiment 5 of the invention.
Figure 13A:
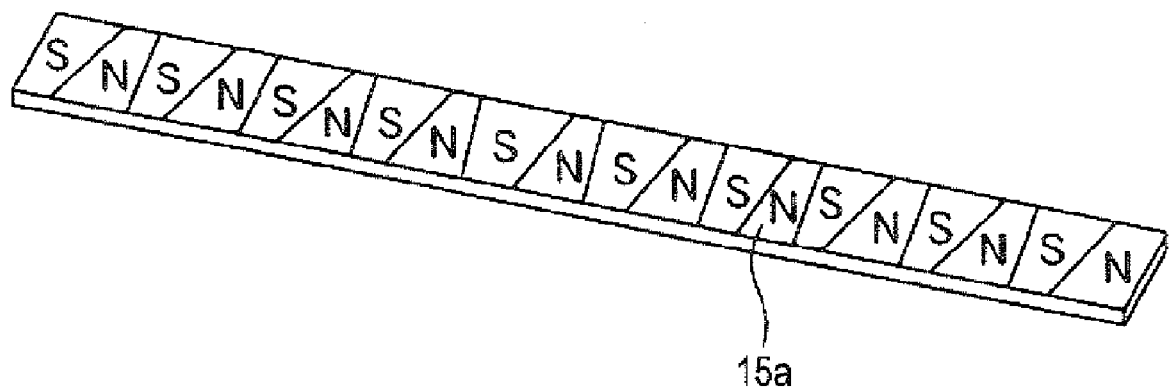
FIG. 13A to 13B illustrate perspective views showing a material and an integrated state of an encoder integrated to Embodiment 5.
Figure 13B:
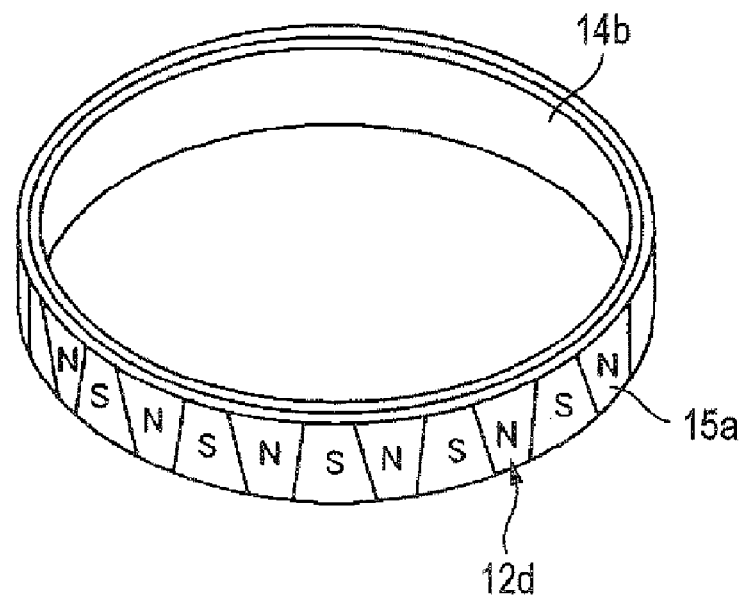
Figure 14:
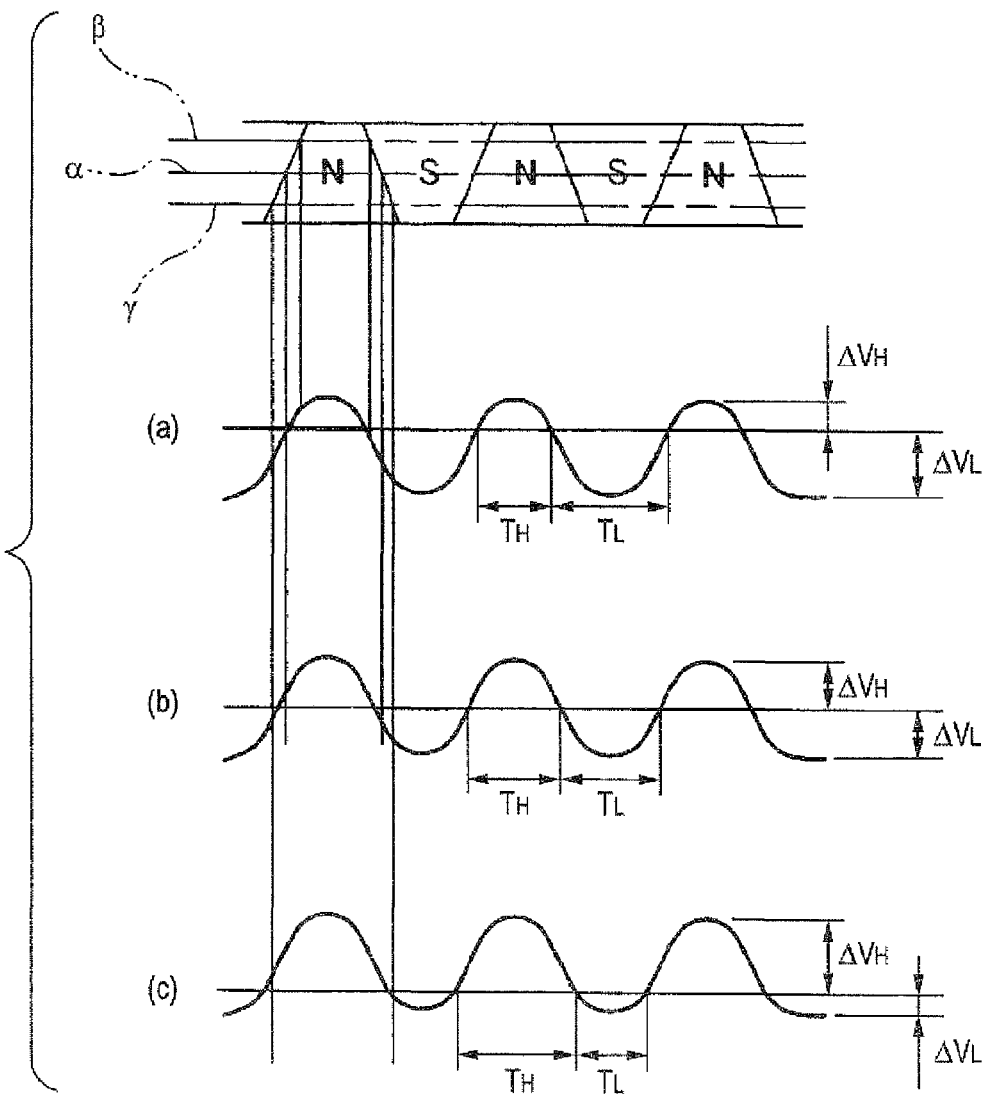
FIG. 14(a) to 14(c) illustrate diagrams showing an output signal of a sensor changed in accordance with a variation in an axial load.

FIGS. 12 through 14 show Embodiment 5 of the invention in response to Claims 1 through 5, 17 through 19, 24. In the case of the embodiment, an encoder 12*d* is outwardly fitted to be fixed to the interval portion of the rolling elements 5, 5 arranged in double rows at the middle portion in the axial direction of the hub 4*a*. The encoder 12*d* is constituted as shown by FIG. 13B by rounding a material in a strip-like shape as shown by FIG. 13A, and is constituted by attaching to fix an encoder main body 15*a* in a circular cylinder shape on an outer peripheral surface of a support plate 14*b* similarly in a circular cylinder shape.

The encoder main body 15*a* is made by a permanent magnet of a rubber magnet, a plastic magnet or the like and is magnetized in the diameter direction. A magnetizing direction is changed over a circumferential direction alternately and at equal intervals. Therefore, the outer peripheral surface of the encoder main body 15*a* constituting the detected face is arranged with N poles and S poles alternately and at equal intervals. A width of a portion in a circumferential direction magnetized in the N pole constituting a first detected portion is made to be wide at one end portion in the axial direction of the encoder main body 15*a* and narrow at other end portion thereof. In contrast thereto, a width in the circumferential direction of a portion magnetized in the S pole constituting a second detected portion is made to be narrow at one end portion in the axial direction of the encoder main body 15*a* and wide at other end portion thereof.

A sensor 13*b* combined with the encoder 12*d* is inserted into the mounting hole 20*a* at the middle portion in the axial direction of the outer ring 3 and at the interval portion of the outer ring raceways 6, 6 in double rows from the outer side to the inner side in the diameter direction of the outer ring 3. Further, a detecting portion provided at a front end face of the sensor 13*b* is closely opposed to an outer peripheral surface of the encoder main body 15*a*.

In the case of the embodiment having the above-described constitution, when a relative position of the outer ring 3 and the hub 4*a* is shifted in the axial direction in accordance with the variation in the axial load applied between the outer ring 3 and the hub 4*a*, a position in the axial direction of a portion of the outer peripheral surface of the encoder 15*a* to which the detecting portion of the sensor 13*b* is opposed is changed. As a result, similar to the case of Embodiment 1 mentioned above, a pattern of changing the output signal of the sensor 13*b* is changed as shown by FIG. 14(*a*) to 14(*c*). Also a relationship of the pattern of changing the output signal of the sensor 13*b* as shown by FIG. 14(*a*) to 14(*c*) and the displacement amount in the axial direction between the outer ring 3 and the hub 4*a* and a magnitude of the axial load applied between the outer ring 3 and the hub 4*a* is calculated by a calculation or an experiment similar to the relationship among the diameter direction displacement amount and the radial load and the pattern of changing the output signal in Embodiment 1 mentioned above. Therefore, by observing the pattern of changing the output signal, the axial direction displacement amount and the magnitude of the axial load can be calculated. A variation in the output signal of the sensor 13*b* in accordance with an mounting error or the like is removed by an adaptive filter similar to Embodiments 1 through 4 mentioned above.

Embodiment 6

Figure 15:
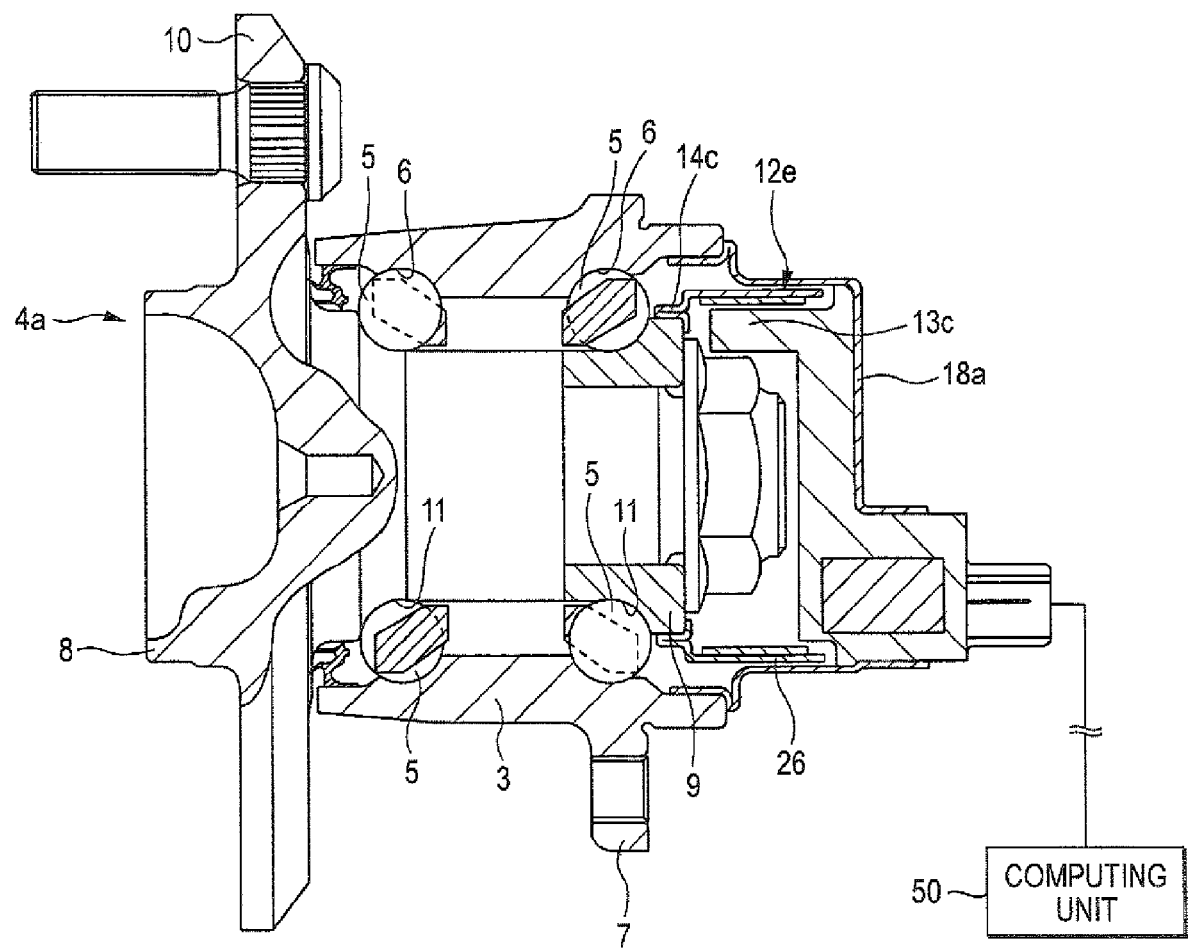
FIG. 15 is a sectional view showing Embodiment 6 of the invention.

FIG. 15 shows Embodiment 6 of the invention in response to Claims 1 through 5, 17, 18, 20, 24. In the case of the embodiment, an encoder 12*e* is outwardly fitted to be fixed to the inner end portion in the axial direction of the hub 4*a*. The encoder 12*e* is provided with a support plate 14*c*. Further, by attaching an encoder main body made by a permanent magnet alternately arranged with N poles and S poles at an inner peripheral surface thereof respectively in a state of being magnetized in a fan shape or a trapezoidal shape arrange to an inner peripheral surface of a cylinder portion 26 of the support plate 14*c*, or forming a fan shape or a trapezoidal shape through hole at the cylinder portion 26, the cylinder portion 26 per se is made to be provided with a function as an encoder. Further, a detecting portion of the sensor 13*c* supported by and fixed to a cover 18*a* fixed to the inner end opening portion of the outer ring 3 is closely opposed to an inner peripheral surface of the encoder 12*e* constituting a detected face.

Also in the case of the embodiment, by observing a pattern of changing an output signal of the sensor 13*c*, an axial direction displacement amount between the outer ring 3 and the hub 4*a* and a magnitude of an axial load operated between the outer ring 3 and the hub 4*a* can be calculated. A variation in an output signal of the sensor 13*c* in accordance with the mounting error or the like is removed by an adaptive filter similar to Embodiments 1 through 4 mentioned above.

Embodiment 7

Figure 16A:
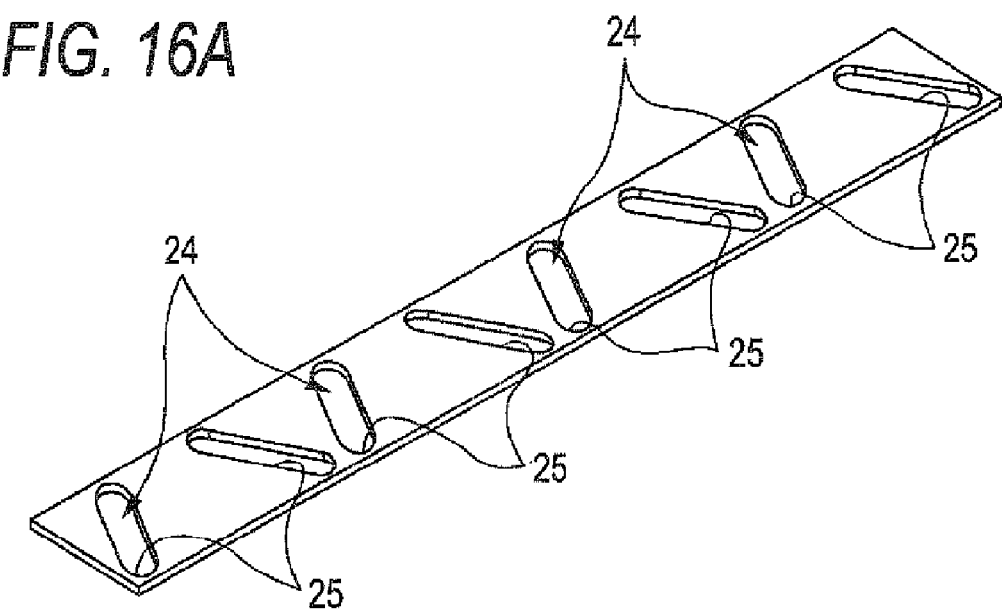
FIG. 16A to 16B illustrate perspective views showing a material and an integrated state of an encoder integrated to Embodiment 7 of the same.
Figure 16B:
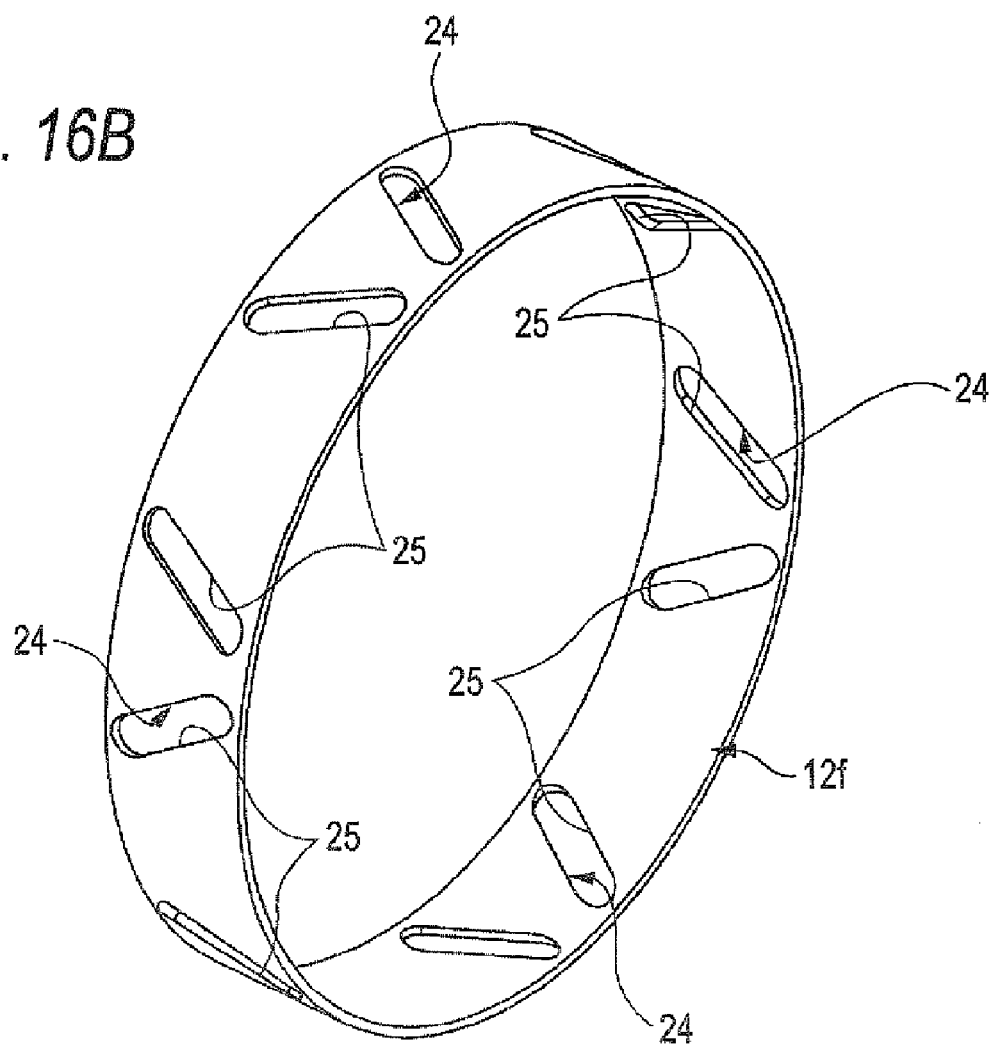

FIG. 16A to 16B show Embodiment 7 of the invention in response to Claims 1 through 4, 6, 24. The embodiment applies the structure of Embodiment 4 shown in FIGS. 9 through 11 for calculating a magnitude of an axial load. That is, in the case of the embodiment, the plurality of combined portions 24, 24 for being detected are arranged at an outer peripheral surface (or inner peripheral surface) of an encoder 12*f* in a circular cylinder shape constituting a detected face over a circumferential direction at equal intervals. The respective combined portions 24, 24 for being detected are respectively constituted by the pairs of individualized portions 25, 25 having the characteristic different from that of the other portions. As the respective individualized portions 25, 25, in the case of the embodiment, the slit-like long holes are adopted.

The encoder 12*f* having the respective individualized portions 25, 25 is fabricated by rounding a magnetic metal plate in a strip-like shape formed by previously punching the respective long holes as shown by FIG. 16A as shown by FIG. 16B and butting to weld two end edges in the circumferential direction. Further, as respective individualized portions 25, 25, the recessed hole as shown by FIG. 9B, or the convex portion in the bank shape as shown by FIG. 9C can be adopted. Also in the case of the embodiment, similar to the case of Embodiment 4, intervals in the circumferential direction between the pairs of individualized portions 25, 25 constituting the respective combined portions 24, 24 for being detected are continuously changed in the same direction with regard to the axial direction in all of the combined portions 24, 24 for being detected. That is, the more on the one end (right lower end of FIG. 16A to 16B) in the axial direction of the encoder 12*f*, the smaller the interval in the circumferential direction of the pairs of individualized portions 25, 25 constituting the respective combined portions 24, 24 for being detected, and the more on the other end (left upper end of FIG. 16A to 16B) in the axial direction of the encoder 12*f*, the more inclined the intervals in the circumferential direction of the individualized portions 25, 25 constituting the respective combined portions 24, 24 for being detected contiguous in the circumferential direction in a direction of being reduced.

An output signal of a sensor a detecting portion of which is made to be opposed to an outer peripheral surface (or inner peripheral surface) constituting a detected face of the encoder 12*f* is changed at instances of being opposed to the respective individualized portions 25, 25 as shown by FIG. 11(*a*) to 11(*c*) similar to the case of Embodiment 4. Further, an interval (period) of change is changed in accordance with the change in the position in the axial direction of the portion opposed to the detecting portion of the sensor. Therefore, also in the case of the embodiment, when the pattern of the output signal of the sensor is viewed, a degree of shifting the stationary bearing ring and the rotatory bearing ring in the axial direction (axial direction displacement amount) can be calculated, and the axial load applied between the two bearing rings can be calculated from the degree of the shift (or directly from the pattern of the output signal). A method of calculating the relative displacement amount and the load from the pattern of the output signal of the sensor is similar to that in the case of Embodiment 4 except that the direction of the relative displacement to be calculated is changed from the diameter direction to the axial direction, and the load is changed from the radial load to the axial load, respectively. The variation of the output signal of the sensor in accordance with the mounting error or the like is removed similar to Embodiment 4.

Embodiment 8

Figure 17:
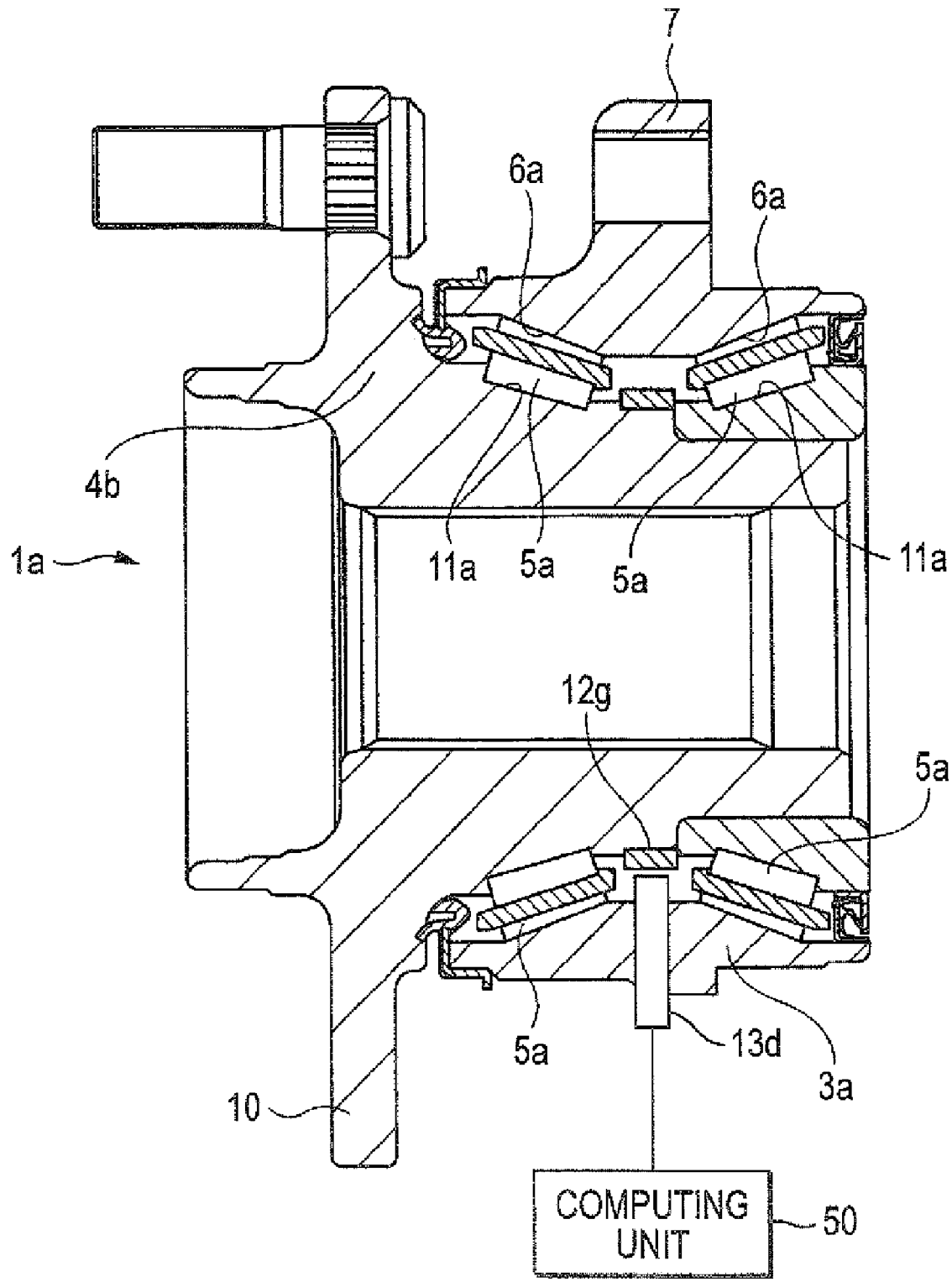
FIG. 17 is a sectional view showing Embodiment 8 of the same.
Figure 18:
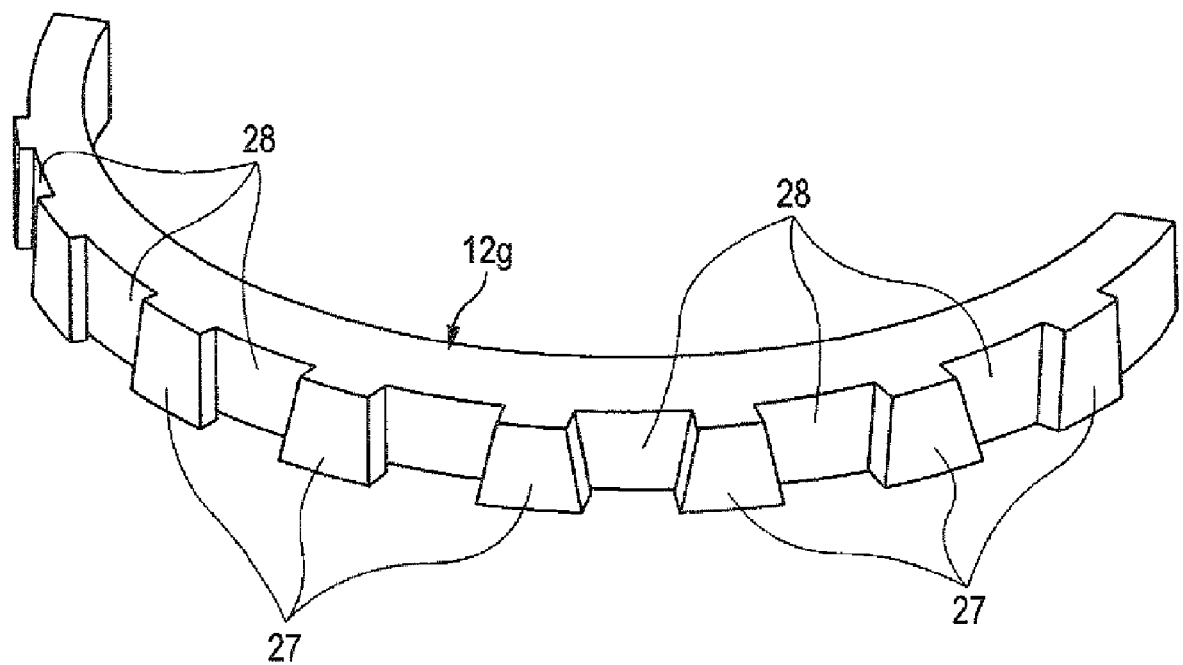
FIG. 18 is a perspective view of a portion of an encoder integrated to Embodiment 8.
Figure 19:
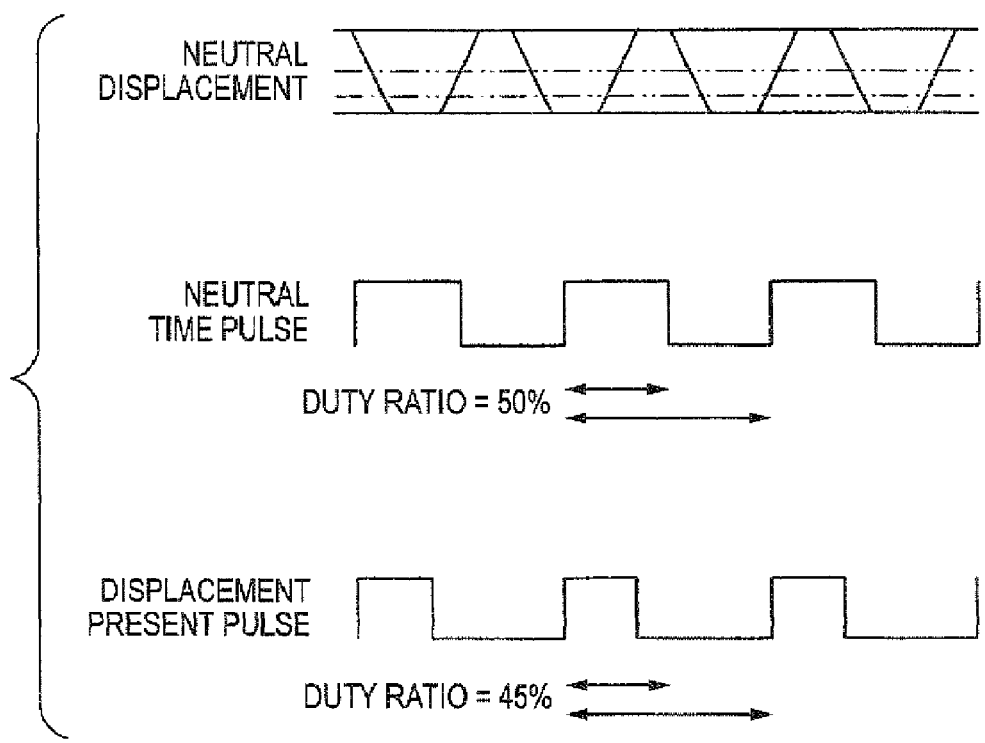
FIG. 19 illustrates diagrams showing an output signal of a sensor changed in accordance with a variation in an axial load.
Figure 20:
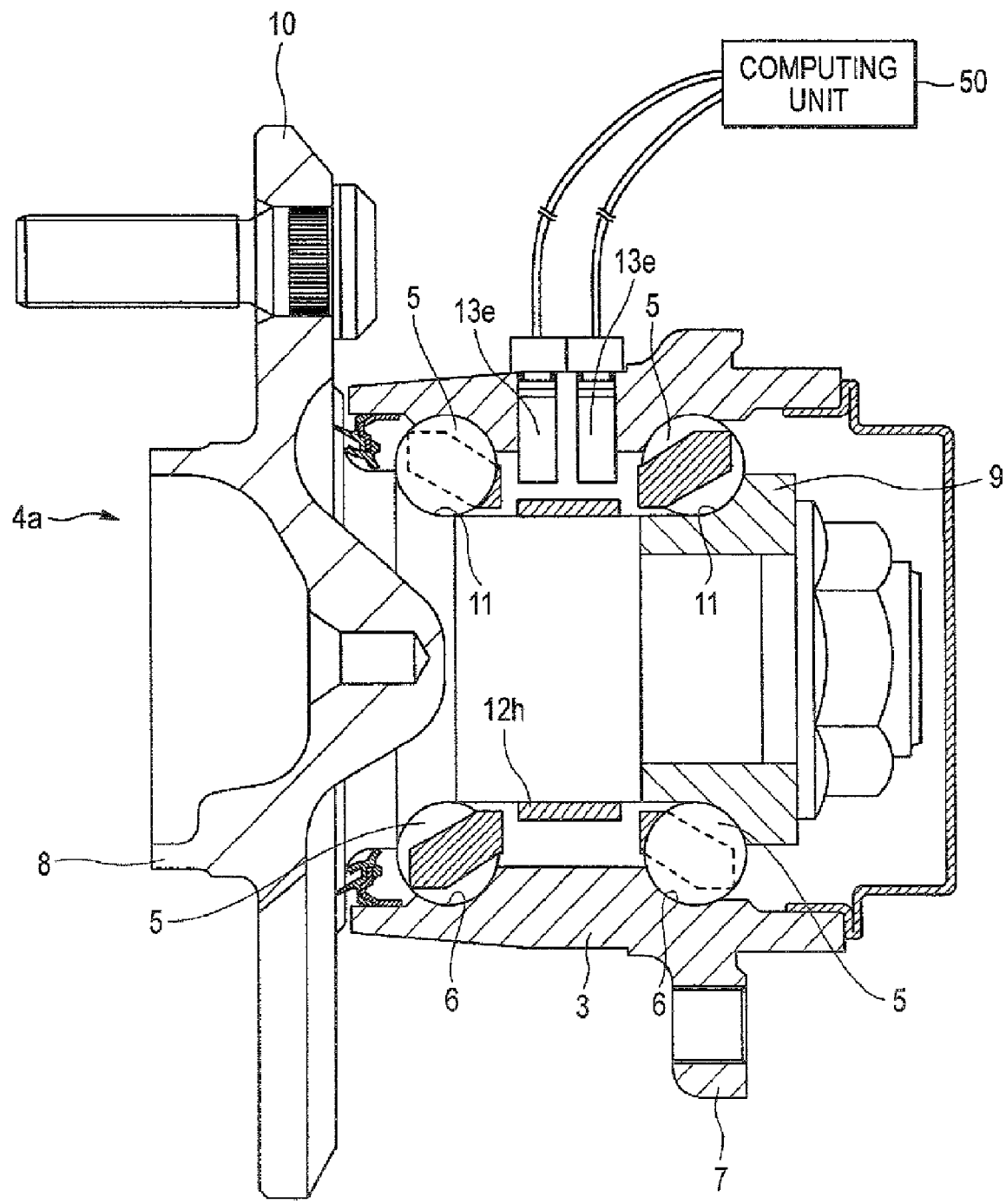
FIG. 20 is a sectional view showing Embodiment 9 of the invention.
Figure 21:
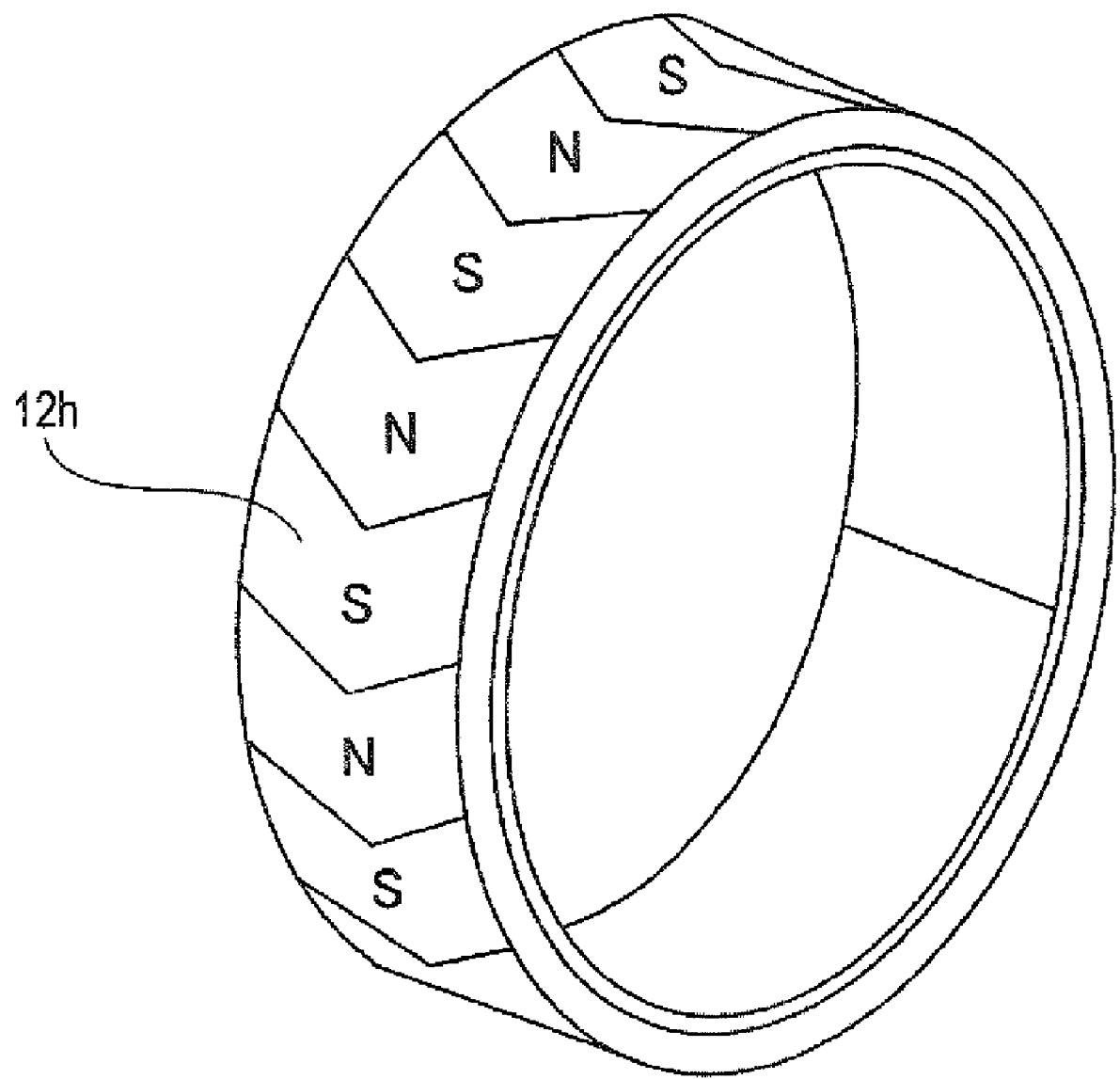
FIG. 21 is a perspective view of an encoder integrated to Embodiment 9.
Figure 22:
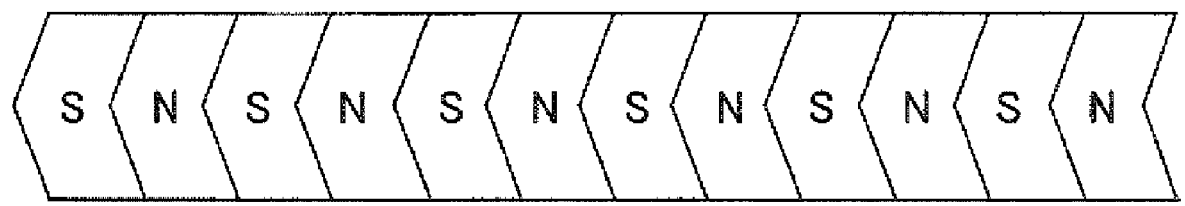
FIG. 22 is a development diagram of the same.
Figure 23:
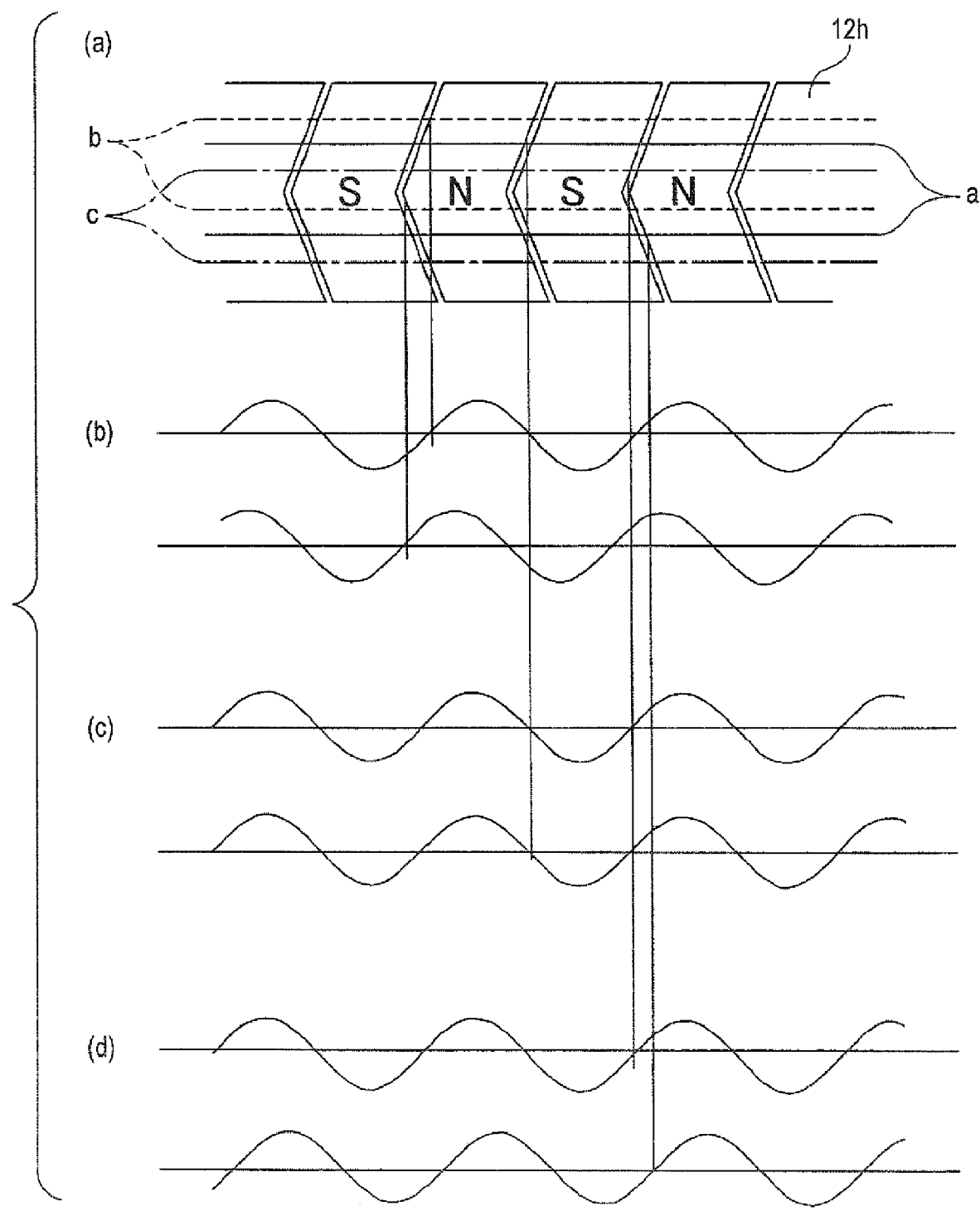
FIG. 23(a) to 23(d) illustrate diagrams showing an output signal of a sensor changed in accordance with a variation in an axial load.

FIGS. 17 through 19 show Embodiment 8 of the invention in response to Claims 1 through 5, 17 through 19, 24. The embodiment shows a case of embodying the invention by a rolling bearing unit 1*a* for supporting a wheel for a drive wheel. Further, in consideration of integrating to a vehicle having a heavy weight, as rolling elements 5*a*, 5*a* conical rollers are used. In the case of the embodiment, an encoder 12*g* is outwardly fitted to be fixed to a middle portion in an axial direction of a hub 4*b* and a middle portion of inner ring raceways 11*a*, 11*a* in double rows. A total of the encoder 12*g* is constituted by a circular ring shape by a magnetic metal member and formed with convex portions 27, 27 constituting first detected portions and recessed portions 28, 28 constituting second detected portions alternately and at equal intervals in a circumferential direction.

In the case of the embodiment having the above-described constitution, when a relative position between an outer ring 3*a* and the hub 4*b* is shifted in the axial direction in accordance with a variation in an axial load applied between the outer ring 3*a* formed with outer ring raceways 6*a*, 6*a* in double rows at an inner peripheral surface thereof and the hub 4b, a position in the axial direction of a portion of an outer peripheral surface of the encoder 12g to which a detecting portion of a sensor 13d supported by a middle portion in the axial direction of the outer ring 3a to be opposed thereto is changed. As a result, similar to the case of Embodiment 5, a pattern (duty ratio) of changing the output signal of the sensor 13d is changed as shown by FIG. 19. Also a relationship among the pattern of changing the output signal of the sensor 13d as shown by FIG. 19, the relative displacement amount in the axial direction between the outer ring 3a and the hub 4b and the magnitude of the axial load applied between the outer ring 3a and the hub 4b is calculated by a calculation or an experiment similar to Embodiment 5. Therefore, by observing the pattern of the change of the output signal, the relative displacement amount and the magnitude of the axial load can be calculated. The variation in the output signal of the sensor in accordance with the mounting error or the like is removed, the direction of the relative displacement amount to be calculated is changed from the diameter direction to the axial direction similar to Embodiment 5 except that the load to be calculated is changed from the radial load to the axial load.

Further, the structure of arranging the concave portion and the convex portion in the trapezoidal shape or the inverted trapezoidal shape alternately in the circumferential direction as in the embodiment can be applied to an encoder formed with a detected face on a side face in an axial direction, and can also be used for measuring the radial load applied to the rolling bearing unit.

Embodiment 9

FIGS. 20 through 24 show Embodiment 9 of the invention in response to Claims 1 through 4, 7 through 9, 17 through 19, 24. In the case of the embodiment, similar to Embodiment 5 shown in FIGS. 12 through 14, an encoder 12h made by a permanent magnet is outwardly fitted to be fixed to a middle portion of the hub 4a. An outer peripheral surface of the encoder 12h constituting a detected face is arranged with portions magnetized in N poles in response to first detected portions and the portions magnetized in S poles in response to second detected portions alternately and at equal intervals in a circumferential direction. Particularly, in the case of the embodiment, a boundary of the portion magnetized in the N pole and the portion magnetized in the S pole in response to the first, second detected portions is inclined by the same angle to the axial direction of the encoder 12h and directions of inclination relative to the axial direction are constituted by directions reverse to each other by constituting a boundary by a middle portion in the axial direction of the encoder 12h. Therefore, the portion magnetized in the N pole and the portion magnetized in the S pole are constituted by a shape of a hat inclined sideways in which the middle portion in the axial direction is projected (or recessed) the most in the circumferential direction.

On the other hand, a pair of sensors 13e, 13e are arranged at the middle portion in the axial direction of the outer ring 3 and at the interval portion of the rolling elements 5, 5 arranged in double rows, and detecting portions of the two sensors 13e, 13e are closely opposed to an outer peripheral surface of the encoder 12h. Positions of detecting portions of the two sensors 13e, 13e opposed to the outer peripheral surface of the encoder 12h are disposed at the same position in the circumferential direction of the encoder 12h. In other words, the detecting portions of the two sensors 13e, 13e are arranged on an imaginary linear line in parallel with a center axis of the outer ring 3. Further, positions of installing the respective members 12h, 13e, 13e are restricted such that in a state in which an axial load is not operated between the outer ring 3 and the hub 4a, the middle portions in the axial direction of the portion magnetized in the N pole and the magnetized in the S pole and the portions projected the most in the circumferential direction (portions at which the direction of inclination of the boundary is changed) are present precisely at a center position between the detecting portions of the two sensors 13e, 13e.

In the case of the embodiment constituted as described above, when an axial load is operated between the outer ring 3 and the hub 4a, phases of changing the output signals of the two sensors 13e, 13e are shifted. That is, in a state in which the axial load is not operated between the outer ring 3 and the hub 4a, the detecting portions of the two sensors 13e, 13e are opposed to bold lines a, a of FIG. 23(a), that is, portions shifted from the most convex portion in the axial direction by the same amount. Therefore, the phases of the output signals of the two sensors 13e, 13e coincide with each other as shown by FIG. 23(c). In contrast thereto, when the hub 4a fixed with the encoder 12h is operated with a downward axial load in FIG. 23(a), the detecting portions of the two sensors 13e, 13e are opposed to broken lines b, b of FIG. 23(a), that is, portions at which shifts in the axial direction from the most convex portion differ from each other. Under the state, the phases of the output signals of the two sensors 13e, 13e are shifted as shown by FIG. 23(b). Further, when the hub 4a fixed with the encoder 12h is operated with an upward axial load in FIG. 23(a), the detecting portions of the two sensor 13e, 13e are opposed to chain lines c, c of FIG. 23(a), that is, portions at which the shifts in the axial direction from the most convex portion differ from each other in reverse directions. Under the state, the phases of the output signals of the two sensors 13e, 13e are shifted as shown by FIG. 23(d).

As described above, in the case of the embodiment, the phases of the output signals of the two sensors 13e, 13e are shifted in directions in accordance with directions of the axial load applied between the outer ring 3 and the hub 4a. Further, the larger the axial load, the larger the degree of shifting the phases of the output signals of the two sensors 13e, 13e by the axial load. Therefore, in the case of the embodiment, based on presence/absence of the phase shifts of the output signals of the two sensors 13e, 13e, and when the shift is present, based on the direction and the magnitude of the shift, the relative displacement amount in the axial direction between the outer ring 3 and the hub 4a and the direction and the magnitude of the axial load operated between the outer ring 3 and the hub 4a are calculated.

Variations in the output signals of the two sensors 13e, 13e in accordance with the mounting error or the like are removed by the adaptive filter basically similar to Embodiments 1 through 8. Particularly, in the case of the embodiment, based on a phase difference between the output signals of the pairs of sensors 13e, 13e, the axial load displacement of the outer ring 3 and the hub 4a and the axial load applied between the outer ring 3 and the hub 4a are calculated, and therefore, the phase difference (or a signal displacing the phase difference) is subjected to a filtering processing. Further, also when waveform forming circuits are integrated to the two sensors 13e, 13e and the output signals of the two sensors 13e, 13e are constituted by a rectangular waves changed in pulses, a basic way of thinking stay the same.

Figure 24A:
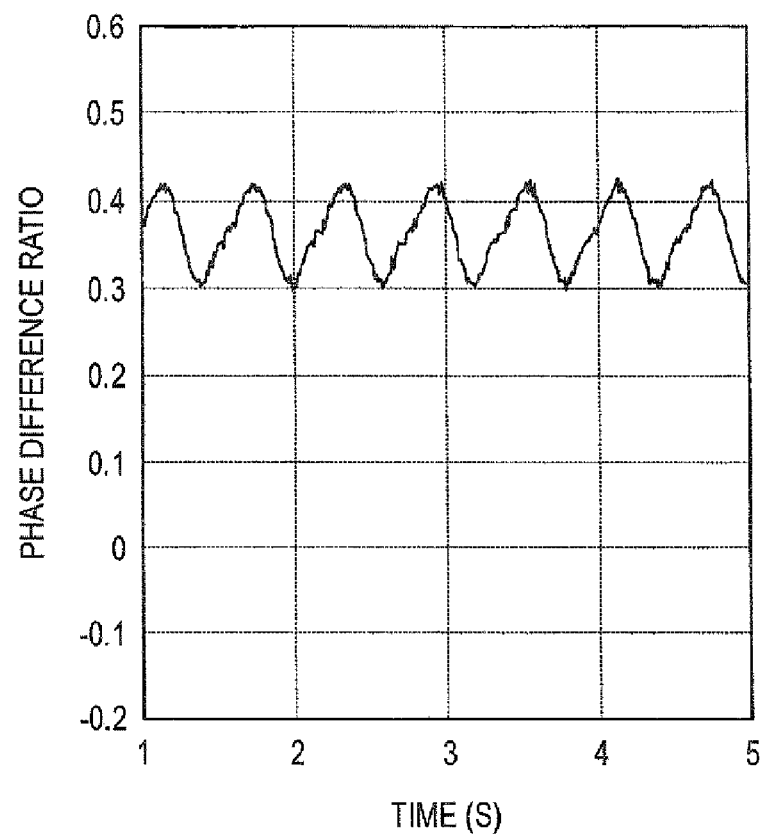
FIG. 24A to 24B illustrate diagrams showing a result of a computer simulation carried out for confirming an effect of Embodiment 9.
Figure 24B:
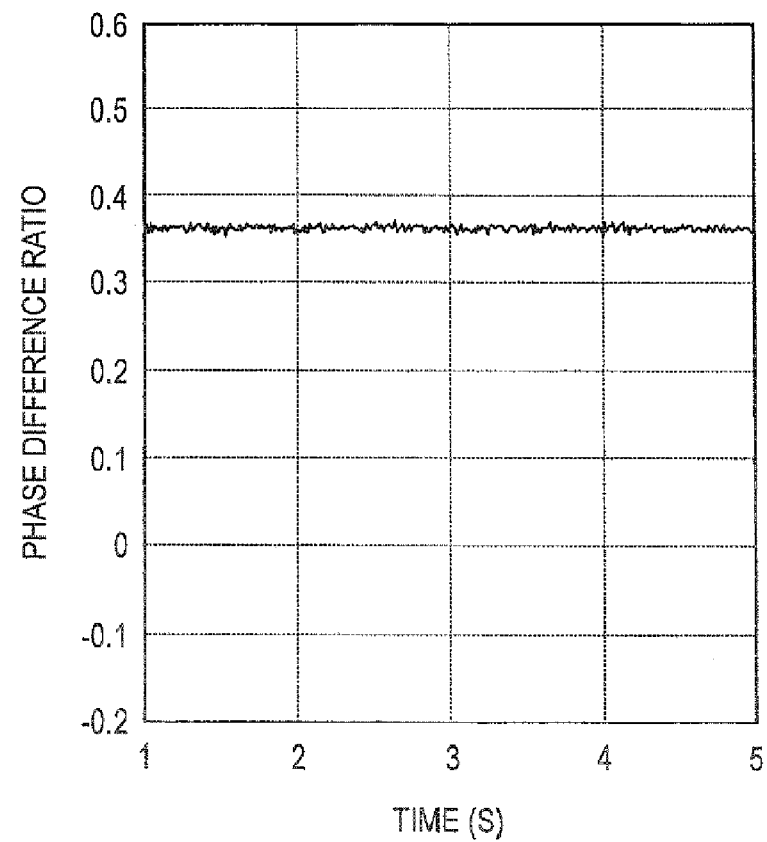
Figure 25:
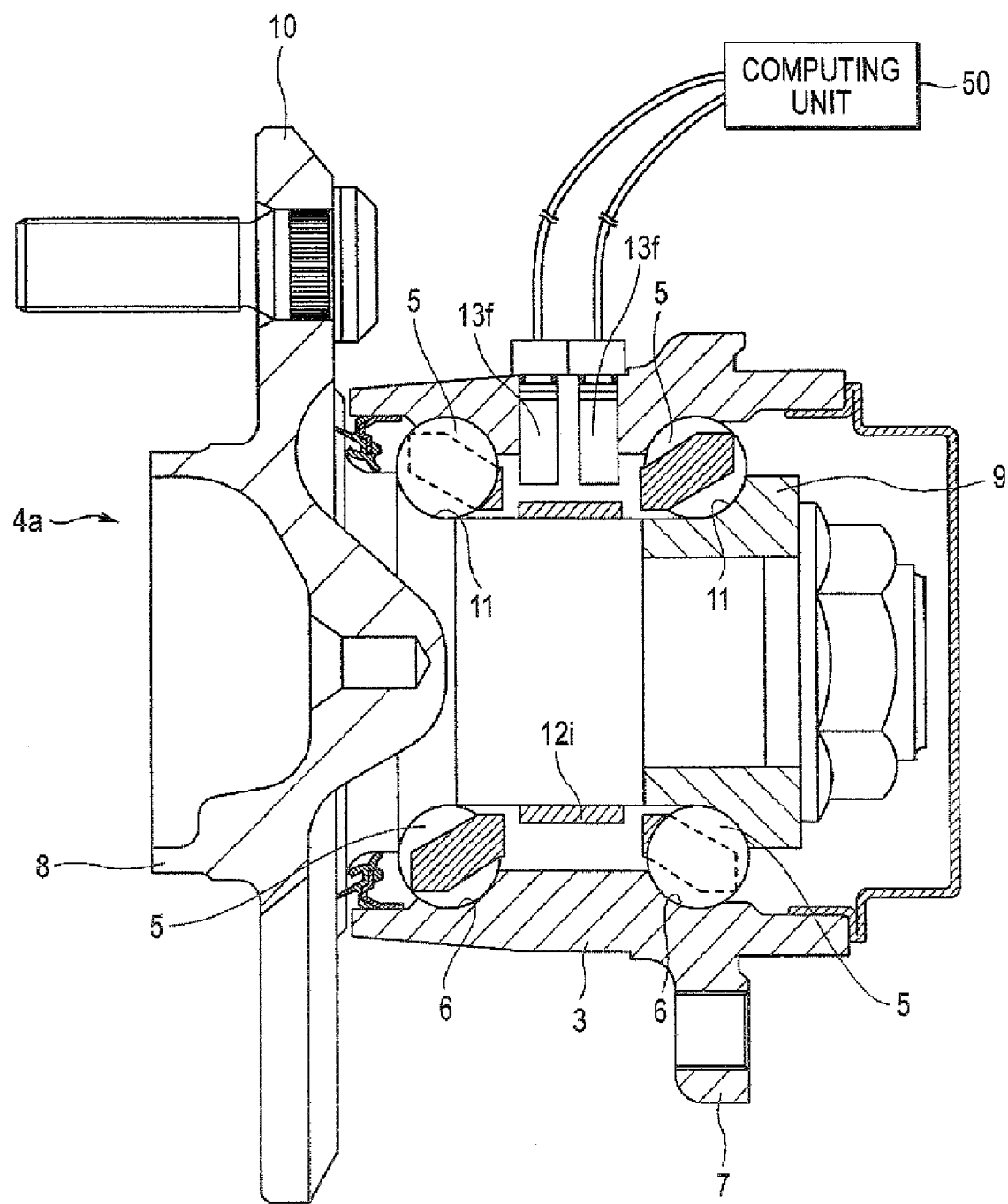
FIG. 25 is a sectional view showing Embodiment 10 of the invention.
Figure 26:
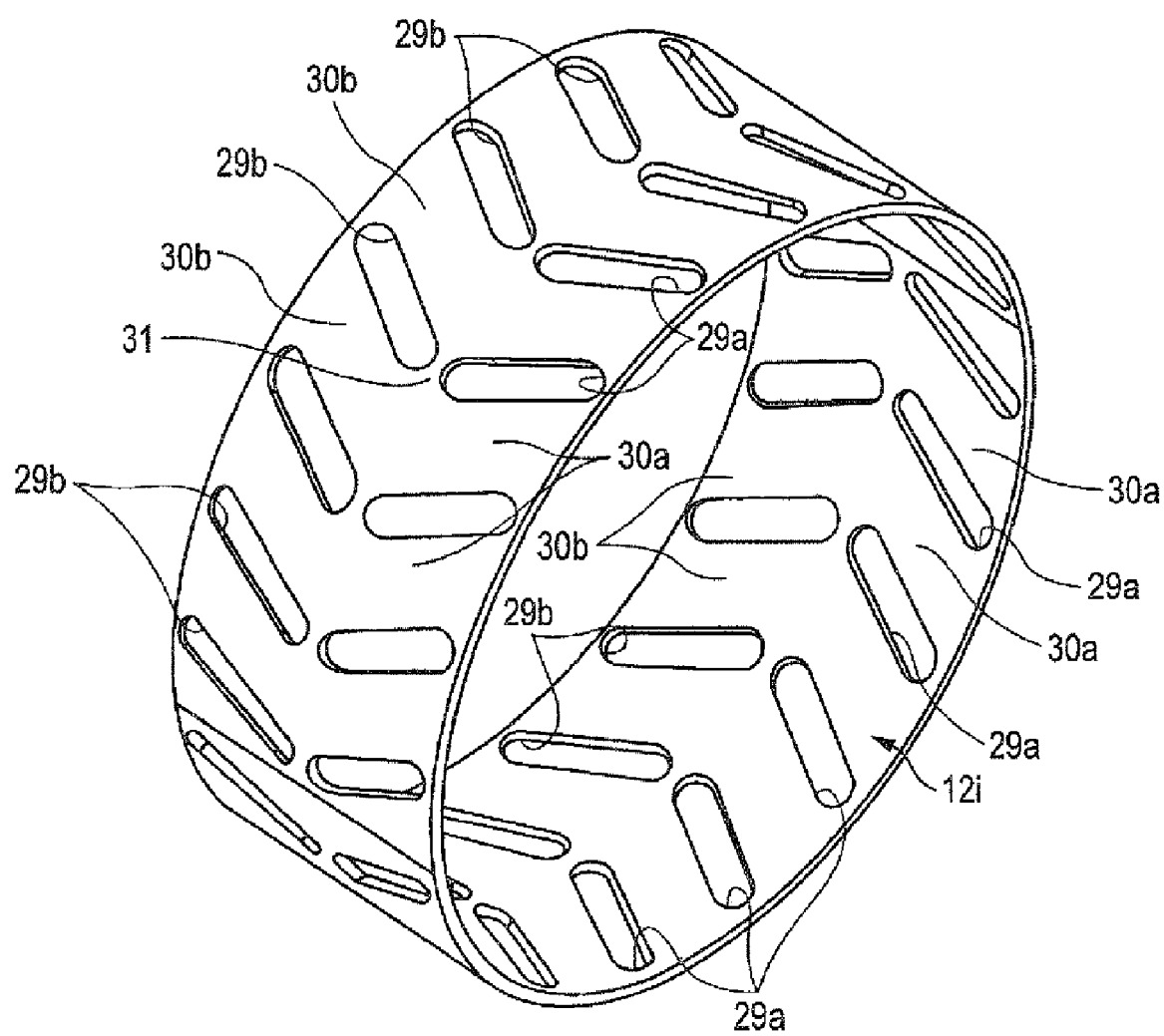
FIG. 26 is a perspective view of an encoder integrated to Embodiment 10.
Figure 27:
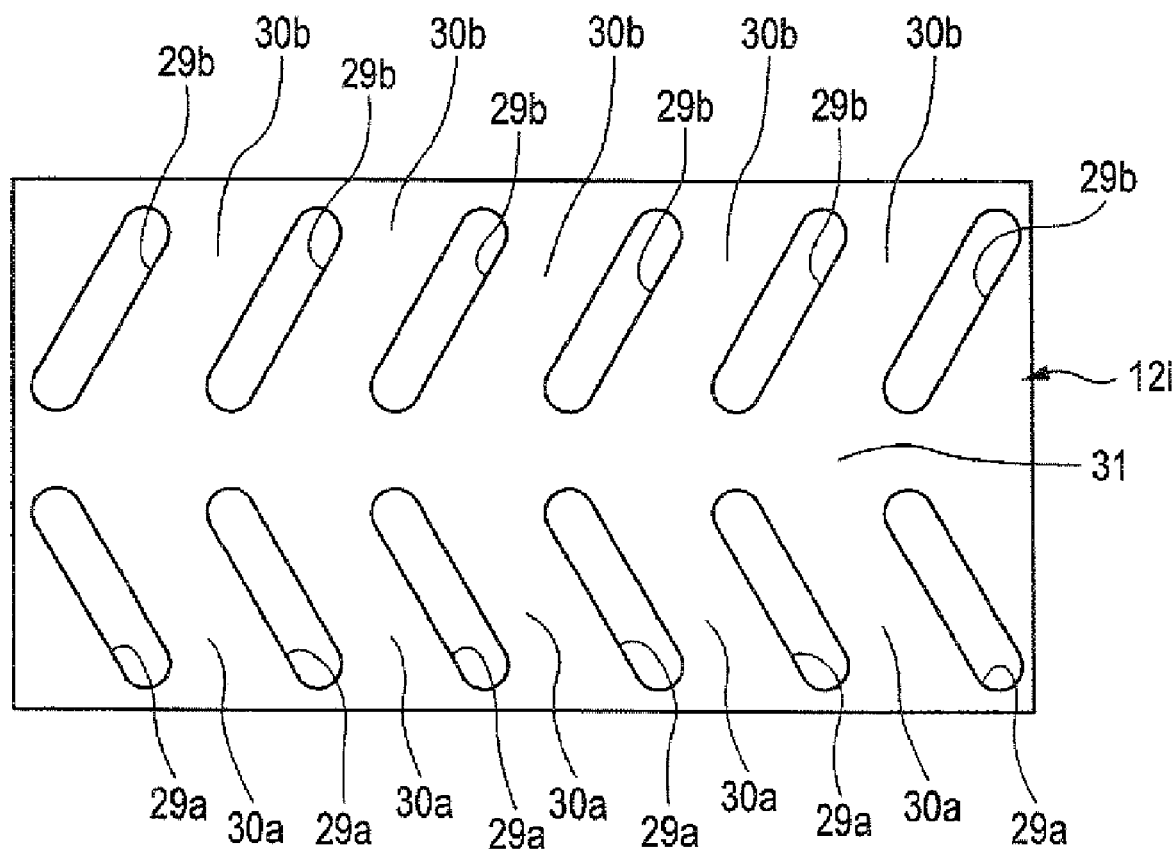
FIG. 27 is a development view of the same.
Figure 28:
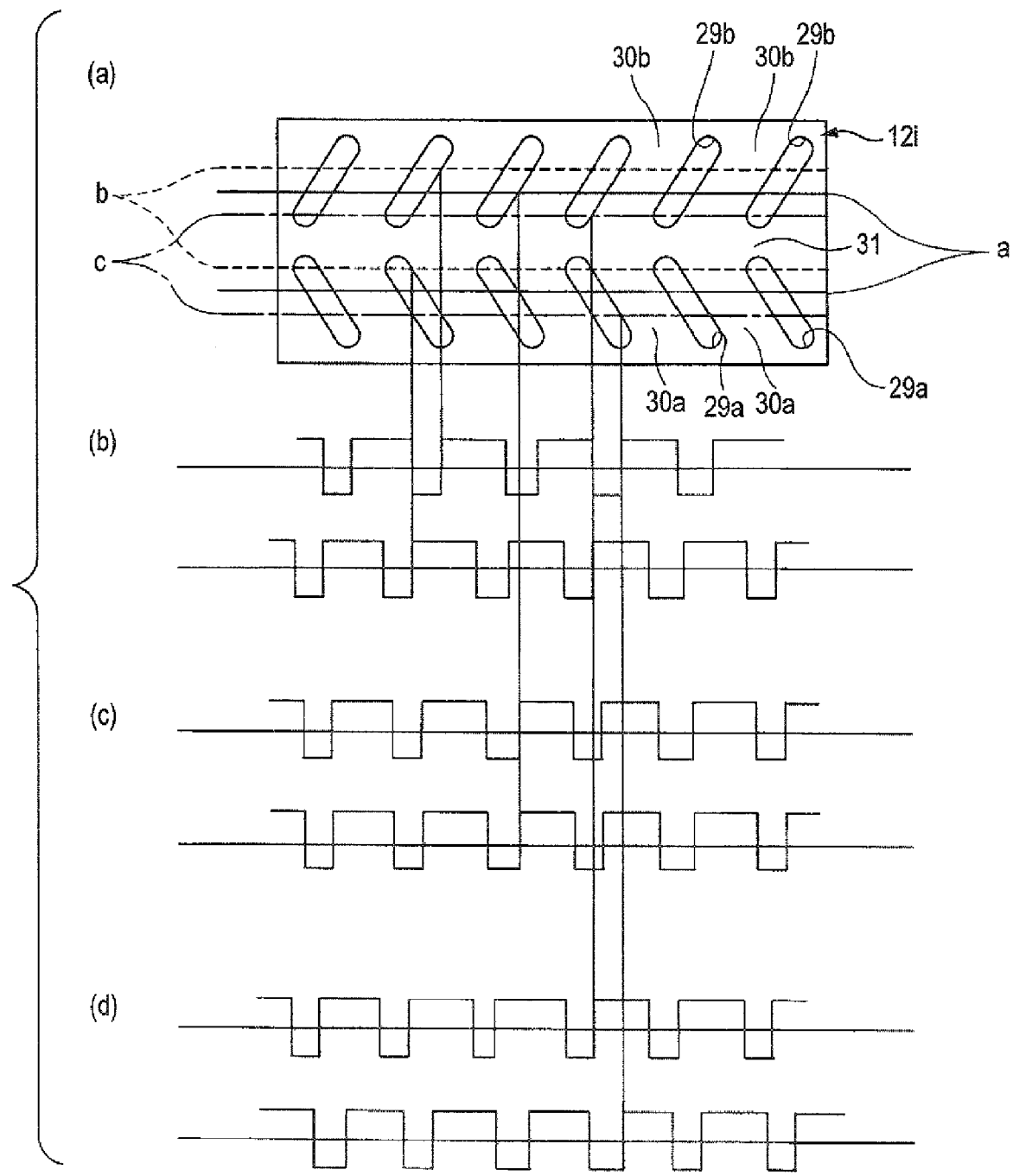
FIG. 28(a) to 28(d) illustrate diagrams showing an output signal of a sensor changed in accordance with a variation in an axial load.

FIG. 24A to 24B show a result of a computer simulation which is carried out for confirming the effect of the embodiment for carrying out the filtering processing. The ordinate of FIG. 24A to 24B designate the phase difference, that is, the phase difference in the output signals of the two sensors 13e, 13e in accordance with the axial load displacement of the encoder 12h, that is, a value (phase difference ratio) constituted by shift amounts over time of the output signals of the two sensors 13e, 13e as shown by FIGS. 23(B) through(d) divided by periods of the output signals of the two sensors 13e, 13e. FIG. 24A to 24B show a case in which the shift amounts over time are large and variations of the output signals of the two sensors 13e, 13e in accordance with the mounting error or the like are extremely large.

FIG. 24A show a case of calculating the phase difference ratio by comparing the output signals of the two sensors 13e, 13e as it is without subjecting the output signals to the filtering processing. In FIG. 24A, a variation component (error) of first order of rotation based on the error of integrating the encoder 12h considerably appears. In contrast thereto, FIG. 24B show a signal provided as the result of subjecting the signal expressing the phase difference ratio to the filtering processing by the synchronization type LMP adaptive filter. As is apparent from FIG. 24B, by the filter processing, the variation component (error) of the first order of rotation posing a problem when the axial load is calculated can be reduced. Although in the signal after the filtering processing, more or less high frequency noise remains, the high frequency noise can be reduced by the low pass filter easily and without producing a response delay to pose a problem in practice, and therefore, the high frequency noise do not particularly pose a problem.

Embodiment 10

FIGS. 25 through 28 show Embodiment 10 of the invention in response to Claims 1 through 4, 7 through 9, 17 through 19, 24. In the case of the embodiment, an encoder 12i made by a magnetic metal plate is outwardly fitted to be fixed at the middle portion of the hub 4a. An outer peripheral surface of the encoder 12i constituting a detected face is arranged with through holes 29a, 29b in a slit-like shape in response to first detected portions, and pillar portions 30a, 30b in correspondence second detected portions alternately and at equal intervals in a circumferential direction. Further, although pitches between the through holes 29a, 29b, or the pillar portions 30a, 30b contiguous to each other in the circumferential direction are equal to each other, it is not necessary that widths of the respective through holes 29a, 29b in the circumferential direction and widths of the respective pillar portions 30a, 30b in the circumferential direction are equal to each other. Particularly, in the case of the embodiment, the respective through holes 29a, 29b in response to the first detected portions and the respective pillar portions 30a, 30b in response to the second detected portions are inclined by the same angle to the axial direction of the encoder 12i, and directions of inclination to the axial direction are constituted by directions reverse to each other by constituting a boundary by a middle portion in the axial direction of the encoder 12i. That is, one half portion in the axial direction of the encoder 12i of the embodiment is formed with through holes 29a, 29a inclined by the same amount in a predetermined direction relative to the axial direction, and other half portion thereof in the axial direction is formed with the through holes 29b, 29b inclined by the same angle in a direction reverse to the predetermined direction.

On the other hand, a pair of sensors 13f, 13f, are installed at the middle portion in the axial direction of the outer ring 3 and the interval portion of the rolling elements 5, 5 arranged in double rows, and detecting portions of the two sensors 13f, 13f are made to be proximate and opposed to an outer peripheral surface of the encoder 12i. Positions of the detecting portion of the two sensors 13f, 13f opposed to the outer peripheral surface of the encoder 12i are disposed at the same position with regard to the circumferential direction of the encoder 12i. Further, positions of installing the respective members 12i, 13f, 13f are restricted such that in a state in which the axial load is not operated between the outer ring 3 and the hub 4a, a rim portion 31 disposed between the respective through holes 29a, 29b and continuous over an entire periphery is present precisely at a center position between the detecting portions of the two sensors 13f, 13f.

In the case of the embodiment constituted as described above, when the axial load is operated between the outer ring 3 and the hub 4a, similar to the case of Embodiment 9, phases of changing output signals of the two sensors 13f, 13f are shifted. That is, in the state in which the axial load is not operated between the outer ring 3 and the hub 4a, the detecting portions of the two sensors 13f, 13f are opposed to bold lines a, a of FIG. 28(a), that is, portions shifted from the rim portion 31 by the same amount in the axial direction. Therefore, the phases of the output signals of the two sensors 13f, 13f coincide with each other as shown by FIG. 28(c). In contrast thereto, when a downward axial load is operated in FIG. 28(a) to the hub 4a fixed with the encoder 12i, the detecting portions of the two sensors 13f, 13f are opposed to broken lines b, b, that is, portions at which shifts in the axial direction from the rim portion 31 differ from each other. Under the state, the phases of the output signals of the two sensors 13f, 13f are shifted from each other as shown by FIG. 28(b). Further, when an upward axial load in FIG. 28(a) is operated to the hub 4b fixed with the encoder 12i, the detecting portions of the two sensors 13f, 13f are opposed to chain lines c, c of FIG. 28(a), that is, portions at which shifts in the axial direction from the rim portion 31 differ from each other in reverse directions. Under the state, the phases of the output signals of the two sensors 13f, 13f are shifted as shown by FIG. 28(d).

As described above, also in the case of the embodiment, similar to the case of Embodiment 9, the phases of the output signals of the two sensors 13f, 13f are shifted in the directions in accordance with the direction of the axial load applied between the outer ring 3 and the hub 4a. Further, the larger the axial load, the larger the degrees of shifting the phases of the output signals of the two sensors 13f, 13f by the axial load. Therefore, also in the case of the embodiment, based on presence/absence of the phase shifts of the output signals of the two sensors 13f, 13f, when the shifts are present, based on the directions and the magnitudes, a displacement amount in the axial direction between the outer ring 3 and the hub 4a and the direction and the magnitude of the axial load operated between the outer ring 3 and the hub 4a are calculated. Variations of the output signals of the two sensors 13f, 13f in accordance with the mounting error or the like are removed similar to Embodiment 9.

Further, in any of the embodiments, it is preferable that an area (spot diameter) of the detecting portion of the sensor is small. The reason is that in order to calculate a change in the pattern of the change in the characteristic of the detected face of the encoder in accordance with the variation of the load, the change in the pattern is made to be read with high accuracy. Further, although the structure of the sensor is not particularly limited such that the structure is of a magnetic type, an optical type or the like, the magnetic type is preferable since it is easy to provide a sensor having a necessary accuracy at low cost. Further, although when the magnetic type sensor is used, a structure of either of a passive type, an active type can be used, the active type sensor can preferably be used since accurate measurement can be carried out by reducing the spot diameter and the measurement can be carried out from low rotation. Further, in the case of the active type sensor, various structures of magnetic sensors including a unipolar type for switching an output (ON•OFF) in response to the change in a density of a magnetic flux passing through a detection element can be used.

Embodiment 11

FIG. 29A to 29B show Embodiment 11 of the invention in response to Claims 1 through 5, 7 through 9, 24. In the case of the embodiment, there is shown a case of embodying the invention with regard to a structure of calculating both displacements of a displacement in an axial direction and a displacement in a radial direction (both loads of an axial load and a radial load). In order to calculate the both displacements, in the case of the embodiment, a detected face in a circular ring shape present at one side face in an axial direction of an encoder 12j for calculating a displacement in a radial direction is provided with characteristic portions 33, 33 for being detected of projected streaks, through holes, recessed holes, magnetic poles or the like respectively inclined in one direction relative to a diameter direction of the encoder 12j. Further, one half portion {left half portion of FIG. 29B} in the axial direction of a detected face in a circular cylinder shape present at an outer peripheral surface of an encoder 12k is provided with second characteristic portions 34, 34 for being detected respectively inclined in the axial direction. In contrast thereto, other half portion {right half portion of FIG. 29B} of the detected face of the encoder 12k is provide with third characteristic portions 35, 35 for being detected respectively in parallel with the axial direction of the encoder 12k. Pitches of the respective characteristic portions 33 through 35 for being detected are equal to each other.

In the case of a structure integrated with the encoders 12j, 12k, detecting portions of a total of 3 pieces of sensors are made to be opposed to portions of the detected faces of the two encoders 12j, 12k formed with the respective characteristic portions 33, 34, 35 for being detected. Further, by constituting a reference by an instance at which output signals of the sensors in parallel with the axial direction of the encoder 12k and opposed to the third characteristic portions 35, 35 for being detected, directions and magnitudes of shifts of phases of output signals of remaining 2 pieces of the sensors are calculated. Further, based on the directions and the magnitudes of the shifts of the phases, the displacements in the axial direction and the radial direction (or the axial load and the radial load) are calculated.

According to the structure of the embodiment, the structure can be constituted by a comparatively small size and the both displacements of the displacement in the axial direction and the displacement in the radial direction (or the axial load and the radial load) can be calculated. In such a structure, when the directions and the magnitudes of the shifts of the phases of the output signals of 2 pieces of the sensors are subjected to the filter process as described in Embodiment 1 mentioned above, regardless of whirling of the detected faces of the two encoders 12j, 12k, the displacements in the axial direction and in the radial direction (or, the axial load and the radial load) can accurately be calculated.

Embodiment 12

Figure 30:
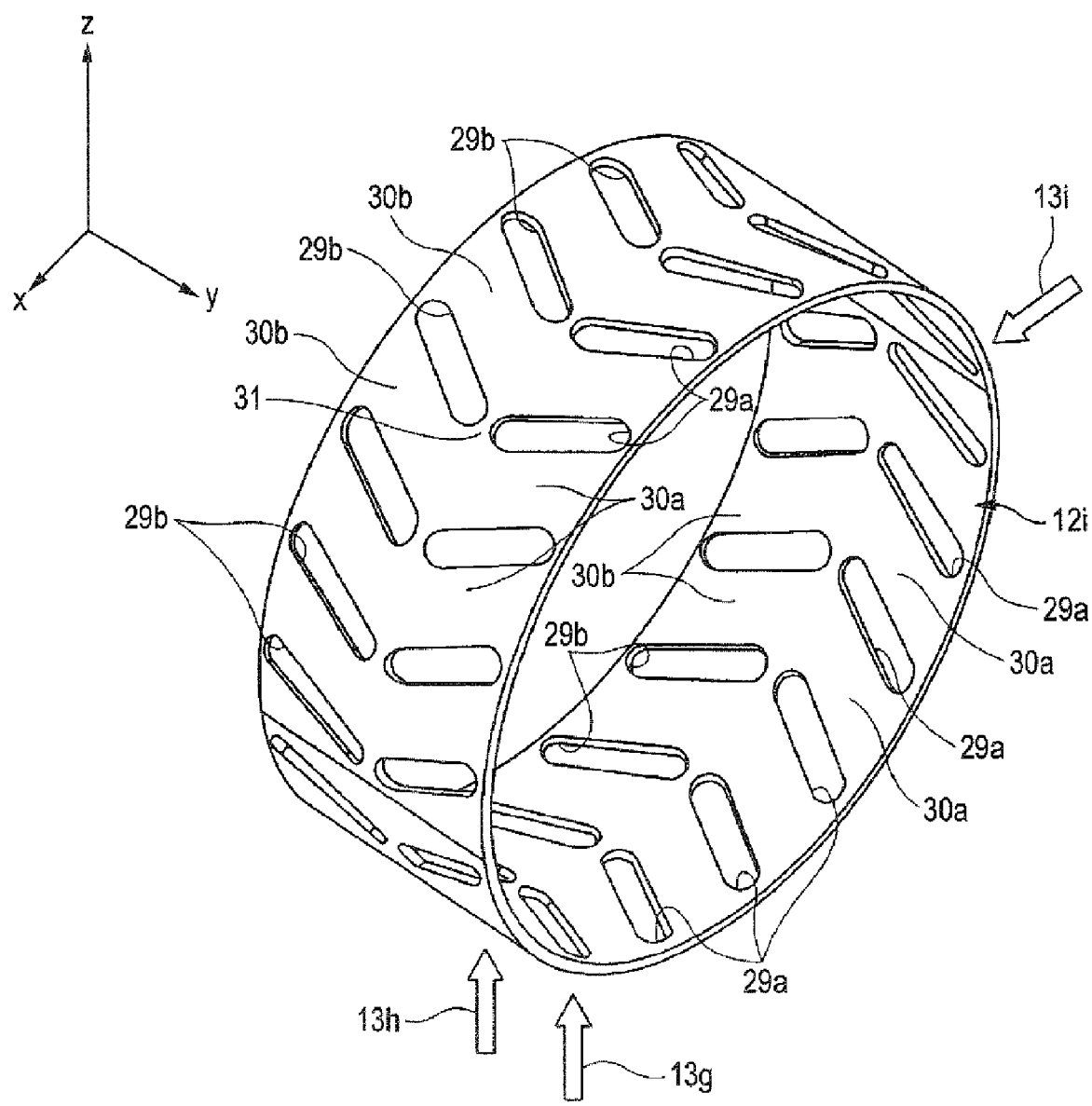
FIG. 30 is a perspective view of an encoder and a sensor showing Embodiment 12 of the same.

FIG. 30 shows Embodiment 12 of the invention in response to Claims 1 through 5, 7 through 9, 24. In the case of the embodiment, by only making detecting portions of 3 pieces sensors 13g through 13i opposed to an outer peripheral surface of the encoder 12i made by a magnetic metal plate in a radial direction, not only a displacement (load) in an axial direction but also a displacement (load) in the radial direction are made to be able to be calculated. That is, by adding 1 piece of sensor to the structure of Embodiment 10 shown in FIGS. 25 through 28, not only the displacement (load) in the axial direction between the outer ring 3 constituting the stationary bearing ring and the hub 4a (refer to FIG. 25) constituting the rotatory bearing ring but also the displacement (load) in the radial direction are made to be able to be measured. Constitution and operation other than the point of enabling to measure the displacement (load) in the radial direction are similar to those of the case of Embodiment 10, and therefore, illustration and explanation with regard to equivalent portions will be omitted or simplified and an explanation will be given as follows centering on a characteristic portion of the embodiment. Further, 2 pieces of the sensors 13g, 13h in 3 pieces of the sensors 13g through 13i correspond to the pair of sensors 13f, 13f integrated to the structure of Embodiment 10. Further, the structure of the encoder 12i is the same as the structure of Embodiment 10.

Detecting portions of 2 pieces of the sensors 13g, 13h in 3 pieces of the sensors 13g through 13i are distributed to the both side portions in the axial direction of the outer peripheral surface of the encoder 12i and made to be opposed to the same positions with regard to the circumferential direction of the encoder 12i. Further, similar to the case of Embodiment 10, in a neutral state of the outer ring 3 and the hub 4a (refer to FIG. 25), the rim portion 31 disposed between the respective through holes 29a, 29b formed at the encoder 12i and continuous over an entire periphery is made to be present precisely at a center position between the detecting portions of the two sensors 13g, 13h.

In contrast thereto, a detecting portion of remaining 1 piece of the sensor 13i in 3 pieces of the sensors 13g through 13i is made to be opposed to a portion of the outer peripheral surface of the encoder 12i proximate to one side in the axial direction. A position of the detecting portion of 1 piece of the sensor 13i opposed to the outer peripheral surface of the encoder 12i is constituted by a position shifted from the portion to which the sensor 13g is opposed by 90 degrees in the rotational direction of the encoder 12i in the neutral state of the outer ring 3 and the hub 4a. Further, in the axial direction of the encoder 12i, the position is made to be the same position to which the sensor 13g is opposed.

According to the structure of the embodiment constituted as described above, based on a phase difference among the output signals of 3 pieces of the sensors 13g through 13i produced by the relative displacement between the outer ring 3 and the hub 4a, not only a displacement (load) in the axial direction but also a displacement (load) in the radial direction can be calculated. With regard to the point, an explanation will be given of displacements in respective x, y, z directions and presence/absence of the phase difference among the output signals of 3 pieces of the sensor 13g through 13i. Further, with regard to respective x, y, z directions, in a case of applying the embodiment to a rolling bearing unit for supporting a wheel of an automobile, x direction indicates a radial direction in a front and rear direction, y direction indicates an axial direction with regard to a width direction, and z direction indicates a radial direction in an up and down direction, respectively.

(1) Case of Producing Displacement in X Direction (the Outer Ring 3 and the Hub 4a are Displaced Relatively in the Front and Rear Direction)

In this case, the phase difference is not brought about between the output signals of 2 pieces of the sensors 13g, 13h provided on a lower side.

In contrast thereto, a phase difference of a direction and a magnitude in accordance with a displacement in the x direction (direction and magnitude) is produced between the output signal of 1 piece of the sensor 13i provided in a horizontal direction and opposed to the first detected face and the output signals of 2 pieces of the sensors 13g, 13h provided to the lower side.

(2) Case of Producing a Displacement in Y Direction {the Outer Ring 3 and the Hub 4a are Relatively Displaced in the Width Direction (Axial Direction)}

In this case, the phase difference is brought about between the output signals of 2 pieces of the sensors 13g, 13h provided on the lower side.

Similarly, the phase difference is brought about also between the output signal of 1 piece of the sensor 13i provided in the horizontal direction and the output signal of the sensor 13h provided on the lower side.

In contrast thereto, the phase difference is not brought about between the output signal of the sensor 13g provided on the lower side and opposed to the first detected face and the output signal of 1 piece of the sensor 13i provided in the horizontal direction.

(3) Case of Producing a Displacement in Z Direction (the Outer Ring 3 and the Hub 4a are Relatively Displaced in Up and Down Directions)

In this case, the phase difference is not brought about between the output signals of 2 pieces of the sensors 13g, 13h provided on the lower side.

In contrast thereto, a phase difference of a direction and a magnitude in accordance with the displacement in z direction (direction and magnitude) is brought about between the output signal of 1 piece of the sensor 13i provided in the horizontal direction and the output signals of 2 pieces of the sensors 13g, 13h provided on the lower side.

As is apparent from a state of an emergence of the phase difference among the output signals of the respective sensors 13g through 13i in the state of producing the displacements in respective x, y, z directions, in the case of the embodiment, not only the displacement (load) in the axial direction but also the displacement (load) in the radial direction are calculated. However, the displacements in the radial direction in two, x, z directions cannot be discriminated. Therefore, the structure of the embodiment is effective in a case of calculating the displacement in the radial direction (radial load) of either one direction in addition to the displacement in the axial direction (axial load). That is, the displacements (loads) in two of the axial and the radial directions can be calculated for a use and a structure which can be regarded such that the displacement is produced only in either one direction of x direction or z direction and the displacement is not produced in other direction.

For example, when the rolling bearing unit is a rolling bearing unit for supporting a drive wheel of an automobile (rear wheel of FR vehicle, front wheel of FF vehicle, RR vehicle, MR vehicle), there is a case in which loads operated in running are only in an axial load and a radial load in an up and down direction except in braking, and a radial load in a front and rear direction can substantially be disregarded. Hence, when the phase differences among the output signals of the respective sensors 13g through 13i are processed by assuming that the radial displacement in x direction is 0, displacements (loads) in remaining 2 directions, that is, the displacement in the axial direction in y direction constituting the width direction of the vehicle (axial load) and the displacement in the radial direction in z direction constituting the up and down direction (radial load) can be calculated. That is, the displacement in y direction can be calculated by the phase difference between the output signals of the sensors 13g, 13h, and the displacement in z direction can be calculated by the phase difference between the output signals of the sensors 13i, 13g (13h), respectively. The method of calculating the displacements in two y, z directions based on the phase differences among the output signals of the respective sensors 13g through 13i is basically similar to that of the case of Embodiment 10 shown in FIGS. 25 through 28, and therefore, a detailed explanation thereof will be omitted.

When the displacements in two y, z directions are calculated as described above, the loads applied in two y, z directions can be calculated. Further, in such a structure, the directions and the magnitudes of the shifts of the phases of the output signals of the respective sensors 13g through 13i are subjected to the filter process described in Embodiment 1, regardless of whirling of the detected face of the encoder 12i, the displacements in the axial direction and the radial direction (axial load and radial load) can accurately be calculated.

Embodiment 13

Figure 31:
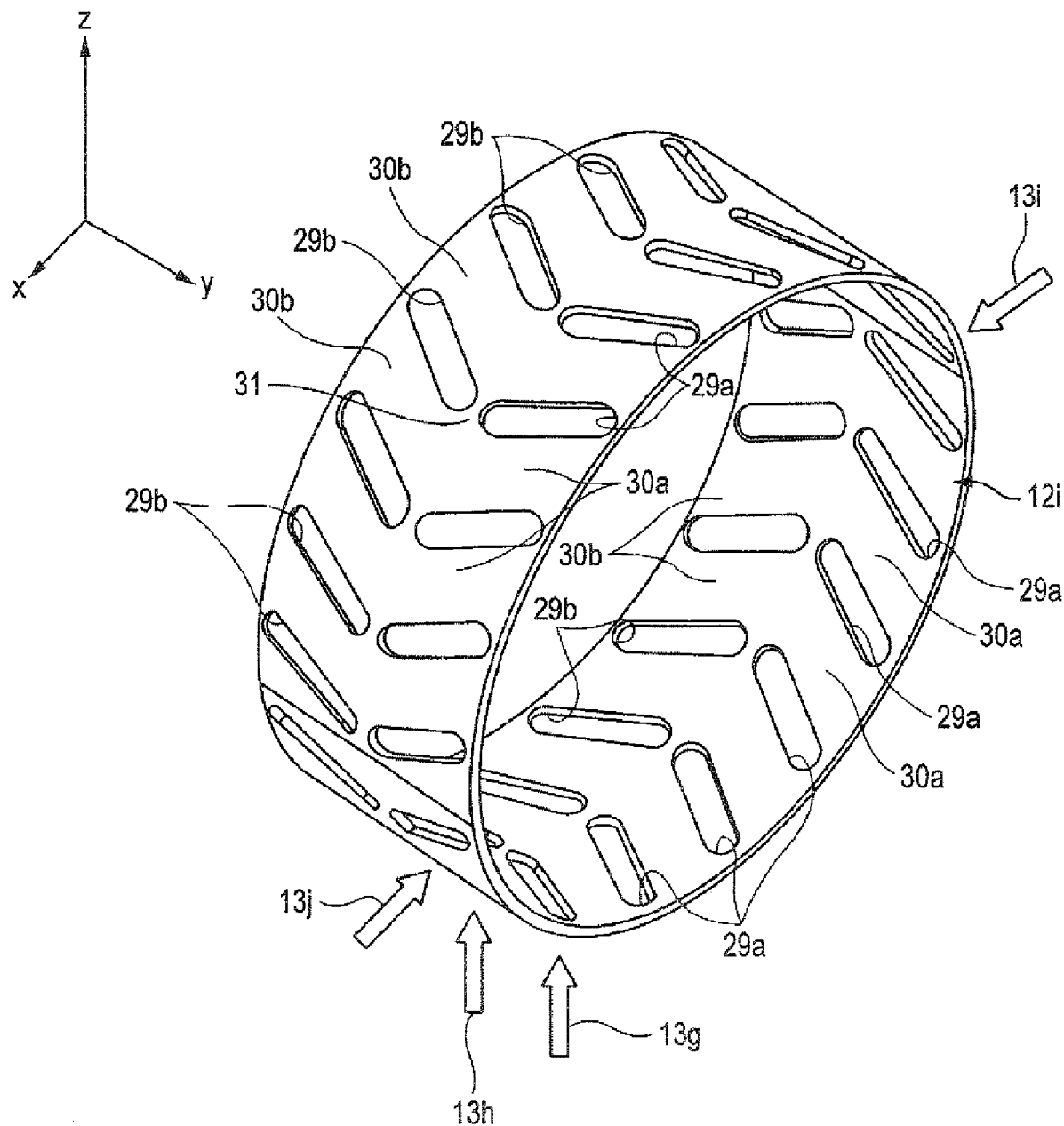
FIG. 31 is a perspective view of an encoder and a sensor showing Embodiment 13 of the same.

FIG. 31 shows Embodiment 13 of the invention in response to Claims 1 through 5, 7 through 9, 24. In the case of the embodiment, in addition to the structure of Embodiment 12, a sensor 13j constituting a fourth sensor is provided. Further, a detecting portion of the sensor 13j is made to be opposed to a portion of the encoder 12i alternately provided with the through holes 29a, 29a and the pillar portions 30a, 30a similar to the detecting portion of the sensor 13i constituting the third sensor. A position of the sensor 13j constituting the fourth sensor opposed to the outer peripheral surface of the encoder 12i is constituted by a position shifted from a portion to which the sensor 13g is opposed by 90 degrees and shifted from the sensor 13i constituting the third sensor to an opposed side by 180 degrees in the neutral state of the outer ring 3 and the hub 4a (refer to FIG. 25). Further, with regard to the axial direction of the encoder 12i, the position is constituted by a position the same as that of a portion to which the two sensors 13g, 13h are opposed. In the case of the embodiment, by adopting such a constitution, displacements in 3 directions of x, y, z are made to be able to be calculated, further, loads applied in 3 directions are made to be able to be calculated from the displacements in 3 directions.

According to the structure of the embodiment constituted as described above, based on the phase differences among the output signals of 4 pieces of the sensors 13g through 13j produced by relatively displacing the outer ring 3 and the hub 4a, not only the displacement (load) in the axial direction but also the displacements (loads) in 2 directions of the radial directions can be calculated. With regard to the point, an explanation will be given of the displacements in respective x, y, z directions and presence/absence of the phase differences among the output signals of 4 pieces of the sensors 13g 13j.

(1) Case of Producing the Displacement in X Direction (the Outer Ring 3 and the Hub 4a are Relatively Displaced in the Front and Rear Direction).

In this case, the phase difference is not brought about between the output signals of 2 pieces of the sensors 13g, 13h provided on the lower side.

In contrast thereto, phase differences of directions and magnitudes in accordance with the displacement in x direction (direction and magnitude) are brought about between the output signal of the sensor 13h provided on the lower side and the output signals of 2 pieces of the sensors 13i, 13j provided in the horizontal direction.

Further, phase differences of directions and magnitudes in accordance with the displacement in x direction (direction and magnitude) are brought about between the output signal of the sensor 13g provided on the lower side and the output signals of 2 pieces of the sensors 13i, 13j provided in the horizontal direction.

A phase difference is not brought about between the output signals of 2 pieces of the sensors 13i, 13j provided in the horizontal direction.

(2) Case of Producing a Displacement in Y Direction {the Outer Ring 3 and the Hub 4a are Relatively Displaced in a Width Direction (Axial Direction)}

In this case, the phase difference is brought about between the output signals of 2 pieces of the sensors 13g, 13h provided on the lower side.

Similarly, the phase differences are brought about also between the output signals of 2 pieces of the sensors 13i, 13j provided in the horizontal direction and the output signal of the sensor 13h provided on the lower side.

In contrast thereto, a phase difference is not brought about between the output signal of the sensor 13g provided on the lower side and the output signals of 2 pieces of the sensors 13i, 13j provided in the horizontal direction.

Further, a phase difference is not brought about also between the output signals of 2 pieces of the sensors 13i, 13j provided in the horizontal direction.

(3) Case of Producing a Displacement in Z Direction (the Outer Ring 3 and the Hub 4a are Relatively Displaced in the Up and Down Direction)

In this case, a phase difference is not brought about between the output signals of 2 pieces of the sensors 13g, 13h provided on the lower side.

In contrast thereto, the phase difference is brought about between the output signal of the sensor 13g provided on the lower side and the output signals of 2 pieces of the sensors 13i, 13j provided in the horizontal direction.

Further, the phase difference is brought about also between the output signal of the sensor 13h provided on the lower side and the output signals of 2 pieces of the sensors 13i, 13j provided in the horizontal direction.

Further, the phase difference is brought about also between the output signals of 2 pieces of the sensors 13i, 13j provided in the horizontal direction.

In sum, the phase between the output signals of 2 pieces of the sensors 13g, 13h provided on the lower side is changed (the phase difference is produced) only by the displacement in y direction and is not changed by the displacements in x, z directions. Therefore, the displacement in y direction can be calculated when presence/absence, direction, magnitude of the phase difference the output signals of 2 pieces of the sensors 13g, 13h provided on the lower side are measured.

Further, the phase between the output signals of 2 pieces of the sensors 13i, 13j provided in the horizontal direction is changed only by the displacement in z direction and is not changed by the displacements in x, y directions. Therefore, the displacement in z direction can be calculated when presence/absence, direction, magnitude of the phase difference between the output signals of 2 pieces of the sensors 13i, 13j provided in the horizontal direction are measured.

Further, the phase between the output signals of the sensors 13g, 13i respectively provided on the lower side or in the horizontal direction is changed by the displacement in x direction and changed simultaneously also by the displacement in z direction. However, the displacement in z direction is calculated from the phase difference between the output signals of 2 pieces of the sensors 13i, 13j provided in the horizontal direction, and therefore, only the displacement in x direction can be calculated when there is carried out a modifying operation of removing the displacement in z direction from the phase difference between the output signals of the two sensors 13i, 13j. Further, the displacement in x direction can be calculated by carrying out the modifying operation of excluding the influence of the displacement in z direction also from the phase difference between the output signals of the two sensors 13g, 13j provided on the lower side and the in the horizontal direction. That is, only the displacement in x direction can be calculated from the phase difference between the output signals of the sensors 13g, 13i, or from the phase difference between the output signals of the sensors 13g, 13j, or an average of the two phase differences.

Further, also the phase difference between the output signals of the sensors 13h, 13i, the phase difference between the output signals of the sensors 13h, 13j is changed by the displacement in x direction, and is changed simultaneously also by the displacement in y direction or the displacement in z direction. The displacements in y, z directions are calculated as described above, and therefore, only the displacement in x direction can also be calculated by a modifying operation for removing the influence of the displacements in y, z directions from the phase difference between the output signals of the sensors 13h, 13i, or from the phase difference between the output signals of the sensors 13h, 13j. However, an amount of calculation is increased, not only a time period required for calculating the displacement in x direction is prolonged but also an error is easy to be brought about, and therefore, the operation is not preferable.

When the displacements in the respective x, y, z directions are calculated, the loads applied in respective x, y, z directions can be calculated. Further, when in such a structure, the directions and the magnitudes of the shifts of the phases of the output signals of the respective sensors 13g through 13j are subjected to the filter process described in Embodiment 1, regardless of whirling of the detected face of the encoder 12i, the displacements in the axial direction and the radial direction (axial load and radial load) can accurately be calculated.

Embodiment 14

Figure 32:
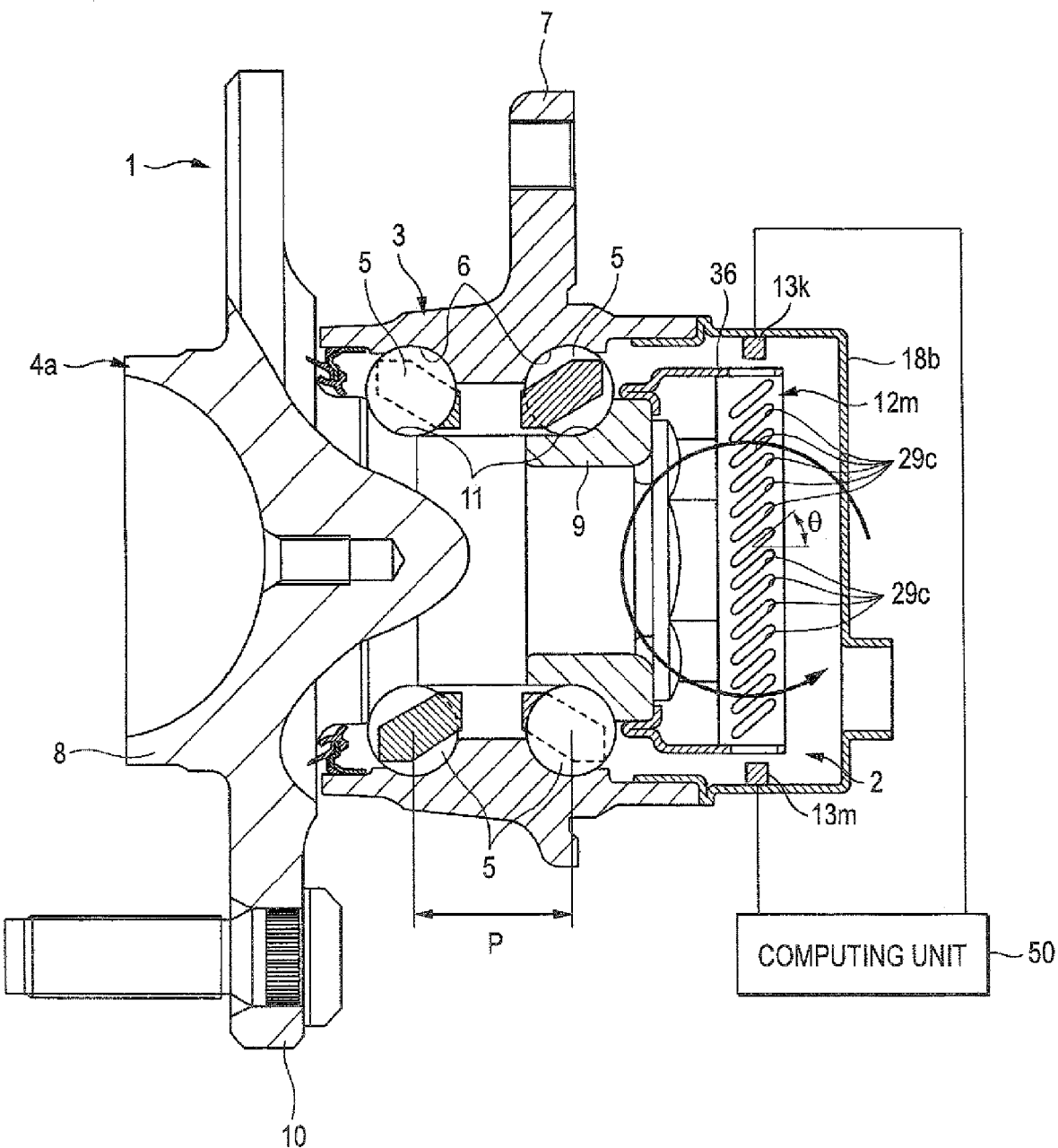
FIG. 32 is a sectional view showing Embodiment 14 of the same.
Figure 33:
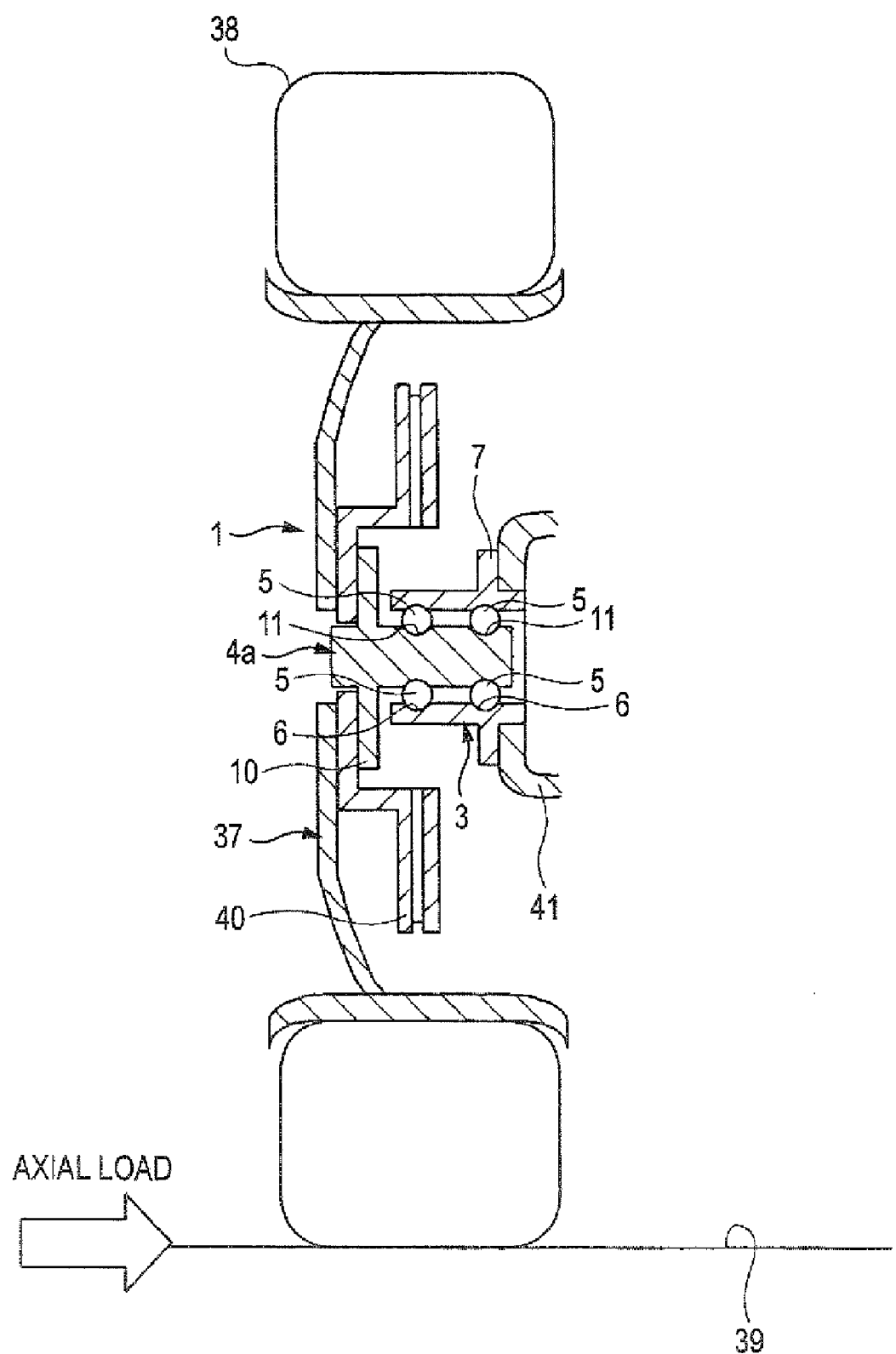
FIG. 33 is an outline sectional view showing a state of being integrated to a suspension.

FIGS. 32 through 33 show Embodiment 14 of the invention in response to Claims 1 through 5, 17, 18, 20, 24. A characteristic of the embodiment resides in that shapes of through holes 29c, 29c formed at an encoder 12m are devised and a pair of sensors 13k, 13m are provided at positions of 2 portions on sides opposed to each other in a diameter direction of the encoder 12m. With regard to the structure of the rolling bearing unit 1 for supporting a wheel integrated with a displacement measuring apparatus, the structure is similar to that in, for example, a case of Embodiment 6 shown in FIG. 15, and therefore, a duplicated explanation thereof will be omitted or simplified, and an explanation will be given as follows centering on a characteristic portion of the embodiment.

In the cylindrical portion 36 provided at a front half portion of the encoder 12m made by a magnetic metal plate is formed with through holes 29c, 29c in a slit-like shape at equal intervals in a circumferential direction. According to the respective through holes 29c, 29c, respectives thereof are constituted by a linear shape inclined to the axial direction of the cylindrical portion 36. Further, the pair of sensors 13k, 13m are supported by portions of an inner peripheral surface of a cover 18b in a shape of a bottomed cylinder fitted to be fixed to an inner end portion of the outer ring 3 and at positions of 2 portions on sides opposed to each other in the diameter direction. In the case of the embodiment, it is intended to calculate an axial load applied in a width direction of the vehicle at a contact portion (ground contact face portion) of a tire 38 and a road surface 39 constituting a wheel 37, and therefore, the sensor 13k on one side is supported by and fixed to an inner peripheral surface of an upper end portion of the cover 18b, and the sensor 13m on other side is supported by and fixed to an inner peripheral surface of a lower end portion of the cover 18b, respectively.

Further, in a state in which the center axis of the outer ring 3 and the center axis of the hub 4a (the encoder 12m outwardly fitted to be fixed to the inner end portion of the hub 4a) coincide with each other, positions of detecting portions of the two sensors 13k, 13m opposed to an outer peripheral surface of the encoder 12m are constituted by positions the same as each other with regard to an axial direction of the encoder 12m. Therefore, in a neutral state in which the center axis of the outer ring 3 and the center axis of the hub 4a coincide with each other, phases of detecting signals of the two sensors 13k, 13m coincide with each other (a phase difference is not produced). Further, even when dimensions in the axial direction of the hub 4a and the encoder 12m are changed in accordance with a temperature change, and the cylindrical portion 36 is moved in parallel with the axial direction, the phases of the detecting signals of the two sensors 13k, 13m do not shift from each other (stay to be in a coinciding state).

In contrast thereto, when a moment is applied between the outer ring 3 and the hub 4a and the center axes of the outer ring 3 and the hub 4a do not coincide with each other, the phases of the detecting signals of the two sensors 13k, 13m are shifted from each other (a phase difference is produced). For example, when the hub 4a is applied with a moment in the counterclockwise direction as shown by an arrow mark in FIG. 32, the phase of the detecting signal of the sensor 13k on one side is advanced (or delayed) from the neutral state, the phase of the detecting signal of the sensor 13m on other side is delayed (or advanced) from the neutral state. As a result, a phase difference is produced between the detecting signals of the two sensors 13k, 13m.

There is a predetermined relationship (first relationship) between the phase difference between the detecting signals of the two sensors 13k, 13m produced in this way and an angle of inclination between the center axis of the outer ring 3 and the center axis of the hub 4a which is determined by geometrical factors of an angle of inclinations $\theta$ of the respective through holes 29c, 29c, a pitch P of the rolling elements 5, 5 arranged in double rows, a diameter of the cylindrical portion 36 and the like. Therefore, when a memory in a computing unit 50 for processing the detecting signals of the two sensors 13k, 13m is stored with an equation or a map expressing the first relationship, the angle of inclination can be calculated based on the phase difference. Further, there is a constant relationship (second relationship between a magnitude of the angle of inclination and a magnitude of the moment which is determined by a moment rigidity or the like of the rolling bearing unit 1 for supporting a wheel. Further, the second relationship is calculated by a calculation based on an elastic contact theory or the like widely known in the field of the rolling bearing unit as well as calculated also by an experiment. Therefore, when the computing unit 50 is stored with an equation or a map expressing the second relationship, the moment can be calculated based on the angle of inclination.

Further, there is a constant relationship (third relationship) between the magnitude of the moment and the axial load applied in the width direction of the vehicle at the contact portion (ground contact face portion) of the tire 38 and the road surface 39 constituting the wheel 37 which is determined geometrically by a radius of rotating the wheel 37 or the like. Therefore, when the memory in the computing unit 50 is stored with an equation or a map expressing the third relationship, the axial load can be calculated based on the moment. The axial load calculated in this way is equivalent to the load produced at the contact face of the road surface 39 and the wheel 37 (tire 38). Therefore, when a control for stabilizing a running state of the vehicle is carried out based on the calculated axial load, a high degree of control for ensuring a stability of running the vehicle can be carried out such that a feedforward control for preventing an attitude of the vehicle from being unstabilized can be carried out or the like. Further, in the case of the embodiment, an error based on a temperature change is not brought about in a value of the calculated axial load. Further, in the above-described structure, when directions and magnitudes of shifts of phases of output signals of the respective sensors 13k, 13m are subjected to the filter process as described in Embodiment 1, regardless of whirling of the detected face of the encoder 12m, the displacement in the axial direction can accurately be calculated. Further, the axial load can directly be calculated based on the shifts and the magnitudes of the phases of the output signals similar to the above-described cases of the respective embodiments similar to the above-described embodiments.

Embodiment 15

FIGS. 34 through 35 show Embodiment 15 of the invention in response to claims 1 through 4, 17, 18, 21, 24. Also in the case of the embodiment, as shown by, for example, FIGS. 1, 8, 12, 15, 17, 20, 25, 32, 33 showing the respective embodiments, the rolling bearing unit for integrating the load measuring apparatus is constituted by a rolling bearing unit for supporting a wheel. Further, an outer ring constituting a stationary bearing ring is supported by and fixed to a suspension in a state of use, and a rotatory bearing ring is constituted by a hub supporting to fix a wheel and rotated along with the wheel. Particularly, in the case of the embodiment, an encoder 12n is provided at an outer periphery edge portion of a disk rotor 40 constituting a member rotated along with a hub constituting the rotatory bearing ring.

As is well known, the disk rotor 40 is a rotating member as shown by FIG. 33 mentioned above, coupled to be fixed to the flange 10 provided at an outer peripheral surface of an outer edge portion of the hub 4a constituting the rotatory bearing ring to rotate along with the hub 4a. Further, the disk rotor 40 is solidly coupled to be fixed to the hub 4a, and therefore, the disk rotor 40 and the hub 4a are synchronizingly (integrally) displaced. Therefore, when the encoder 12n is provided at the outer peripheral edge portion of the disk rotor 40, and a detecting portion of the sensor 13n is made to be opposed to the outer peripheral edge portion, an axial load applied between the hub 4a and the outer ring 3 constituting the stationary bearing ring can be calculated.

Figure 34A:
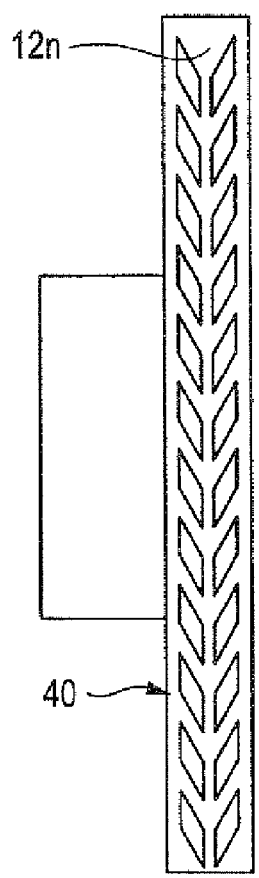
FIG. 34A to 34C illustrate outline side views showing a third example of a shape of a detected face provided at an outer peripheral edge portion of a disk rotor showing Embodiment 15 of the invention.
Figure 34B:
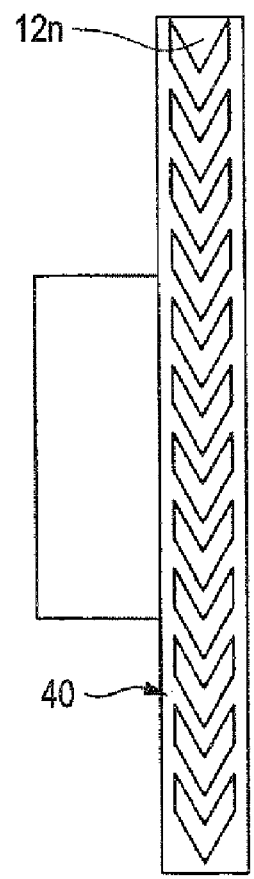
Figure 34C:
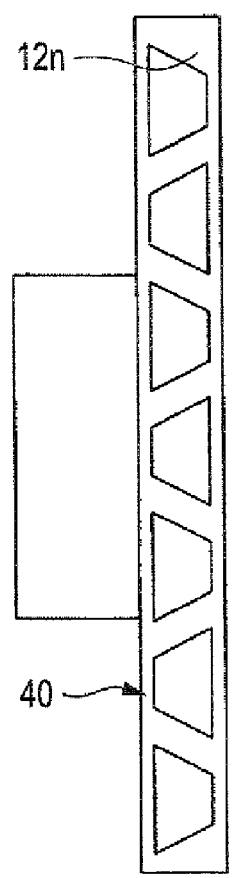
Figure 35A:
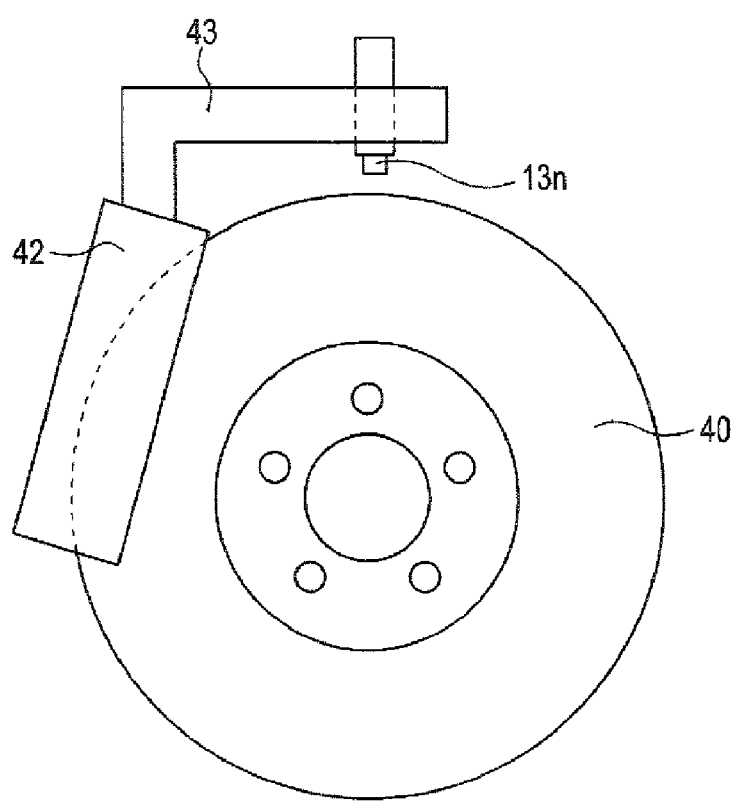
FIG. 35A to 35B illustrate a front view and a side view showing a first example of a state of attaching a sensor.
Figure 35B:
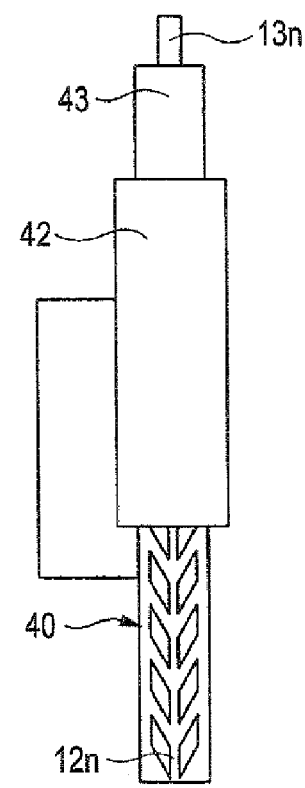

A structure for providing the encoder 12n at the outer peripheral edge portion of the disk rotor is not particularly limited. In a case of the disk rotor 40 made of a magnetic material of cast iron or the like, by forming projections and recesses or holes (recessed holes or through holes in diameter direction) as shown by FIGS. 34(A) through (C) are formed directly at the outer peripheral edge portion, a magnetic property of the outer peripheral edge of the disk rotor 40 can be changed. In this case, when the disk rotor 40 is of a solid type, the projections and recesses having shapes as shown by FIGS. 34(A) through (C) are formed at the outer peripheral surface of the disk rotor 40. In contrast thereto, when the disk rotor 40 is constituted by a ventilated type, the disk rotor 40 is formed with through holes having sectional shapes as shown by FIGS. 34(A) through (C) and penetrated respectively in a diameter direction. On the other hand, when the disk rotor 40 is made by a nonmagnetic member made by an aluminum alloy, an aluminum composite or the like, the outer peripheral portion of the disk rotor 40 is outwardly fitted to be fixed with the encoder 12n formed in a circular ring shape separately by a magnetic member. Also in this case, when the disk rotor 40 is constituted by the solid type, the outer peripheral surface of the encoder 12n is formed with projections and recesses and when the disk rotor 40 is constituted by the ventilated type, the outer peripheral surface of the encoder 12n is formed with through holes, respectively. Further, the above-described explanation is for a case in which a combination of the encoder 12n and the sensor 13n is constituted by a magnetism detecting type. In a case of an optical type or the like, even when the disk rotor 40 is made of a nonmagnetic material, the outer peripheral surface of the disk rotor 40 can be made to constitute a detected face by directly forming projections or recesses or holes on the outer peripheral surface.

On the other hand, the sensor 13n is supported by a portion which is not displaced regardless of a load applied to the rolling bearing unit for supporting the wheel. As such portions, there are conceivable a knuckle 41 constituting a suspension (refer to FIG. 33), or a braking member 42 (refer to FIG. 35A to 35B) constituting a disk brake along with the disk rotor 40. As the braking member 42, when the disk brake is of an opposed piston type, a caliper can be adopted, when the disk brake is constituted by a floating caliper type, a support can be adopted, respectively. In the case of the illustrated embodiment, the sensor 13n is supported by the braking member 42 by way of a support arm 43. According to such a structure of the embodiment, even when the rolling bearing unit for supporting the wheel is not provided with a spatial allowance for installing the encoder 12n and the sensor 13n, the rolling bearing unit attached with the load measuring apparatus can be realized. Further, conversely to the illustrated case, an encoder can also be provided at an inner peripheral edge portion of a friction plate portion in a circular ring shape for pressing a pad can also be provided in the disk rotor 40. In this case, the sensor is installed at a stationary member of the outer wheel of the rolling bearing unit for supporting the wheel. In any of the cases, even in the structure of the embodiment, when the output signal of the sensor 13n is subjected to the filter process described in Embodiment 1, regardless of whirling of the outer peripheral surface of the disk rotor 40, the displacement in the axial direction (axial load) can accurately be calculated.

Embodiment 16

Figure 36:
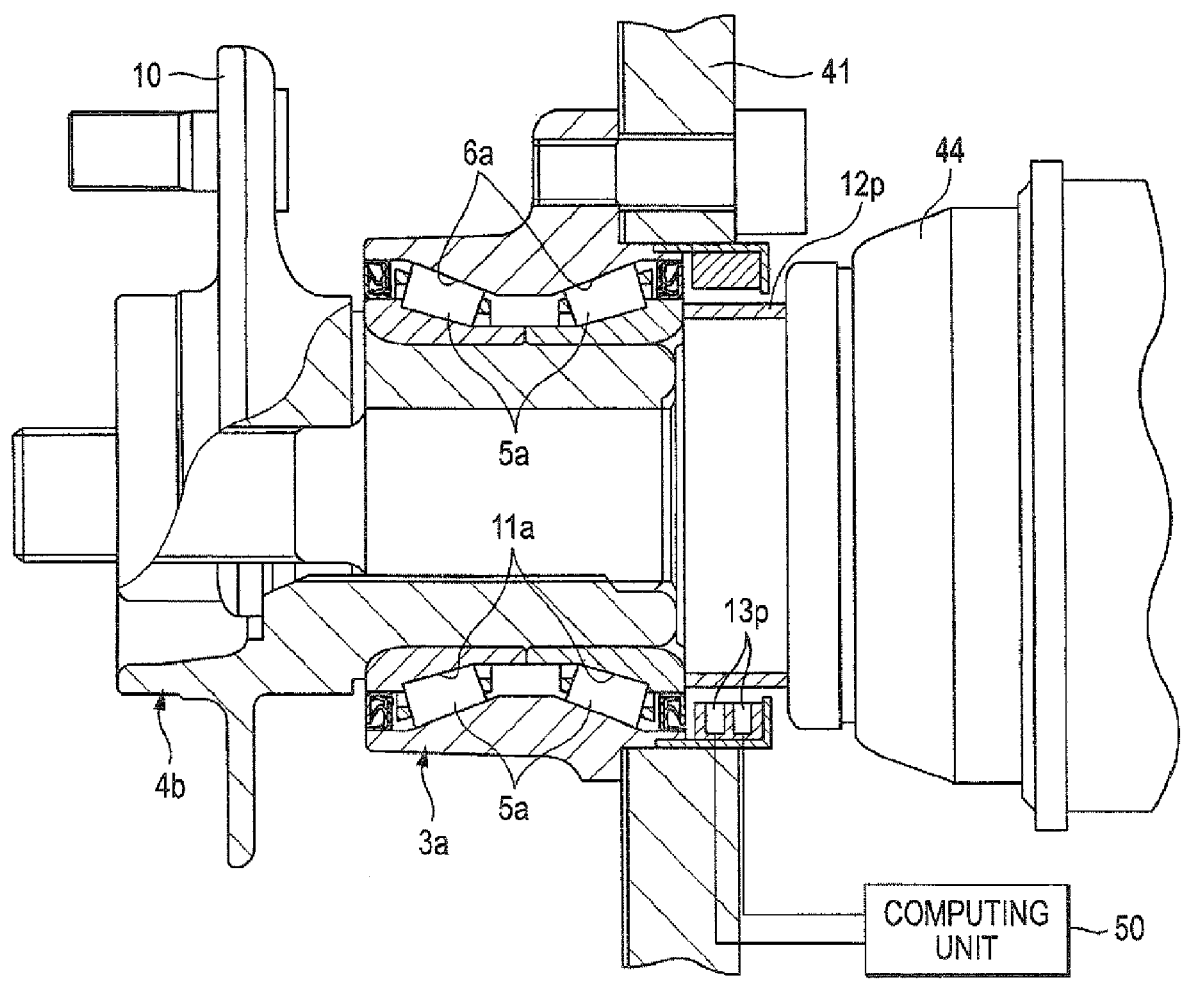
FIG. 36 is a sectional view showing Embodiment 16 of the invention.

FIG. 36 shows Embodiment 16 of the invention in response to Claims 1 through 4, 17, 18, 22, 24. Also in the case of the embodiment, a rolling bearing unit for integrating a load measuring apparatus is constituted by the rolling bearing unit for supporting the wheel. Further, an outer ring 3a constituting a stationary bearing ring is supported by and fixed to a suspension in a state of use, and a rotatory bearing ring is constituted by a hub 4b supporting to fix the wheel and rotated along with the wheel. Particularly, in the case of the embodiment, a detected face is constituted by an outer peripheral surface of a middle portion a constant-velocity joint 44 constituting a member rotated along with the rotatory bearing ring and coupled to be fixed to the hub 4b.

As is well known, the constant-velocity joint 44 is for driving to rotate the hub 4b and is rotated along with the hub 4b. Further, the constant-velocity joint 44 is solidly coupled to be fixed to the hub 4b, and therefore, the constant-velocity joint 44 and the hub 44b are synchronizingly (integrally) displaced. Therefore, when an encoder 12p is provided at an outer peripheral surface of the constant-velocity joint 44, and detected portions of sensors 123p, 13p are made to be opposed to an outer peripheral surface of the encoder 12p, an axial load applied between the hub 4b and the outer ring 3a can be calculated. Therefore, in the case of the embodiment, the encoder 12p in a circular cylinder shape is outwardly fitted to be fixed to the middle portion of the constant-velocity joint 44. Further, detecting portions of the two sensors 13p, 13p supported by the knuckle 41 are closely opposed to positions of 2 portions of an outer peripheral surface of the encoder 12p.

Also by the structure of the embodiment, similar to the case of Embodiment 15 mentioned above, even when a space of mounting the encoder or the sensor cannot be ensured at a side portion of the rolling bearing unit for supporting the wheel, a structure capable of measuring a load applied to the rolling bearing unit for supporting the wheel can be realized. Further, also in the structure of the embodiment, when output signals of the two sensors 13p, 13p are subjected to the filter process as described in Embodiment 1, regardless of whirling of the outer peripheral surface of the encoder 12p, the displacement in the axial direction can accurately be calculated.

An explanation has been given of the above-described respective embodiments centering on a case of calculating a load applied between the outer ring and the hub after calculating the relative displacement amount between the outer ring and the hub. However, as is apparent from a description of a final stage portion of the above-described paragraph number [0022], there is a correlative relationship between a pattern and a load by which an output signal of a sensor is changed. Therefore, as described in Claim 24, even when the relative displacement amount is not calculated, the load can directly be calculated based on the output signal or a processing signal provided by processing the output signal. Also in this case, the processings of the respective embodiments are effective in view of accurately calculating the load.

The present invention is described above by referring to the embodiments. However, the technical scope of the present invention is not limited to the scope defined by the above-described the embodiments. It is to be understood to a person with ordinary skill in the art that various changes or improvements may be applied to the above-described embodiments. As apparent from the description of claims, forms including such changes and improvements may be included in the technical scope of the present invention.

What is claimed is:

1. A displacement measuring apparatus of a rotating member comprising:

an encoder supported by a portion of a rotating member concentrically, said encoder changing a characteristic of a detected face thereof alternately with respect to circumferential direction;

a sensor supported by a portion which is not rotated in a state where a detecting portion thereof is opposed to the detected face, said sensor changing an output signal thereof with respect to the characteristic of the detected face;

a filter circuit performing a filtering process on the output signal of the sensor or a processing signal obtained based on the output signal, said filter circuit erasing an error component based on an error with regard to the change in the characteristic of the detected face over a circumferential direction in a variation of the output signal or the processing signal; and a computing unit calculating a displacement amount of the rotating member based on the output signal or the processing signal on which the filtering process is performed by the filter circuit, said computing unit being provided with a function of calculating the relative displacement amount based on a pattern of changing the output signal or the processing signal passing through the filter circuit.

2. The displacement measuring apparatus of a rotating member according to claim 1, wherein the rotating member is a rotatory bearing ring of a rolling bearing unit or a member coupled and fixed to the rotatory bearing ring and rotated along with the rotatory bearing ring, wherein the rolling bearing unit comprises:

the rotatory bearing ring rotated in a state of use;

a stationary bearing ring which is not rotated even in the state of use; and a plurality of rolling elements provided between the stationary raceway and the rotatory raceway, said stationary raceway and said rotatory raceway residing on peripheral surfaces of the rotatory bearing ring and the stationary bearing ring opposed to each other, and wherein the computing unit calculates the relative displacement amount between the rotatory bearing ring and the stationary bearing ring.

3. The displacement measuring apparatus of a rotating member according to claim 2, wherein the relative displacement amount between the stationary bearing ring and the rotatory bearing ring is used for calculating a load operated between the stationary bearing ring and the rotatory bearing ring.

4. The displacement measuring apparatus of a rotating member according to claim 2, wherein a pitch or a phase of the characteristic of the detected face of the encoder changed with respect to the circumferential direction is changed continuously with respect to a width direction of the detected face in response to a direction of a displacement to be detected.

5. The displacement measuring apparatus of a rotating member according to claim 4, wherein the detected face of the encoder is arranged with a first detected portion and a second detected portion having characteristics different from each other alternately and at equal intervals with respect to circumferential direction, in widths of the detected portions with respect to circumferential direction, the more on one side in the width direction of the detected face, the wider the width of the first detected portion, the more on other side in the width direction of the detected face, the wider the width of the second detected portion, the output signal of the sensor is a signal in a shape of a pulse or a signal in a shape of a sine wave changing a value with regard to a period or an amplitude in response to a difference of the widths between the first detected portion and the second detected portion with respect to the circumferential direction, the filter circuit performs the filtering process in response to a ratio with regard to the period or the amplitude to the filtering process, and the computing unit calculates the relative displacement amount based on a signal expressing the ratio with regard to the period or the amplitude passing the filter circuit.

6. The displacement measuring apparatus of the rotating member according to claim 4, wherein the detected face of the encoder is arranged with a plurality of combined portions for being detected at equal intervals over the circumferential direction, each of said combined portions for being detected including a pair of individualized portions having characteristics different from characteristics of other portions, intervals of the pairs of the individualized portions constituting the respective combined portions for being detected with respect to circumferential direction are continuously changed in the same direction with respect to the width direction of the detected face at all of the combined portions for being detected, a phase-change of the output signal of the sensor is changed in response to a position in the width direction of the detected face of the encoder, to which the detecting portions of the sensor is opposed, the filter circuit performs the filtering processing on the phase-change, and the computing unit calculates the relative displacement amount based on a signal expressing the phase of the change passing the filter circuit.

7. The displacement measuring apparatus of a rotating member according to claim 4, wherein a pair of the sensors installed in a state of disposing the respective detecting portions are provided at positions different from each other with respect to width direction of the detected face of the encoder, a boundary of changing the characteristic with respect to the circumferential direction is inclined with respect to the width direction at a portion of the detected face opposed to the detecting portion of at least one of the sensors, a phase-change of the output signal of at least one of the sensors is changed in response to a position in the width direction of the detected face of the encoder opposed to the detecting portion of the sensor, the filter circuit performs the filtering process on the phase-change, and the computing unit calculates the relative displacement amount based on a signal expressing the phase of the change passing the filter circuit.

8. The displacement measuring apparatus of a rotating member according to claim 4, wherein a plurality of the encoders and a plurality of the sensors opposing the respective detecting portions to the detected faces of the respective encoders are provided, characteristics of the detected faces of the respective encoders are changed alternately with respect to the circumferential direction and by the same pitch among the respective encoders, the pitch or the phase of the characteristic of the detected face of at least one piece of the encoder changed with respect to the circumferential direction is changed continuously with respect to a width direction of the detected face in response to a direction of a displacement to be detected, the filter circuit performs the filtering process on signals expressing phase differences among the output signals of the plurality of sensors, and the computing unit calculates the relative displacement amount based on the signals expressing the phase differences among the output signals of the respective sensors passing the filter circuit.

9. The displacement measuring apparatus of a rotating member according to claim 8, wherein the plurality of encoders having the detected faces are integrated respectively.

10. The displacement measuring apparatus of a rotating member according to claim 1, wherein the filter circuit is an adaptive filter.

11. The displacement measuring apparatus of a rotating member according to claim 10, wherein the adaptive filter is an adaptive filter using an LMS algorithm.

12. The displacement measuring apparatus of a rotating member according to claim 10, wherein the adaptive filter is an adaptive filter using a synchronization type LMS algorithm.

13. The displacement measuring apparatus of a rotating member according to claim 11, wherein in starting the filtering process by the adaptive filter, a data expressed by the output signal or the processing signal inputted first to the adaptive filter is defined as an initial value of a filter coefficient of the adaptive filter.

14. The displacement measuring apparatus of a rotating member according to claim 1, wherein the filter circuit includes at least one of a low pass filter and a notch filter.

15. The displacement measuring apparatus of a rotating member according to claim 10, wherein the adaptive filter and at least one of the low pass filter and the notch filter are provided in series with each other and the adaptive filter is provided in front of at least one of the low pass filter and the notch filter.

16. The displacement measuring apparatus of a rotating member according to claim 14, wherein a cutoff frequency of at least one of the low pass filter and the notch filter is changed in accordance with a rotating speed of the rotating member.

17. The displacement measuring apparatus of a rotating member according to claim 2, wherein the rolling bearing unit is a double row rolling bearing unit providing respective double rows of the stationary raceway surfaces and the rotatory raceway surfaces at pairs of peripheral surfaces of the rotatory bearing ring and the stationary bearing ring opposed to each other.

18. The displacement measuring apparatus of a rotating member according to claim 17, wherein
the rolling bearing unit is a rolling bearing unit for supporting a wheel,
an outer ring constituting the stationary bearing ring is supported by and fixed to a suspension and a hub constituting the rotatory bearing ring supports and fixes the wheel and is rotated along with the wheel in a state of use,
a plurality of the rolling elements are provided for respective rows between outer ring raceways of double rows respectively constituting the stationary raceways residing at an inner peripheral surface of the outer ring and inner tracks of double rows respectively constituting rotatory raceways residing at an outer peripheral surface of the hub, and
a flange supporting and fixing the wheel is provided at an outer edge portion in an axial direction of the hub.

19. The displacement measuring apparatus of a rotating member according to claim 17, wherein the encoder is supported by and fixed to a portion of the rotatory bearing ring and an interval portion of the rotatory raceway surfaces of double rows concentrically with the rotatory bearing ring.

20. The displacement measuring apparatus of a rotating member according to claim 17, wherein the encoder is supported by and fixed to an edge portion of the rotatory bearing ring concentrically with the rotatory bearing ring.

21. The displacement measuring apparatus of a rotating member according to claim 18, wherein
a member rotated along with the rotatory bearing ring is a disk rotor constituting a disk brake in a state of being coupled and fixed to the hub, and
an outer peripheral surface of the disk rotor is used as the detected face.

22. The displacement measuring apparatus of a rotating member according to claim 18, wherein
a member rotated along with the rotatory bearing ring is a constant-velocity joint coupled and fixed to the hub, and
an outer peripheral surface of a portion of the constant-velocity joint is used as the detected face.

23. The displacement measuring apparatus of a rotating member according to claim 2, wherein
the rolling bearing unit is used so as to rotatably support a main spindle of a machine tool with respect to a housing,
in a state of use, an outer ring constituting the stationary bearing ring is inwardly fitted and fixed to the housing or a portion fixed to the housing, and
an inner ring constituting the rotatory bearing ring is outwardly fitted and fixed to the main spindle or a portion rotated along with the main spindle.

24. A load measuring apparatus of a rotating member comprising:
an encoder supported by a portion of a rotating member concentrically, said encoder changing a characteristic of a detected face thereof alternately with respect to circumferential direction;
a sensor supported by a portion which is not rotated in a state where a detecting portion thereof is opposed to the detected face, said sensor changing an output signal thereof with respect to the characteristic of the detected face;
a filter circuit performing a filtering process on the output signal of the sensor or a processing signal obtained based on the output signal, said filter circuit erasing an error component based on an error with regard to the change in the characteristic of the detected face over a circumferential direction in a variation of the output signal or the processing signal; and
a computing unit calculating a displacement amount of the rotating member based on the output signal or the processing signal on which the filtering process is performed by the filter circuit, said computing unit being provided with a function of calculating the relative displacement amount based on a pattern of changing the output signal or the processing signal passing through the filter circuit.

* * * * *